(12) United States Patent
Zhang

(10) Patent No.: US 12,419,307 B2
(45) Date of Patent: Sep. 23, 2025

(54) MIXTURES COMPRISING INDAZOLE PESTICIDES

(71) Applicant: FMC Corporation, Philadelphia, PA (US)

(72) Inventor: Wenming Zhang, Newark, DE (US)

(73) Assignee: FMC Corporation, Philadelphia, PA (US)

( * ) Notice: Subject to any disclaimer, the term of this patent is extended or adjusted under 35 U.S.C. 154(b) by 810 days.

(21) Appl. No.: 17/626,313

(22) PCT Filed: Jul. 10, 2020

(86) PCT No.: PCT/US2020/041668
§ 371 (c)(1),
(2) Date: Jan. 11, 2022

(87) PCT Pub. No.: WO2021/007545
PCT Pub. Date: Jan. 14, 2021

(65) Prior Publication Data
US 2022/0394974 A1 Dec. 15, 2022

Related U.S. Application Data

(60) Provisional application No. 62/873,302, filed on Jul. 12, 2019, provisional application No. 62/873,100, filed on Jul. 11, 2019.

(51) Int. Cl.
| | | |
|---|---|---|
| *A01N 43/56* | (2006.01) | |
| *A01M 25/00* | (2006.01) | |
| *A01N 25/02* | (2006.01) | |
| *A01P 7/04* | (2006.01) | |
| *A01C 1/06* | (2006.01) | |
| *A01M 7/00* | (2006.01) | |
| *B64D 1/18* | (2006.01) | |

(52) U.S. Cl.
CPC ........... *A01N 43/56* (2013.01); *A01M 25/004* (2013.01); *A01N 25/02* (2013.01); *A01P 7/04* (2021.08); *A01C 1/06* (2013.01); *A01M 7/0042* (2013.01); *A01M 7/0046* (2013.01); *B64D 1/18* (2013.01)

(58) Field of Classification Search
CPC ........... A01N 43/56; A01N 25/02; A01P 7/04; A01M 25/004; A01M 7/0042; A01C 1/06
See application file for complete search history.

(56) References Cited

FOREIGN PATENT DOCUMENTS

| | | |
|---|---|---|
| TW | 202005533 A | 2/2020 |
| WO | 2015/038503 A1 | 3/2015 |
| WO | 2016/144351 A1 | 9/2016 |
| WO | 2016/144678 A1 | 9/2016 |
| WO | 2017/106000 A1 | 6/2017 |
| WO | 2018/011056 A1 | 1/2018 |
| WO | 2020/018362 A1 | 1/2020 |

OTHER PUBLICATIONS

International Search Report of corresponding application No. PCT/US2020/041668.

*Primary Examiner* — Zohreh A Fay
(74) *Attorney, Agent, or Firm* — FMC Corporation

(57) ABSTRACT

Disclosed are compositions comprising compounds of Formula (I) and compounds of Formula (II). Also disclosed are compositions containing compounds of Formula (I) or compounds of Formula (II), or combinations thereof and methods for controlling an invertebrate pest comprising contacting the invertebrate pest or its environment with a biologically effective amount of a compound or a composition of the disclosure.

Formula (I)

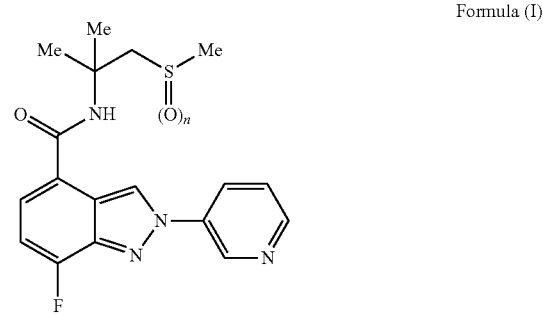

Formula (II)

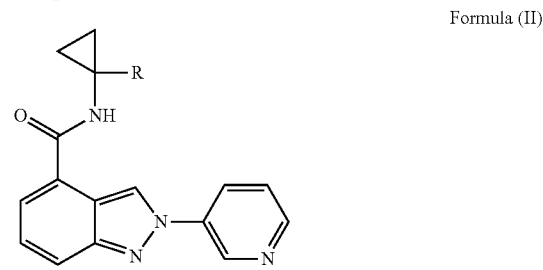

20 Claims, No Drawings

MIXTURES COMPRISING INDAZOLE PESTICIDES

CROSS REFERENCE TO RELATED APPLICATIONS

This application claims the benefit of U.S. provisional application No. 62/873,100, filed Jul. 11, 2019, and U.S. provisional application No. 62/873,302, filed Jul. 12, 2019, the disclosures of which are hereby incorporated by reference in their entireties.

FIELD

This disclosure relates to pesticidal mixtures and compositions comprising certain substituted indazole compounds, and at least one other invertebrate pest control agent, suitable for agronomic, nonagronomic and uses, and methods of their use for controlling invertebrate pests such as arthropods in both agronomic and nonagronomic environments.

BACKGROUND

The control of invertebrate pests is extremely important in achieving high crop efficiency. Damage by invertebrate pests to growing and stored agronomic crops can cause significant reduction in productivity and thereby result in increased costs to the consumer. The control of invertebrate pests in forestry, greenhouse crops, ornamentals, nursery crops, stored food and fiber products, livestock, household, turf, wood products, and public and animal health is also important. Many products are commercially available for these purposes, but the need continues for new compounds that are more effective, less costly, less toxic, environmentally safer or have different sites of action. PCT Application Publication WO 2015/038503 A1 discloses related indazole compounds.

SUMMARY

This disclosure is directed to a composition comprising (a) at least one compound of Formula I or of Formula II, or a combination of the foregoing compounds, compositions containing them, and their use for controlling invertebrate pests:

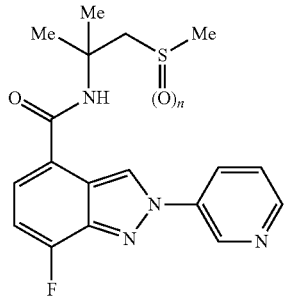

Formula I wherein n is 0, 1, or 2; or

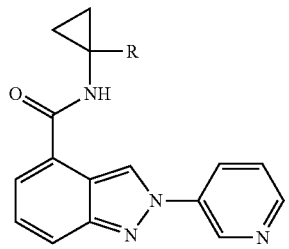

Formula II wherein R is $CH_3$, or $CF_2H$;
or a combination of the foregoing compounds; and
(b) at least one additional pest control agent different from the compound of Formula I or the compound of Formula II.

In some embodiments the additional pest control agent is an invertebrate pest control agent.

In some embodiments the additional pest control agent is selected from an insecticide, fungicide, nematocide, and bactericide.

In some embodiments the additional pest control agent is selected from abamectin, acephate, acequinocyl, acetamiprid, acrinathrin, acynonapyr, afidopyropen ([(3S,4R,4aR,6S,6aS,12R,12aS,12bS)-3-[(cyclopropylcarbonyl)oxy]-1,3,4,4a,5,6,6a,12,12a,12b-decahydro-6,12-dihydroxy-4,6a,12b-trimethyl-11-oxo-9-(3-pyridinyl)-2H,11H-naphtho[2,1-b]pyrano[3,4-e]pyran-4-yl]methyl cyclopropanecarboxylate), amidoflumet, amitraz, avermectin, azadirachtin, azinphos-methyl, benfuracarb, bensultap, benzpyrimoxan, bifenthrin, kappa-bifenthrin, bifenazate, bistrifluron, borate, broflanilide, buprofezin, cadusafos, carbaryl, carbofuran, cartap, carzol, chlorantraniliprole, chlorfenapyr, chlorfluazuron, chloroprallethrin, chlorpyrifos, chlorpyrifos-e, chlorpyrifos-methyl, chromafenozide, clofentezin, chloroprallethrin, clothianidin, cyantraniliprole (Cyazypyr™) (3-bromo-1-(3-chloro-2-pyridinyl)-N-[4-cyano-2-methyl-6-[(methylamino)carbonyl]phenyl]-1H-pyrazole-5-carboxamide), cyclaniliprole (3-bromo-N-[2-bromo-4-chloro-6-[[(1-cyclopropylethyl)amino]carbonyl]phenyl]-1-(3-chloro-2-pyridinyl)-1H-pyrazole-5-carboxamide), cyclobutrifluram, cycloprothrin, cycloxaprid ((5S,8R)-1-[(6-chloro-3-pyridinyl)methyl]-2,3,5,6,7,8-hexahydro-9-nitro-5,8-Epoxy-1H-imidazo[1,2-a]azepine), cyenopyrafen, cyetpyrafen, cyflumetofen, cyfluthrin, beta-cyfluthrin, cyhalodiamide, cyhalothrin, gamma-cyhalothrin, lambda-cyhalothrin, cypermethrin, alpha-cypermethrin, zeta-cypermethrin, cyromazine, deltamethrin, diafenthiuron, diazinon, dicloromezotiaz, dieldrin, diflubenzuron, dimefluthrin, dimehypo, dimethoate, dimpropyridaz, dinotefuran, diofenolan, DiPel®emamectin, emamectin benzoate, endosulfan, esfenvalerate, ethiprole, etofenprox, epsilon-metofluthrin, etoxazole, fenbutatin oxide, fenitrothion, fenothiocarb, fenoxycarb, fenpropathrin, fenvalerate, fipronil, flometoquin (2-ethyl-3,7-dimethyl-6-[4-(trifluoromethoxy)phenoxy]-4-quinolinyl methyl carbonate), flonicamid, fluazaindolizine, flubendiamide, flucythrinate, flufenerim, flufenoxuron, flufenoxystrobin (methyl (αE)-2-[[2-chloro-4-(trifluoromethyl)phenoxy]methyl]-α-(methoxymethylene)benzeneacetate), fluensulfone (5-chloro-2-[(3,4,4-trifluoro-3-buten-1-yl)sulfonyl]thiazole), fluhexafon, fluopyram, flupentiofenox, flupiprole (1-[2,6-dichloro-4-(trifluoromethyl)phenyl]-5-[(2-methyl-2-propen-1-yl)amino]-4-[(trifluoromethyl)sulfinyl]-1H-pyrazole-3-carbonitrile), flupyradifurone (4-[[(6-chloro-3-pyridinyl)methyl](2,2-difluoroethyl)amino]-2(5H)-furanone), flupyrimin, fluvalinate, tau-fluvalinate, fluxametamide, fonophos, formetanate, fosthiazate, gamma-cyhalothrin, halofenozide, heptafluthrin ([2,3,5,6-tetrafluoro-4-(methoxymethyl)phenyl]methyl 2,2-dimethyl-3-[(1Z)-3,3,3-trifluoro-1-propen-1-yl]cyclopropanecarboxylate), hexaflumuron, hexythiazox, hydramethylnon, imidacloprid, indoxacarb, insecticidal soaps, isofenphos, isocycloseram, kappa-tefluthrin, lambda-cyhalothrin, lufenuron, malathion, meperfluthrin ([2,3,5,6-tetrafluoro-4-(methoxymethyl)phenyl]methyl (1R,3S)-3-(2,2-dichloroethenyl)-2,2-dimethylcyclopropanecarboxylate), metaflumizone, metaldehyde, methamidophos, methidathion, methiocarb, methomyl, methoprene, methoxychlor, metofluthrin, methoxyfenozide, epsilon-metofluthrin, metronidazole epsilon-momfluorothrin, monocrotophos, monofluorothrin ([2,3,5,6-tetrafluoro-4-(methoxymethyl)phenyl]methyl 3-(2-cyano-1-propen-1-yl)-2,2-dimethylcyclopropanecarboxylate), nicofluprole, nicotine, nitenpyram, nithiazine, novaluron, noviflumuron, oxamyl, oxazosulfyl, parathion, parathion-methyl, permethrin, phorate, phosalone, phosmet, phosphamidon, pirimicarb, profenofos, profluthrin, propargite, protrifenbute, pyflubumide (1,3,5-trimethyl-N-(2-methyl-1-oxopropyl)-N-[3-(2-methylpropyl)-4-[2,2,2-trifluoro-1-methoxy-1-(trifluoromethyl)ethyl]phenyl]-1H-pyrazole-4-carboxamide), pymetrozine, pyrafluprole, pyrethrin, pyridaben, pyridalyl, pyrifluquinazon, pyriminostrobin (methyl (αE)-2-[[[2-[(2,4-dichlorophenyl)amino]-6-(trifluoromethyl)-4-pyrimidinyl]oxy]methyl]-α-(methoxymethylene)benzeneacetate), pydiflumetofen, pyriprole, pyriproxyfen, rotenone, ryanodine, silafluofen, spinetoram, spinosad, spirodiclofen, spiromesifen, spiropidion, spirotetramat, sulprofos, sulfoxaflor (N-[methyloxido[1-[6-(trifluoromethyl)-3-pyridinyl]ethyl]-λ⁴-sulfanylidene]cyanamide), tebufenozide, tebufenpyrad, teflubenzuron, tefluthrin, kappa-tefluthrin, terbufos, tetrachlorantraniliprole, tetrachlorvinphos, tetramethrin, tetramethylfluthrin ([2,3,5,6-tetrafluoro-4-(methoxymethyl)phenyl]methyl 2,2,3,3-tetramethylcyclopropanecarboxylate), tetraniliprole, thiacloprid, thiamethoxam, thiodicarb, thiosultap-sodium, tioxazafen (3-phenyl-5-(2-thienyl)-1,2,4-oxadiazole), tolfenpyrad, tralomethrin, triazamate, trichlorfon, triflumezopyrim (2,4-dioxo-1-(5-pyrimidinylmethyl)-3-[3-(trifluoromethyl)phenyl]-2H-pyrido[1,2-a]pyrimidinium inner salt), triflumuron, tyclopyrazoflor, zeta-cypermethrin, *Bacillus thuringiensis* delta-endotoxins, entomopathogenic bacteria, entomopathogenic viruses, and entomopathogenic fungi.

In some embodiments the additional pest control agent is selected from cyantraniliprole, acetamiprid, imidacloprid, spirotetramat, spirodiclofen, chlorantraniliprole, bifenthrin, indoxacarb, avermectin, *Bacillus* spp. and any active crystal proteins, bbprofezin, carbofuran, chlorfenapyr, chlorpyrifos, clothianidin, cyromazine, diafenthiuron, dinotefuran, emamectin benzoate, fipronil, flonicamid, fluhexafon, flupyradifurone, methomyl, methoxyfenozide, metronidazole, novaluron, permethrin, pyriproxifen, sulfoxaflor, thiamethoxam, γ-cyhalothrin, and ζ-cypermethrin.

In some embodiments the additional pest control agent is selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

In some embodiments, the disclosure is directed to aforesaid composition wherein component (a) is at least one compound of Formula I, or at least one compound of Formula II, or a combination of the foregoing compounds of Formula I and Formula II.

In some embodiments, the disclosure provides a composition comprising any of the compostions described above and at least one additional component selected from surfactants, solid diluent, and liquid diluents.

In one embodiment, this disclosure also provides a composition for controlling an invertebrate pest comprising the compositions disclosed herein and at least one additional component selected from surfactants, solid diluents, and liquid diluents, said composition further comprising at least one additional biologically active compound or agent.

In one embodiment, this disclosure is also directed to compositions comprising at least one compound of Formula I or at least one compound of Formula II selected from: N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-2H-indazole-4-carboxamide, N-[1,1-dimethyl-2-(methylsulfonyl)ethyl]-7-fluoro-2-(3-pyridinyl)-2H-indazole-4-carboxamide, N-(1-methylcyclopropyl)-2-(3-pyridinyl)-2H-indazole-4-carboxamide, and N-[1-(difluoromethyl)cyclopropyl]-2-(3-pyridinyl)-2H-indazole-4-carboxamide.

In one embodiment, this disclosure is also directed to compositions comprising at least one compound of Formula I selected from:

N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-2H-indazole-4-carboxamide, and N-[1,1-dimethyl-2-(methylsulfonyl)ethyl]-7-fluoro-2-(3-pyridinyl)-2H-indazole-4-carboxamide.

In one embodiment, this disclosure is also directed to compositions comprising at least one compound of Formula II selected from:

N-(1-methylcyclopropyl)-2-(3-pyridinyl)-2H-indazole-4-carboxamide, or N-[1-(difluoromethyl)cyclopropyl]-2-(3-pyridinyl)-2H-indazole-4-carboxamide.

In one embodiment, the compounds of Formula I and Formula II are those wherein the compound is selected from the compounds in index Table 1.

TABLE 1

| Compound | Compound Structure | Chemical name |
|---|---|---|
| 1 | 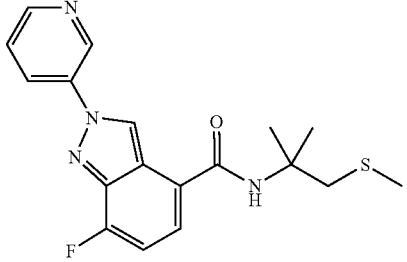 [SMILES: CSCC(C)(C)NC(=O)c1ccc(F)c2nn(-c3cccnc3)cc12] | N-[1,1-dimethyl-2-(methylthio)ethyl]-7-fluoro-2-(3-pyridinyl)-2H-indazole-4-carboxamide |
| 2 | 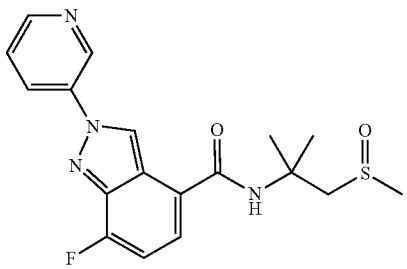 [SMILES: CS(=O)CC(C)(C)NC(=O)c1ccc(F)c2nn(-c3cccnc3)cc12] | N-[1,1-dimethyl-2-(methylsulfinyl)ethyl]-7-fluoro-2-(3-pyridinyl)-2H-indazole-4-carboxamide |
| 3 | 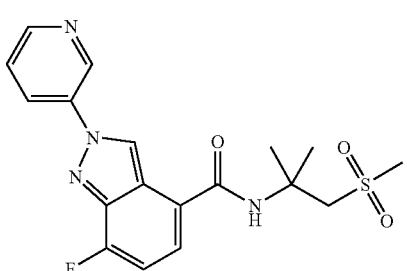 | N-[1,1-dimethyl-2-(methylsulfonyl)ethyl]-7-fluoro-2-(3-pyridinyl)-2H-indazole-4-carboxamide |
| 4 | 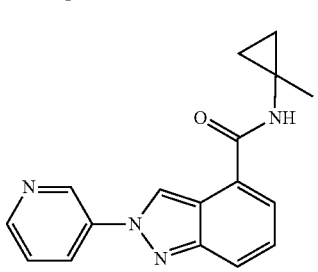 | N-(1-methylcyclopropyl)-2-(3-pyridinyl)-2H-indazole-4-carboxamide |
| 5 | 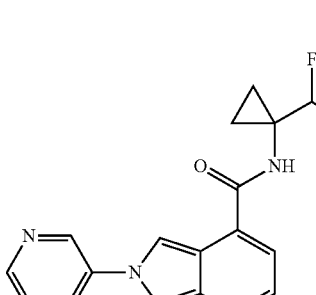 | N-[1-(difluoromethyl)cyclopropyl]-2-(3-pyridinyl)-2H-indazole-4-carboxamide | or combinations of compounds 1-5.

In one embodiment, the present disclosure also provides a composition comprising a compound of Formula I or a compound of Formula II, or a combination of any of the foregoing compounds.

In one embodiment, this disclosure also provides a composition comprising a compound of Formula I or a compound of Formula II, and at least one additional component selected from the group consisting of surfactants, solid diluents and liquid diluents.

In one embodiment, this disclosure also provides a composition for controlling an invertebrate pest comprising compound of Formula I or a compound of Formula II, and at least one additional component selected from surfactants, solid diluents and liquid diluents, said composition optionally further comprising at least one additional biologically active compound or agent.

In one embodiment, this disclosure also provides a composition for controlling an invertebrate pest comprising compound of Formula I or a compound of Formula II, or a combination of the foregoing compounds, and at least one additional biologically active compound or pest control agent.

In one embodiment, this disclosure also provides a composition for controlling an invertebrate pest comprising compound of Formula I, or a combination of the foregoing compounds and at least one additional biologically active compound or pest control agent.

In one embodiment, this disclosure also provides a composition for controlling an invertebrate pest comprising compound of Formula II and at least one additional biologically active compound or pest control agent.

In one embodiment, this disclosure provides a method for controlling an invertebrate pest comprising contacting the invertebrate pest or its environment with a biologically effective amount of a compound of Formula I or a compound of Formula II (e.g., as a composition described herein). This disclosure also relates to such method wherein the invertebrate pest or its environment is contacted with a composition comprising a biologically effective amount of a compound of Formula I or a compound of Formula II, and at least one additional component selected from the group consisting of surfactants, solid diluents and liquid diluents, said composition optionally further comprising a biologically effective amount of at least one additional biologically active compound or agent.

In one embodiment, this disclosure also relates to such method wherein the invertebrate pest or its environment is contacted with a composition comprising a biologically effective amount of a compound of Formula I or a compound of Formula II, and at least one additional biologically active compound or pest control agent.

In one embodiment, this disclosure also relates to such method wherein the invertebrate pest or its environment is contacted with a composition comprising a biologically effective amount of a compound of Formula I or a compound of Formula II, at least one additional biologically active compound or pest control agent and at least one additional component selected from the group consisting of surfactants, solid diluents and liquid diluents. In some embodiments, the environment is soil or plant foliage.

In one embodiment, this disclosure also provides a method for protecting a seed from an invertebrate pest comprising contacting the seed with a biologically effective amount of a compound of Formula I or a compound of Formula II or a combination of the foregoing compounds.

In one embodiment, this disclosure also provides a method for protecting a seed from an invertebrate pest comprising contacting the seed with a biologically effective amount of a compound of Formula I or a compound of Formula II, or a combination of the foregoing compounds and at least one additional biologically active compound or pest control agent.

In one embodiment, this disclosure also provides a method for protecting a seed from an invertebrate pest comprising contacting the seed with a biologically effective amount of a compound of Formula I or a compound of Formula II, or a combination of the foregoing compounds, at least one additional biologically active compound or pest control agent, and at least one additional component selected from the group consisting of surfactants, solid diluents and liquid diluents.

In some embodiments, the invertebrate pest is selected from the order Lepidoptera, Blattodea, Coleoptera, Dermaptera, Hemiptera, Homoptera, Acari, Orthoptera, Diptera, Thysanoptera, Hymenoptera, Isoptera, Thysanura, Mallophaga, Siphonoptera, Araneae, and Scutigeromorpha.

In some embodiments, the invertebrate pest is selected from the order Lepidoptera, Thrips and Hemiptera.

In some embodiments, the invertebrate pest is selected from silverleaf whitefly, corn plant hopper, western flower *thrips*, potato leafhopper, cotton melon aphid, root knot nematode, fall army worm and diamondback moth.

In one embodiment, the compositions as disclosed herein further comprise liquid fertilizer. In some embodiments, the liquid fertilizer is aqueous-based.

In one embodiment, this disclosure provides a soil drench formulation comprising the compositions disclosed herein.

In one embodiment, this disclosure provides a spray composition comprising the compositions disclosed herein. In some embodiments the spray composition further comprises a propellant.

In one embodiment, this disclosure provides a bait composition comprising the composition disclosed herein. In one embodiment, the bait composition further comprises one or more food materials. In one embodiment, the bait composition further comprises an attractant. In one embodiment, the bait composition further comprises a humectant.

In one embodiment, the compostions disclosed herein are solid compositions, such as dusts, powders, granules, pellets, prills, pastilles, tablets, or filled films. In some embodiments, the compositions disclosed herein are solid compositions and are water-dispersible or water-soluble.

In one embodiment, a liquid or dry formulation comprising the compositions as disclosed herein for use in a drip irrigation system, furrow during planting, handheld sprayer, backpack sprayer, boom sprayer, ground sprayer, aerial application, unmanned aerial vehicle, or a seed treatment.

In one embodiment, the compositions as disclosed herein for use in a drip irrigation system, furrow during planting, handheld sprayer, backpack sprayer, boom sprayer, ground sprayer, aerial application, unmanned aerial vehicle, or a seed treatment wherein said formulation is sprayed at an ultra-low volume.

In one embodiment, this disclosure also relates to the treated seed.

DETAILED DESCRIPTION

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claims. The term "consisting essentially of" occupies a middle ground between "comprising" and "consisting of".

Where applicants have defined an embodiment or a portion thereof with an open-ended term such as "comprising," it should be readily understood that (unless otherwise stated) the description should be interpreted to also describe such an embodiment using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As referred to in this disclosure, the term "invertebrate pest" includes arthropods, gastropods, nematodes and helminths of economic importance as pests. The term "arthropod" includes insects, mites, spiders, scorpions, centipedes, millipedes, pill bugs and symphylans. The term "gastropod" includes snails, slugs and other Stylommatophora. The term "nematode" includes members of the phylum Nematoda, such as phytophagous nematodes and helminth nematodes parasitizing animals. The term "helminth" includes all of the parasitic worms, such as roundworms (phylum Nematoda), heartworms (phylum Nematoda, class Secernentea), flukes (phylum Platyhelminthes, class Tematoda), acanthocephalans (phylum Acanthocephala), and tapeworms (phylum Platyhelminthes, class Cestoda).

In the context of this disclosure "invertebrate pest control" means inhibition of invertebrate pest development (including mortality, feeding reduction, and/or mating disruption), and related expressions are defined analogously.

The term "agronomic" refers to the production of field crops such as for food and fiber and includes the growth of maize or corn, soybeans and other legumes, rice, cereal (e.g., wheat, oats, barley, rye and rice), leafy vegetables (e.g., lettuce, cabbage, and other cole crops), fruiting vegetables (e.g., tomatoes, pepper, eggplant, crucifers and cucurbits), potatoes, sweet potatoes, grapes, cotton, tree fruits (e.g., pome, stone and citrus), small fruit (e.g., berries and cherries) and other specialty crops (e.g., canola, sunflower and olives).

The term "nonagronomic" refers to other than field crops, such as horticultural crops (e.g., greenhouse, nursery or ornamental plants not grown in a field), residential, agricultural, commercial and industrial structures, turf (e.g., sod farm, pasture, golf course, lawn, sports field, etc.), wood products, stored product, agro-forestry and vegetation management, public health (i.e. human) and animal health (e.g., domesticated animals such as pets, livestock and poultry, undomesticated animals such as wildlife) applications.

The term "crop vigor" refers to rate of growth or biomass accumulation of a crop plant. An "increase in vigor" refers to an increase in growth or biomass accumulation in a crop plant relative to an untreated control crop plant. The term "crop yield" refers to the return on crop material, in terms of both quantity and quality, obtained after harvesting a crop plant. An "increase in crop yield" refers to an increase in crop yield relative to an untreated control crop plant.

The term "biologically effective amount" refers to the amount of a biologically active compound (e.g., a compound of Formula I or a compound of Formula II and at least one additional biologically active compound or pest control agent) sufficient to produce the desired biological effect when applied to (i.e. contacted with) an invertebrate pest to be controlled or its environment, or to a plant, the seed from which the plant is grown, or the locus of the plant (e.g., growth medium) to protect the plant from injury by the invertebrate pest or for other desired effect (e.g., increasing plant vigor).

Embodiments of the present disclosure as described in the Summary include, but are not limited to those described below.

Embodiment 1. A compound of Formula I.

Embodiment 2. A compound of Formula I wherein n is 0, 1, or 2

Embodiment 3. A compound of Formula I wherein n is 0.

Embodiment 4. A compound of Formula I wherein n is 1.

Embodiment 5. A compound of Formula I wherein n is 2.

Embodiment 6. A compound of Formula II wherein R is $CH_3$, or $CF_2H$

Embodiment 7. A compound of Formula II wherein R is CH3.

Embodiment 8. A compound of Formula II wherein R is $CF_2H$.

Embodiment 9. A composition comprising at least one compound according to any one of Embodiments 1-8, or a combination of the foregoing compounds.

Embodiment 10. A composition according to any one of Embodiments 1-9, and at least one additional biologically active compound or pest control agent different from the compound of Formula I or Formula II.

Embodiment 11. A composition according to any one of Embodiments 1-10, and at least one additional component selected from surfactants, solid diluents and liquid diluents.

Embodiment 12. A composition according to any one of Embodiments 1-11, at least one additional biologically active compound or pest control agent, and at least one additional component selected from surfactants, solid diluents and liquid diluents.

Embodiment 13. A composition according to any one of Embodiments 9-12 wherein the compound of Formula I or II is selected from N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-2H-indazole-4-carboxamide, N-[1,1-dimethyl-2-(methylsulfonyl)ethyl]-7-fluoro-2-(3-pyridinyl)-2H-indazole-4-carboxamide, N-(1-methylcyclopropyl)-2-(3-pyridinyl)-2H-indazole-4-carboxamide, and N-[1-(difluoromethyl)cyclopropyl]-2-(3-pyridinyl)-2H-indazole-4-carboxamide; or a combination of any of the foregoing compounds.

Embodiment 14. A composition according to any one of Embodiments 9-12 wherein the compound of Formula I or II is selected from N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-

2H-indazole-4-carboxamide, and N-[1,1-dimethyl-2-(methylsulfonyl)ethyl]-7-fluoro-2-(3-pyridinyl)-2H-indazole-4-carboxamide.

Embodiment 15. A composition according to any one of Embodiments 9-12 wherein the compound of Formula I or II is selected from N-(1-methylcyclopropyl)-2-(3-pyridinyl)-2H-indazole-4-carboxamide, and N-[1-(difluoromethyl)cyclopropyl]-2-(3-pyridinyl)-2H-indazole-4-carboxamide.

Embodiment 16. A composition according to any one of Embodiments 10-15 wherein the pest control compound or agent is selected from an insecticide, fungicide, nematocide, and bactericide, or a combination of the foregoing.

Embodiment 17. A composition according to any one of Embodiments 10-16 wherein the pest control compound or agent is an insecticide.

Embodiment 18. A composition according to any one of Embodiments 10-16 wherein the pest control compound or agent is a fungicide.

Embodiment 17. A composition according to any one of Embodiments 10-16 wherein the pest control compound or agent is a nematocide.

Embodiment 18. A composition according to any one of Embodiments 10-16 wherein the pest control compound or agent is a bactericide.

Embodiment 19. A composition according to any one of Embodiments 10-18 wherein the at least one additional biologically active compound or agent is selected from abamectin, acephate, acequinocyl, acetamiprid, acrinathrin, acynonapyr, afidopyropen ([(3S,4R,4aR,6S,6aS,12R,12aS,12bS)-3-[(cyclopropylcarbonyl)oxy]-1,3,4,4a,5,6,6a,12,12a,12b-decahydro-6,12-dihydroxy-4,6a,12b-trimethyl-11-oxo-9-(3-pyridinyl)-2H,11H-naphtho[2,1-b]pyrano[3,4-e]pyran-4-yl]methyl cyclopropanecarboxylate), amidoflumet, amitraz, avermectin, azadirachtin, azinphos-methyl, benfuracarb, bensultap, benzpyrimoxan, bifenthrin, kappa-bifenthrin, bifenazate, bistrifluron, borate, broflanilide, buprofezin, cadusafos, carbaryl, carbofuran, cartap, carzol, chlorantraniliprole, chlorfenapyr, chlorfluazuron, chloroprallethrin, chlorpyrifos, chlorpyrifos-e, chlorpyrifos-methyl, chromafenozide, clofentezin, chloroprallethrin, clothianidin, cyantraniliprole (Cyazypyr™) (3-bromo-1-(3-chloro-2-pyridinyl)-N-[4-cyano-2-methyl-6-[(methylamino)carbonyl]phenyl]-1H-pyrazole-5-carboxamide), cyclaniliprole (3-bromo-N-[2-bromo-4-chloro-6-[[(1-cyclopropylethyl)amino]carbonyl]phenyl]-1-(3-chloro-2-pyridinyl)-1H-pyrazole-5-carboxamide), cyclobutrifluram, cycloprothrin, cycloxaprid ((5S,8R)-1-[(6-chloro-3-pyridinyl)methyl]-2,3,5,6,7,8-hexahydro-9-nitro-5,8-Epoxy-1H-imidazo[1,2-a]azepine), cyenopyrafen, cyetpyrafen, cyflumetofen, cyfluthrin, beta-cyfluthrin, cyhalodiamide, cyhalothrin, gamma-cyhalothrin, lambda-cyhalothrin, cypermethrin, alpha-cypermethrin, zeta-cypermethrin, cyromazine, deltamethrin, diafenthiuron, diazinon, dicloromezotiaz, dieldrin, diflubenzuron, dimefluthrin, dimehypo, dimethoate, dimpropyridaz, dinotefuran, diofenolan, DiPel® emamectin, emamectin benzoate, endosulfan, esfenvalerate, ethiprole, etofenprox, epsilon-metofluthrin, etoxazole, fenbutatin oxide, fenitrothion, fenothiocarb, fenoxycarb, fenpropathrin, fenvalerate, fipronil, flometoquin (2-ethyl-3,7-dimethyl-6-[4-(trifluoromethoxy)phenoxy]-4-quinolinyl methyl carbonate), flonicamid, fluazaindolizine, flubendiamide, flucythrinate, flufenerim, flufenoxuron, flufenoxystrobin (methyl (αE)-2-[[2-chloro-4-(trifluoromethyl)phenoxy]methyl]-α-(methoxymethylene)benzeneacetate), fluensulfone (5-chloro-2-[(3,4,4-trifluoro-3-buten-1-yl)sulfonyl]thiazole), fluhexafon, fluopyram, flupentiofenox, flupiprole (1-[2,6-dichloro-4-(trifluoromethyl)phenyl]-5-[(2-methyl-2-propen-1-yl)amino]-4-[(trifluoromethyl)sulfinyl]-1H-pyrazole-3-carbonitrile), flupyradifurone (4-[[(6-chloro-3-pyridinyl)methyl](2,2-difluoroethyl)amino]-2(5H)-furanone), flupyrimin, fluvalinate, tau-fluvalinate, fluxametamide, fonophos, formetanate, fosthiazate, gamma-cyhalothrin, halofenozide, heptafluthrin ([2,3,5,6-tetrafluoro-4-(methoxymethyl)phenyl]methyl 2,2-dimethyl-3-[(1Z)-3,3,3-trifluoro-1-propen-1-yl] cyclopropanecarboxylate), hexaflumuron, hexythiazox, hydramethylnon, imidacloprid, indoxacarb, insecticidal soaps, isofenphos, isocycloseram, kappa-tefluthrin, lambda-cyhalothrin, lufenuron, malathion, meperfluthrin ([2,3,5,6-tetrafluoro-4-(methoxymethyl)phenyl]methyl (1R,3S)-3-(2,2-dichloroethenyl)-2,2-dimethylcyclopropanecarboxylate), metaflumizone, metaldehyde, methamidophos, methidathion, methiocarb, methomyl, methoprene, methoxychlor, metofluthrin, methoxyfenozide, epsilon-metofluthrin, metronidazole epsilon-momfluorothrin, monocrotophos, monofluorothrin ([2,3,5,6-tetrafluoro-4-(methoxymethyl)phenyl]methyl 3-(2-cyano-1-propen-1-yl)-2,2-dimethylcyclopropanecarboxylate), nicofluprole, nicotine, nitenpyram, nithiazine, novaluron, noviflumuron, oxamyl, oxazosulfyl, parathion, parathion-methyl, permethrin, phorate, phosalone, phosmet, phosphamidon, pirimicarb, profenofos, profluthrin, propargite, protrifenbute, pyflubumide (1,3,5-trimethyl-N-(2-methyl-1-oxopropyl)-N-[3-(2-methylpropyl)-4-[2,2,2-trifluoro-1-methoxy-1-(trifluoromethyl)ethyl]phenyl]-1H-pyrazole-4-carboxamide), pymetrozine, pyrafluprole, pyrethrin, pyridaben, pyridalyl, pyrifluquinazon, pyriminostrobin (methyl (αE)-2-[[[2-[(2,4-dichlorophenyl)amino]-6-(trifluoromethyl)-4-pyrimidinyl]oxy]methyl]-α-(methoxymethylene)benzeneacetate), pydiflumetofen, pyriprole, pyriproxyfen, rotenone, ryanodine, silafluofen, spinetoram, spinosad, spirodiclofen, spiromesifen, spiropidion, spirotetramat, sulprofos, sulfoxaflor (N-[methyloxido[1-[6-(trifluoromethyl)-3-pyridinyl]ethyl]-$\lambda^4$-sulfanylidene]cyanamide), tebufenozide, tebufenpyrad, teflubenzuron, tefluthrin, kappa-tefluthrin, terbufos, tetrachlorantraniliprole, tetrachlorvinphos, tetramethrin, tetramethylfluthrin ([2,3,5,6-tetrafluoro-4-(methoxymethyl)phenyl]methyl 2,2,3,3-tetramethylcyclopropanecarboxylate), tetraniliprole, thiacloprid, thiamethoxam, thiodicarb, thiosultap-sodium, tioxazafen (3-phenyl-5-(2-thienyl)-1,2,4-oxadiazole), tolfenpyrad, tralomethrin, triazamate, trichlorfon, triflumezopyrim (2,4-dioxo-1-(5-pyrimidinylmethyl)-3-[3-(trifluoromethyl)phenyl]-2H-pyrido[1,2-a] pyrimidinium inner salt), triflumuron, tyclopyrazoflor, zeta-cypermethrin, *Bacillus thuringiensis* delta-endotoxins, entomopathogenic bacteria, entomopathogenic viruses, and entomopathogenic fungi.

Embodiment 20. A composition according to any one of Embodiments 10-19 wherein the at least one additional biologically active compound or pest control agent is selected from additional biologically active pest control compound or agent, wherein the at least one additional biologically active compound or agent is selected from cyantraniliprole, acetamiprid, imidacloprid, spirotetramat, spirodiclofen, chlorantraniliprole, bifenthrin, or indoxacarb. Avermectin, *Bacillus* spp., any active crystal proteins thereof, Buprofezin, Carbofuran, Chlorfenapyr, Chlorpyrifos, Clothianidin, Cyromazine, Diafenthiuron, Dinotefuran, Emamectin Benzoate, Fipronil, Flonicamid, Flupyradifurone, methomyl (Lannate®), Methoxyfenozide, Novaluron, Permethrin, Pyriproxifen, Sulfoxaflor, Thiamethoxam, γ-Cyhalothrin, or ζ-cypermethrin, broflanilide, dimpropyridaz, isocycloseram, tetrachlorantraniliprole, oxazosulfyl, tyclopyrazoflor, flupyrimin, spiropidion, acynonapyr, benzpyrimoxan, chloroprallethrin, epsilon-metofluthrin, kappa-bifenthrin, dicloromezotiaz, and kappa-tefluthrin.

Embodiment 21. A composition according to any one of Embodiments 10-20 wherein the at least one additional biologically active compound or agent is selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

Embodiment 22. A composition according to any one of Embodiments 10-21 wherein the compound of Formula I or Formula II is N-[1,1-dimethyl-2-(methylthio)ethyl]-7-fluoro-2-(3-pyridinyl)-2H-indazole-4-carboxamide and wherein the at least one additional biologically active compound or pest control agent is at least one selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

Embodiment 23. A composition according to any one of Embodiments 10-21 wherein the compound of Formula I or Formula II is N-[1,1-dimethyl-2-(methylsulfinyl)ethyl]-7-fluoro-2-(3-pyridinyl)-2H-indazole-4-carboxamide and wherein the at least one additional biologically active compound or pest control agent is at least one selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

Embodiment 24. A composition according to any one of Embodiments 10-21 wherein the compound of Formula I or Formula II is N-[1,1-dimethyl-2-(methylsulfonyl)ethyl]-7-fluoro-2-(3-pyridinyl)-2H-indazole-4-carboxamide and wherein the at least one additional biologically active compound or pest control agent is at least one selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

Embodiment 25. A composition according to any one of Embodiments 10-21 wherein the compound of Formula I or Formula II is N-(1-methylcyclopropyl)-2-(3-pyridinyl)-2H-indazole-4-carboxamide and wherein the at least one additional biologically active compound or pest control agent is at least one selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

Embodiment 26. A composition according to any one of Embodiments 10-21 wherein the compound of Formula I or Formula II is N-[1-(difluoromethyl)cyclopropyl]-2-(3-pyridinyl)-2H-indazole-4-carboxamide and wherein the at least one additional biologically active compound or pest control agent is at least one selected from cyantraniliprole, chlorpyrifos, DiPel®, acetamiprid, *Bacillus* spp, bifenthrin, buprofezin, chlorfenapyr, emamectin benzoate, fipronil, flonicamid, flupyradifurone, imidacloprid, methomyl, methoxyfenozide, novaluron, permethrin, spinetoram, spirotetramat, spirodiclofen, sulfoxaflor, tolfenpyrad, chlorantraniliprole, or indoxacarb.

Embodiment 27. A composition according to any one of Embodiments 10-26 wherein the weight ratio of the compound of Formula I or the compound of Formula II to the at least one additional biologically active compound or pest control agent component, is from 10000:1 to 1:50.

Embodiment 28. A composition according to any one of Embodiments 10-26 wherein the weight ratio of the compound of Formula I or the compound of Formula II to the at least one additional biologically active compound or pest control agent component, is from 100:1 to 1:10.

Embodiment 29. A composition according to any one of Embodiments 10-26 wherein the weight ratio of the compound of Formula I or the compound of Formula II to the at least one additional biologically active compound or pest control agent component, is from 1:50 to 5:1.

Embodiment 30. A composition according to any one of Embodiments 9-29 further comprising at least one additional component selected from surfactants, solid diluents, and liquid diluents.

Embodiment 31. A composition according to any one of Embodiments 9-30 further comprising a liquid fertilizer.

Embodiment 32. A composition according to Embodiment 31 wherein the liquid fertilizer is aqueous-based.

Embodiment 33. A soil drench formulation comprising the composition of any one of Embodiments 9-32.

Embodiment 34. A spray composition comprising the composition of any one of Embodiments 9-32.

Embodiment 35. A bait composition comprising the composition of any one of Embodiments 9-32.

Embodiment 36. A bait composition according to Embodiment 35 further comprising one or more food materials.

Embodiment 37. A bait composition according to Embodiment 35 or 36 further comprising an attractant.

Embodiment 38. A bait composition according to any one of Embodiments 35-37 further comprising a humectant.

Embodiment 39. A trap device for controlling an invertebrate pest, comprising the bait composition of any one of Embodiments 35-38 and a housing adapted to receive said bait composition, wherein the housing has at least one opening sized to permit the invertebrate pest to pass through the opening so the invertebrate pest can gain access to said bait composition from a location outside the housing, and wherein the housing is further adapted to be placed in or near a locus of potential or known activity for the invertebrate pest.

Embodiment 40. A composition according to any one of Embodiments 9-30 wherein the composition is a solid composition selected from dusts, powders, granules, pellets, prills, pastilles, tablets, and filled films.

Embodiment 41. A composition according to Embodiment 40 wherein the solid composition is water-dispersible or water-soluble.

Embodiment 42. A liquid or dry formulation comprising the composition of any one of Embodiments 9-32, or 40-41 for use in a drip irrigation system or furrow during planting.

Embodiment 42. A method for controlling an invertebrate pest comprising contacting the invertebrate pest or its environment with a biologically effective amount of a composition according to any one of Embodiments 9-32, or 40-41.

Embodiment 43. A method according to Embodiment 42 wherein the environment is soil or plant foliage.

Embodiment 44. A method according to Embodiment 42 or 43 wherein the invertebrate pest is selected from the order Lepidoptera, Blattodea, Coleoptera, Dermaptera, Hemiptera, Homoptera, Acari, Orthoptera, Diptera, Thysanoptera, Hymenoptera, Isoptera, Thysanura, Mallophaga, Siphonoptera, Araneae, and Scutigeromorpha.

Embodiment 45. A method according to Embodiment 44 wherein the invertebrate pest is selected from the order Lepidoptera, Thrips, and Hemiptera.

Embodiment 46. A method according to any one of Embodiments 42-45 wherein the invertebrate pest is selected from silverleaf whitefly, corn plant hopper, western flower *thrips*, potato leafhopper, cotton melon aphid, root knot nematode, fall army worm and diamondback moth.

Embodiment 47. A treated seed comprising the composition of any one of Embodiments 9-32, or 40-41 in an amount of from about 0.0001 to 1% by weight of the seed before treatment.

In all embodiments of this disclosure, component (b) is different from component (a) in the compositions disclosed herein.

Of note is that compositions of this disclosure are characterized by favorable metabolic and/or soil residual patterns and exhibit activity controlling a spectrum of agronomic and nonagronomic invertebrate pests.

Of particular note, for reasons of invertebrate pest control spectrum and economic importance, protection of agronomic crops from damage or injury caused by invertebrate pests by controlling invertebrate pests are embodiments of the disclosure. Compounds and compositions of this disclosure because of their favorable translocation properties or systemicity in plants also protect foliar or other plant parts which are not directly contacted with a compound of Formula I or a compound of Formula II or a composition comprising the compound.

Also noteworthy as embodiments of the present disclosure are compositions comprising components (a) and (b) (i.e. in biologically effective amounts) as described in any of the preceding Embodiments, as well as any other embodiments described herein, and any combinations thereof, further comprising at least one additional component selected from the group consisting of a surfactant, a solid diluent, and a liquid diluent, said compositions optionally further comprising at least one additional biologically active compound, and agent (i.e. in a biologically effective amount).

Embodiments of the disclosure also include a composition for protecting an animal comprising components (a) and (b) (i.e. in parasiticidally effective amounts) of any of the preceding Embodiments and a carrier.

Embodiments of the disclosure further include methods for controlling an invertebrate pest comprising contacting the invertebrate pest or its environment with a biologically effective amount of a composition of any of the preceding Embodiments. Of particular note is a method for protecting an animal comprising administering to the animal a parasiticidally effective amount of a composition of any of the preceding Embodiments.

Embodiments of the disclosure also include a composition comprising of any of the preceding Embodiments, in the form of a soil drench liquid formulation. Embodiments of the disclosure further include methods for controlling an invertebrate pest comprising contacting the soil with a liquid composition as a soil drench comprising a biologically effective amount of a composition of any of the preceding Embodiments.

Embodiments of the disclosure also include a spray composition for controlling an invertebrate pest comprising a biologically effective amount of a composition of any of the preceding Embodiments and a propellant. Embodiments of the disclosure further include a bait composition for controlling an invertebrate pest comprising a biologically effective amount of a composition of any of the preceding Embodiments, one or more food materials, optionally an attractant, and optionally a humectant. Embodiments of the disclosure also include a device for controlling an invertebrate pest comprising said bait composition and a housing adapted to receive said bait composition, wherein the housing has at least one opening sized to permit the invertebrate pest to pass through the opening so the invertebrate pest can gain access to said bait composition from a location outside the housing, and wherein the housing is further adapted to be placed in or near a locus of potential or known activity for the invertebrate pest.

Embodiments of the disclosure also include a method for protecting a seed from an invertebrate pest comprising contacting the seed with a biologically effective amount of a composition of any of the preceding Embodiments.

Embodiments of the disclosure also include methods for protecting an animal from an invertebrate parasitic pest comprising administering to the animal a parasiticidally effective amount of a composition of any of the preceding Embodiments.

Embodiments of the disclosure also include methods wherein the invertebrate pest or its environment is contacted with a biologically effective amount of a composition of any of the preceding Embodiments, and at least one additional component selected from the group consisting of surfactants, solid diluents and liquid diluents, said composition optionally further comprising a biologically effective amount of at least one additional biologically active compound or agent, provided that the methods are not methods of medical treatment of a human or animal body by therapy.

Embodiments of this disclosure also include use of an unmanned aerial vehicle (UAV) for the dispension of the compositions disclosed herein over a planted area. In some embodiments the planted area is a crop-containing area. In some embodiments, the crop is selected from a monocot or dicot. In some embodiments, the crop is selected form rice, corn, barley, soybean, wheat, vegetable, tobacco, tea tree, fruit tree and sugar cane. In some embodiments, the compositions disclosed herein are formulated for spraying at an ultra-low volume. Products applied by drones may use water or oil as the spray carrier. Typical spray volume (including product) used for drone applications globally. 5.0 liters/ha–100 liters/ha (approximately 0.5-10 gpa). This includes the range of ultra low spray volume (ULV) to low spray volume (LV). Although not common there may be situations where even lower spray volumes could be used as low as 1.0 liter/ha (0.1 gpa)

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Embodiments of the disclosure also include a composition comprising a compound of any of the preceding Embodiments, in the form of a soil drench liquid formulation. Embodiments of the disclosure further include methods for controlling an invertebrate pest comprising contacting the soil with a liquid composition as a soil drench comprising a biologically effective amount of a compound of any of the preceding Embodiments.

Embodiments of the disclosure also include a spray composition for controlling an invertebrate pest comprising a biologically effective amount of a compound or composition of any of the preceding Embodiments and a propellant. Embodiments of the disclosure further include a bait composition for controlling an invertebrate pest comprising a biologically effective amount of a compound or composition of any of the preceding Embodiments, one or more food materials, optionally an attractant, and optionally a humectant. Embodiments of the disclosure also include a device for controlling an invertebrate pest comprising said bait composition and a housing adapted to receive said bait composition, wherein the housing has at least one opening sized to permit the invertebrate pest to pass through the opening so the invertebrate pest can gain access to said bait composition from a location outside the housing, and wherein the housing is further adapted to be placed in or near a locus of potential or known activity for the invertebrate pest.

Embodiments of the disclosure also include methods for protecting a seed from an invertebrate pest comprising contacting the seed with a biologically effective amount of a compound or composition of any of the preceding Embodiments.

Embodiments of the disclosure also include methods for protecting an animal from an invertebrate parasitic pest comprising administering to the animal a parasiticidally effective amount of a compound or composition of any of the preceding Embodiments.

Embodiments of the disclosure also include methods for controlling an invertebrate pest comprising contacting the invertebrate pest or its environment with a biologically effective amount of a composition comprising at least one compound of Formula I or at least one compound of Formula II and at least one biologically active compound or pest control agent, provided that the methods are not methods of medical treatment of a human or animal body by therapy.

Embodiments of this disclosure also relates to such methods wherein the invertebrate pest or its environment is contacted with a composition comprising a biologically effective amount of compound of Formula I or at least one compound of Formula II, at least one biologically active compound or pest control agent, and at least one additional component selected from surfactants, solid diluents, and liquid diluents.

Compounds of Formula I or compounds of Formula II can be prepared by the following methods and variations as described in Schemes 1 and 2. The following abbreviations are used: DMF is N,N-dimethylformamide, DCC is N,N'-dicyclohexylcarbodiimide, and HATU is 1-[bis(dimethylamino)methylene]-1H-1,2,3-triazolo[4,5-b]pyridinium 3-oxid hexafluoro-phosphate.

The compound of Formula I can be prepared from Compound 6 by the method shown in Scheme 1. In this method, the compound of Formula I is prepared by an amide-bond-forming reaction of the carboxylic group of Compound 6 with the amine group of Compound 7a (when n is 0), 7b (when n is 1), or 7c (when n is 2), in the presence of an amide coupling reagent such as DCC or HATU.

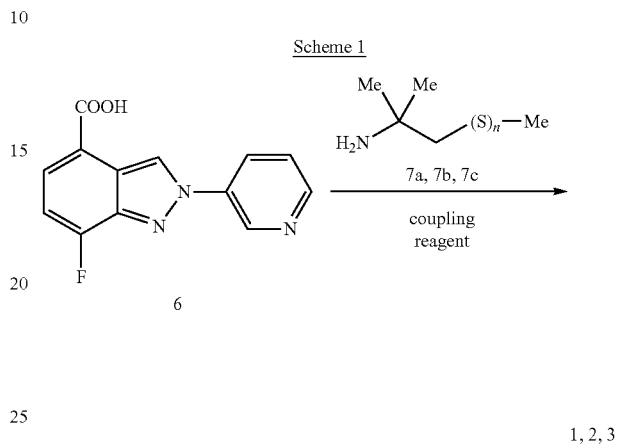

The compounds of Formula I wherein n is 1 or 2 (i.e. the sulfoxide, Compound 2, or the sulfone, Compound 3, respectively) can be prepared by oxidation of the sulfide (Compound 1). A variety of methods and reagents are known in the art for oxidizing sulfides to sulfoxides and sulfones. Examples of such oxidizing reagents include meta-chloroperoxybenzoic acid and sodium periodate.

Compounds according to Formula II can be prepared from Compound 8 by the method shown in Scheme 2. In this method, Compound 4 is prepared by an amide forming reaction of the of the carboxyl group of Compound 8—with the amine group of Compound 9 in the presence of an amide coupling reagent such as DCC or HATU. For representative reagents and reaction conditions, see Jones, J. *The Chemical Synthesis of Peptides*, International Series of Monographs on Chemistry, Oxford University: Oxford, 1994.

Scheme 2

Similar to Compound 4, Compound 5—can be prepared from Compound 8 by the method shown in Scheme 3. In this method, Compound 5 is prepared by an amide-bond-forming reaction of the carboxyl group of Compound 8—with the amine group of Compound 10 in the presence of an amide coupling reagent such as DCC or HATU.

Scheme 3

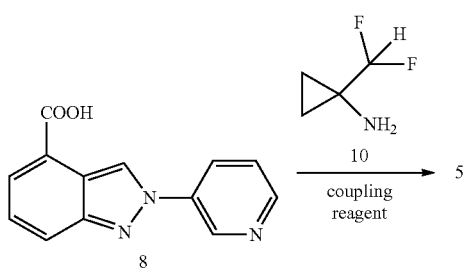

Compound 8 (CAS Registry Number 2001277-98-9) is known in the art.

It is recognized that some reagents and reaction conditions described above for preparing compounds of Formula I or compounds of Formula II may not be compatible with certain functionalities present in the intermediates. In these instances, the incorporation of protection/deprotection sequences or functional group interconversions into the synthesis will aid in obtaining the desired products. The use and choice of the protecting groups will be apparent to one skilled in chemical synthesis (see, for example, Greene, T. W.; Wuts, P. G. M. *Protective Groups in Organic Synthesis*, 2nd ed.; Wiley: New York, 1991). One skilled in the art will recognize that, in some cases, after introduction of the reagents depicted in the individual schemes, additional routine synthetic steps not described in detail may be needed to complete the synthesis of compounds of Formula I or compounds of Formula II. One skilled in the art will also recognize that it may be necessary to perform a combination of the steps illustrated in the above schemes in an order other than that implied by the particular sequence presented to prepare compounds of Formula I or compounds of Formula II.

One skilled in the art will also recognize that compounds of Formula I or compounds of Formula II and the intermediates described herein can be subjected to various electrophilic, nucleophilic, radical, organometallic, oxidation, and reduction reactions to add substituents or modify existing substituents.

Without further elaboration, it is believed that one skilled in the art using the preceding description can utilize the present disclosure to its fullest extent. The following Synthesis Examples are, therefore, to be construed as merely illustrative, and not limiting of the disclosure in any way whatsoever. Steps in the following Synthesis Examples illustrate a procedure for each step in an overall synthetic transformation, and the starting material for each step may not have necessarily been prepared by a particular preparative run whose procedure is described in other Examples or Steps. Percentages are by weight except for chromatographic solvent mixtures or where otherwise indicated. Parts and percentages for chromatographic solvent mixtures are by volume unless otherwise indicated. $^1$H NMR spectra are reported in ppm downfield from tetramethylsilane; "s" means singlet, "d" means doublet, "t" means triplet, "q" means quartet, "m" means multiplet, "dd" means doublet of doublets, "dt" means doublet of triplets, "br s" means broad singlet. DMF means N,N-dimethylformamide. Compound numbers refer to Index Table 1.

Synthesis Example 1

Preparation of N-[1,1-dimethyl-2-(methylthio)ethyl]-7-fluoro-2-(3-pyridinyl)-2H-indazole-4-carboxamide (Compound 1) (N-[1,1-dimethyl-2-(methylsulfinyl)ethyl]-7-fluoro-2-(3-pyridinyl)-2H-indazole-4-carboxamide) (Compound 2), and (N-[1,1-dimethyl-2-(methylsulfonyl)ethyl]-7-fluoro-2-(3-pyridinyl)-2H indazole-4-carboxamide (Compound 3)

Step A: Preparation of N-[1,1-dimethyl-2-(methylthio)ethyl]-7-fluoro-2-(3-pyridinyl)-2H-indazole-4-carboxamide (Compound 1)

A solution of 7-fluoro-2-(3-pyridinyl)-2H-indazole-4-carboxylic acid (10 g, 39 mmol), HATU (17.7 g, 47 mmol), 2-methyl-1-methylsulfanyl-propan-2-amine (7 g, 58 mmol) in DMF (100 mL) was treated with triethylamine (16 mL, 117 mmol). The reaction mixture was stirred for 4 hours at room temperature. The reaction mixture was diluted with EtOAc (300 mL) and washed with water (6×100 mL). The organic layer was separated and concentrated in vacuo. The resulting crude solid was purified via normal phase chromatography (silica gel eluted with 70-100% EtOAc in hexane) to yield the title compound, a compound of this disclosure (9.9 g, 71% yield). $^1$H NMR (500 MHz, DMSO-d$_6$) δ ppm 9.37-9.43 (m, 2H), 8.69-8.72 (m, 1H), 8.56-8.60 (m, 1H), 8.00 (s, 1H), 7.64-7.70 (m, 2H), 7.22-7.27 (m, 1H), 3.11 (s, 2H), 2.09 (s, 3H), 1.47 (s, 6H).

Compound 2 (N-[1,1-dimethyl-2-(methylsulfinyl)ethyl]-7-fluoro-2-(3-pyridinyl)-2H-indazole-4-carboxamide), and Compound 3 (N-[1,1-dimethyl-2-(methylsulfonyl)ethyl]-7-fluoro-2-(3-pyridinyl)-2H indazole-4-carboxamide, can each be prepared via oxidation of Compound 1.

Synthesis Example 2

Preparation of N-(1-methylcyclopropyl)-2-(3-pyridinyl)-2H-indazole-4-carboxamide (Compound 4) and N-[1-(difluoromethyl)cyclopropyl]-2-(3-pyridinyl)-2H-indazole-4-carboxamide (Compound 5)

Step A: Preparation of N-[1-(difluoromethyl)cyclopropyl]-2-(3-pyridinyl)-2H-indazole-4-carboxamide (Compound 5)

A solution of 2-(3-pyridinyl)-2H-indazole-4-carboxylic acid (100 mg, 0.42 mmol, CAS Registry Number 2001277-98-9), HATU (190 mg, 0.5 mmol), 1-(difluoromethyl)cyclopropanamine hydrochloride (71 mg, 0.5 mmol) in DMF (2 mL) was treated with triethylamine (174 mL, 1.25 mmol). The reaction mixture was stirred overnight at room temperature. The reaction mixture was then purified directly via reverse phase column chromatography [C18 column eluted with 10%-100% MeCN/MeOH (1:1) to water] to yield the title compound, a compound of this disclosure (105 mg, 76% yield). $^1$H NMR (500 MHz, DMSO-d$_6$) δ ppm 9.35-9.39 (m, 2H) 9.14 (s, 1H) 8.67-8.68 (m, 1H) 8.55-8.58 (m, 1H) 7.94-7.97 (m, 1H), 7.73-7.75 (m, 1H), 7.63-7.67 (m, 1H), 7.41-7.45 (m, 1H), 6.21 (t, 1H), 1.13-1.17 (m, 2H), 1.02-1.06 (m, 2H). Compound 4 was prepared as described for Compound 5, but 1-(difluoromethyl)cyclopropranamine hydrochloride was replaced with 1-methylcyclopropanamine hydrochloride.

A composition of this disclosure will generally be used as an invertebrate pest control active ingredient in a composition, i.e. formulation, with at least one additional component selected from the group consisting of surfactants, solid diluents, and liquid diluents, which serves as a carrier. The formulation or composition ingredients are selected to be consistent with the physical properties of the active ingredient, mode of application and environmental factors such as soil type, moisture and temperature.

Useful formulations include both liquid and solid compositions. Liquid compositions include solutions (including emulsifiable concentrates), suspensions, emulsions (including microemulsions, oil in water emulsions, flowable concentrates and/or suspoemulsions) and the like, which optionally can be thickened into gels. The general types of aqueous liquid compositions are soluble concentrate, suspension concentrate, capsule suspension, concentrated emulsion, microemulsion, oil in water emulsion, flowable concentrate and suspoemulsion. The general types of nonaqueous liquid compositions are emulsifiable concentrate, microemulsifiable concentrate, dispersible concentrate and oil dispersion.

The general types of solid compositions are dusts, powders, granules, pellets, prills, pastilles, tablets, filled films (including seed coatings) and the like, which can be water-dispersible ("wettable") or water-soluble. Films and coatings formed from film-forming solutions or flowable suspensions are particularly useful for seed treatment. Active ingredient can be (micro)encapsulated and further formed into a suspension or solid formulation; alternatively the entire formulation of active ingredient can be encapsulated (or "overcoated"). Encapsulation can control or delay release of the active ingredient. An emulsifiable granule combines the advantages of both an emulsifiable concentrate formulation and a dry granular formulation. High-strength compositions are primarily used as intermediates for further formulation.

Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about one to several thousand liters per hectare, but more typically are in the range from about ten to several hundred liters per hectare. Sprayable formulations can be tank mixed with water or another suitable medium for foliar treatment by aerial or ground application, or for application to the growing medium of the plant. Liquid and dry formulations can be metered directly into drip irrigation systems or metered into the furrow during planting. Liquid and solid formulations can be applied onto seeds of crops and other desirable vegetation as seed treatments before planting to protect developing roots and other subterranean plant parts and/or foliage through systemic uptake.

One way of dispensing the compositions disclosed herein over a target area, such as, but not limited to a crop-containing field, is by using drones. Use of drones or unmanned aerial vehicles (UAVs) in agricultural applications, such as for treating fields with chemical products, is rapidly expanding. A container of chemical products is coupled to the UAV and a material dispensing system mounted to the UAV, and the UAV is piloted above the area to be treated while the chemical product is dispensed.

Formulations will typically contain effective amounts of active ingredient, diluent and surfactant within the following approximate ranges which add up to 100 percent by weight.

|  | Weight Percent | | |
| --- | --- | --- | --- |
|  | Active Ingredient | Diluent | Surfactant |
| Water-Dispersible and Water-soluble Granules, Tablets and Powders | 0.001-90 | 0-99.999 | 0-15 |
| Oil Dispersions, Suspensions, Emulsions, Solutions (including Emulsifiable Concentrates) | 1-50 | 40-99 | 0-50 |
| Dusts | 1-25 | 70-99 | 0-5 |
| Granules and Pellets | 0.001-95 | 5-99.999 | 0-15 |
| High Strength Compositions | 90-99 | 0-10 | 0-2 |

Solid diluents include, for example, clays such as bentonite, montmorillonite, attapulgite and kaolin, gypsum, cellulose, titanium dioxide, zinc oxide, starch, dextrin, sugars (e.g., lactose, sucrose), silica, talc, mica, diatomaceous earth, urea, calcium carbonate, sodium carbonate and bicarbonate, and sodium sulfate. Typical solid diluents are described in Watkins et al., *Handbook of Insecticide Dust Diluents and Carriers,* 2nd Ed., Dorland Books, Caldwell, New Jersey.

Liquid diluents include, for example, water, N,N-dimethylalkanamides (e.g., N,N-dimethylformamide), limonene, dimethyl sulfoxide, N-alkylpyrrolidones (e.g., N-methylpyrrolidinone), alkyl phosphates (e.g., triethylphosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters alkyl and aryl benzoates, γ-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically $C_6$-$C_{22}$), such as plant seed and fruit oils (e.g., oils of olive, castor, linseed, sesame, corn (maize), peanut, sunflower, grapeseed, safflower, cottonseed, soybean, rapeseed, coconut and palm kernel), animal-sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, *Solvents Guide,* 2nd Ed., Interscience, New York, 1950.

The solid and liquid compositions of the present disclosure often include one or more surfactants. When added to a liquid, surfactants (also known as "surface-active agents") generally modify, most often reduce, the surface tension of the liquid. Depending on the nature of the hydrophilic and lipophilic groups in a surfactant molecule, surfactants can be useful as wetting agents, dispersants, emulsifiers or defoaming agents.

Surfactants can be classified as nonionic, anionic or cationic. Nonionic surfactants useful for the present compositions include, but are not limited to: alcohol alkoxylates such as alcohol alkoxylates based on natural and synthetic alcohols (which may be branched or linear) and prepared from the alcohols and ethylene oxide, propylene oxide, butylene oxide or mixtures thereof; amine ethoxylates, alkanolamides and ethoxylated alkanolamides; alkoxylated triglycerides such as ethoxylated soybean, castor and rapeseed oils; alkylphenol alkoxylates such as octylphenol ethoxylates, nonylphenol ethoxylates, dinonyl phenol ethoxylates and dodecyl phenol ethoxylates (prepared from the phenols and ethylene oxide, propylene oxide, butylene oxide or mixtures thereof); block polymers prepared from ethylene oxide or propylene oxide and reverse block polymers where the terminal blocks are prepared from propylene oxide; ethoxylated fatty acids; ethoxylated fatty esters and oils; ethoxylated methyl esters; ethoxylated tristyrylphenol (including those prepared from ethylene oxide, propylene oxide, butylene oxide or mixtures thereof); fatty acid esters, glycerol esters, lanolin-based derivatives, polyethoxylate esters such as polyethoxylated sorbitan fatty acid esters, polyethoxylated sorbitol fatty acid esters and polyethoxylated glycerol fatty acid esters; other sorbitan derivatives such as sorbitan esters; polymeric surfactants such as random copolymers, block copolymers, alkyd peg (polyethylene glycol) resins, graft or comb polymers and star polymers; polyethylene glycols (pegs); polyethylene glycol fatty acid esters; silicone-based surfactants; and sugar-derivatives such as sucrose esters, alkyl polyglycosides and alkyl polysaccharides.

Useful anionic surfactants include, but are not limited to: alkylaryl sulfonic acids and their salts; carboxylated alcohol or alkylphenol ethoxylates; diphenyl sulfonate derivatives; lignin and lignin derivatives such as lignosulfonates; maleic or succinic acids or their anhydrides; olefin sulfonates; phosphate esters such as phosphate esters of alcohol alkoxylates, phosphate esters of alkylphenol alkoxylates and phosphate esters of styryl phenol ethoxylates; protein-based surfactants; sarcosine derivatives; styryl phenol ether sulfate; sulfates and sulfonates of oils and fatty acids; sulfates and sulfonates of ethoxylated alkylphenols; sulfates of alcohols; sulfates of ethoxylated alcohols; sulfonates of amines and amides such as N,N-alkyltaurates; sulfonates of benzene, cumene, toluene, xylene, and dodecyl and tridecylbenzenes; sulfonates of condensed naphthalenes; sulfonates of naphthalene and alkyl naphthalene; sulfonates of fractionated petroleum; sulfosuccinamates; and sulfosuccinates and their derivatives such as dialkyl sulfosuccinate salts.

Useful cationic surfactants include, but are not limited to: amides and ethoxylated amides; amines such as N-alkyl propanediamines, tripropylenetriamines and dipropylenetetramines, and ethoxylated amines, ethoxylated diamines and propoxylated amines (prepared from the amines and ethylene oxide, propylene oxide, butylene oxide or mixtures thereof); amine salts such as amine acetates and diamine salts; quaternary ammonium salts such as quaternary salts, ethoxylated quaternary salts and diquaternary salts; and amine oxides such as alkyldimethylamine oxides and bis-(2-hydroxyethyl)-alkylamine oxides.

Also useful for the present compositions are mixtures of nonionic and anionic surfactants or mixtures of nonionic and cationic surfactants. Nonionic, anionic and cationic surfactants and their recommended uses are disclosed in a variety of published references including *McCutcheon's Emulsifiers and Detergents*, annual American and International Editions published by McCutcheon's Division, The Manufacturing Confectioner Publishing Co.; Sisely and Wood, *Encyclopedia of Surface Active Agents*, Chemical Publ. Co., Inc., New York, 1964; and A. S. Davidson and B. Milwidsky, *Synthetic Detergents*, Seventh Edition, John Wiley and Sons, New York, 1987.

Compositions of this disclosure may also contain formulation auxiliaries and additives, known to those skilled in the art as formulation aids (some of which may be considered to also function as solid diluents, liquid diluents or surfactants). Such formulation auxiliaries and additives may control: pH (buffers), foaming during processing (antifoams such polyorganosiloxanes), sedimentation of active ingredients (suspending agents), viscosity (thixotropic thickeners), in-container microbial growth (antimicrobials), product freezing (antifreezes), color (dyes/pigment dispersions), wash-off (film formers or stickers), evaporation (evaporation retardants), and other formulation attributes. Film formers include, for example, polyvinyl acetates, polyvinyl acetate copolymers, polyvinylpyrrolidone-vinyl acetate copolymer, polyvinyl alcohols, polyvinyl alcohol copolymers and waxes. Examples of formulation auxiliaries and additives include those listed in *McCutcheon's Volume 2: Functional Materials*, annual International and North American editions published by McCutcheon's Division, The Manufacturing Confectioner Publishing Co.; and PCT Publication WO 03/024222.

Compositions disclosed herein comprising compounds of Formula I or compounds of Formula II and any other active ingredients are typically incorporated into the present compositions by dissolving the active ingredient in a solvent or by grinding in a liquid or dry diluent. Solutions, including emulsifiable concentrates, can be prepared by simply mixing the ingredients. If the solvent of a liquid composition intended for use as an emulsifiable concentrate is water-immiscible, an emulsifier is typically added to emulsify the active-containing solvent upon dilution with water. Active ingredient slurries, with particle diameters of up to 2,000 μm can be wet milled using media mills to obtain particles with average diameters below 3 μm. Aqueous slurries can be made into finished suspension concentrates (see, for example, U.S. Pat. No. 3,060,084) or further processed by spray drying to form water-dispersible granules. Dry formulations usually require dry milling processes, which produce average particle diameters in the 2 to 10 μm range. Dusts and powders can be prepared by blending and usually grinding (such as with a hammer mill or fluid-energy mill). Granules and pellets can be prepared by spraying the active material upon preformed granular carriers or by agglomeration techniques. See Browning, "Agglomeration", *Chemical Engineering*, Dec. 4, 1967, pp 147-48, *Perry's Chemical Engineer's Handbook,* 4th Ed., McGraw-Hill, New York, 1963, pages 8-57 and following, and WO 91/13546. Pellets can be prepared as described in U.S. Pat. No. 4,172,714. Water-dispersible and water-soluble granules can be prepared as taught in U.S. Pat. Nos. 4,144,050, 3,920,442 and DE 3,246,493. Tablets can be prepared as taught in U.S. Pat. Nos. 5,180,587, 5,232,701 and 5,208,030. Films can be prepared as taught in GB 2,095,558 and U.S. Pat. No. 3,299,566.

For further information regarding the art of formulation, see T. S. Woods, "The Formulator's Toolbox—Product Forms for Modern Agriculture" in *Pesticide Chemistry and Bioscience, The Food-Environment Challenge*, T. Brooks and T. R. Roberts, Eds., Proceedings of the 9th International Congress on Pesticide Chemistry, The Royal Society of Chemistry, Cambridge, 1999, pp. 120-133. See also U.S. Pat. No. 3,235,361, Col. 6, line 16 through Col. 7, line 19 and Examples 10-41; U.S. Pat. No. 3,309,192, Col. 5, line 43 through Col. 7, line 62 and Examples 8, 12, 15, 39, 41, 52, 53, 58, 132, 138-140, 162-164, 166, 167 and 169-182; U.S. Pat. No. 2,891,855, Col. 3, line 66 through Col. 5, line 17 and Examples 1-4; Klingman, *Weed Control as a Science*, John Wiley and Sons, Inc., New York, 1961, pp 81-96; Hance et al., *Weed Control Handbook,* 8th Ed., Blackwell Scientific Publications, Oxford, 1989; and *Developments in formulation technology*, PJB Publications, Richmond, U K, 2000.

In the following Examples, all formulations are prepared in conventional ways. "Active ingredients" refers to the aggregate of biologically active compounds or agents consisting of invertebrate pest control agents selected from the at least one additional pest control agent or compound of (b) in combination with at least one compound of Formula I or Formula II, or a combination of one or more compounds of each of Formula I and II. "Active ingredients" can also refer to at least one compound of Formula I or Formula II, or a combination of one or more compounds of each of Formula I and II, in addition to at least one additional biologically active compound, such as an insecticide, fungicide, nematocide or bactericide. Without further elaboration, it is believed that one skilled in the art using the preceding description can utilize the present disclosure to its fullest extent. The following Examples are, therefore, to be construed as merely illustrative, and not limiting of the disclosure in any way whatsoever. Percentages are by weight except where otherwise indicated.

Example A

High Strength Concentrate

| | |
|---|---|
| active ingredients | 98.5% |
| silica aerogel | 0.5% |
| synthetic amorphous fine silica | 1.0% |

Example B

Wettable Powder

| | |
|---|---|
| active ingredients | 65.0% |
| dodecylphenol polyethylene glycol ether | 2.0% |
| sodium ligninsulfonate | 4.0% |
| sodium silicoaluminate | 6.0% |
| montmorillonite (calcined) | 23.0% |

Example C

Granule

| | |
|---|---|
| active ingredients | 10.0% |
| attapulgite granules (low volatile matter, 0.71/0.30 mm; U.S.S. No. 25-50 sieves) | 90.0% |

Example D

Extruded Pellet

| | |
|---|---|
| active ingredients | 25.0% |
| anhydrous sodium sulfate | 10.0% |
| crude calcium ligninsulfonate | 5.0% |
| sodium alkylnaphthalenesulfonate | 1.0% |
| calcium/magnesium bentonite | 59.0% |

Example E

Emulsifiable Concentrate

| | |
|---|---|
| active ingredients | 10.0% |
| polyoxyethylene sorbitol hexoleate | 20.0% |
| $C_6$-$C_{10}$ fatty acid methyl ester | 70.0% |

Example F

Microemulsion

| | |
|---|---|
| active ingredients | 5.0% |
| polyvinylpyrrolidone-vinyl acetate copolymer | 30.0% |
| alkylpoly glycoside | 30.0% |
| glyceryl monooleate | 15.0% |
| water | 20.0% |

Example G

Seed Treatment

| | |
|---|---|
| active ingredients | 20.00% |
| polyvinylpyrrolidone-vinyl acetate copolymer | 5.00% |
| montan acid wax | 5.00% |
| calcium ligninsulfonate | 1.00% |
| polyoxyethylene/polyoxypropylene block copolymers | 1.00% |
| stearyl alcohol (POE 20) | 2.00% |
| polyorganosilane | 0.20% |
| colorant red dye | 0.05% |
| water | 65.75% |

Example H

Fertilizer Stick

| | |
|---|---|
| active ingredients | 2.5% |
| pyrrolidone-styrene copolymer | 4.8% |
| tristyrylphenyl 16-ethoxylate | 2.3% |
| talc | 0.8% |
| corn starch | 5.0% |
| slow-release fertilizer | 36.0% |
| kaolin | 38.0% |
| water | 10.6% |

Example I

Suspension Concentrate

| | |
|---|---|
| active ingredients | 35% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |

-continued

| | |
|---|---|
| propylene glycol | 5.0% |
| silicone based defoamer | 0.1% |
| 1,2-benzisothiazolin-3-one | 0.1% |
| water | 53.7% |

Example J

Emulsion in Water

| | |
|---|---|
| active ingredients | 10.0% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-benzisothiazolin-3-one | 0.1% |
| aromatic petroleum based hydrocarbon | 20.0 |
| water | 58.7% |

Example K

Oil Dispersion

| | |
|---|---|
| active ingredients | 25% |
| polyoxyethylene sorbitol hexaoleate | 15% |
| organically modified bentonite clay | 2.5% |
| fatty acid methyl ester | 57.5% |

Example L

Suspoemulsion

| | |
|---|---|
| active ingredients | 10.0% |
| imidacloprid | 5.0% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-benzisothiazolin-3-one | 0.1% |
| aromatic petroleum based hydrocarbon | 20.0% |
| water | 53.7% |

Compositions of this disclosure exhibit activity against a wide spectrum of invertebrate pests. These pests include invertebrates inhabiting a variety of environments such as, for example, plant foliage, roots, soil, harvested crops or other foodstuffs, building structures or animal integuments. These pests include, for example, invertebrates feeding on foliage (including leaves, stems, flowers and fruits), seeds, wood, textile fibers or animal blood or tissues, and thereby causing injury or damage to, for example, growing or stored agronomic crops, forests, greenhouse crops, ornamentals, nursery crops, stored foodstuffs or fiber products, or houses or other structures or their contents, or being harmful to animal health or public health. Those skilled in the art will appreciate that not all compounds are equally effective against all growth stages of all pests.

These present compositions are thus useful agronomically for protecting field crops from phytophagous invertebrate pests, and also nonagronomically for protecting other horticultural crops and plants from phytophagous invertebrate pests. This utility includes protecting crops and other plants (i.e. both agronomic and nonagronomic) that contain genetic material introduced by genetic engineering (i.e. transgenic) or modified by mutagenesis to provide advantageous traits. Examples of such traits include tolerance to herbicides, resistance to phytophagous pests (e.g., insects, mites, aphids, spiders, nematodes, snails, plant-pathogenic fungi, bacteria and viruses), improved plant growth, increased tolerance of adverse growing conditions such as high or low temperatures, low or high soil moisture, and high salinity, increased flowering or fruiting, greater harvest yields, more rapid maturation, higher quality and/or nutritional value of the harvested product, or improved storage or process properties of the harvested products. Transgenic plants can be modified to express multiple traits. Examples of plants containing traits provided by genetic engineering or mutagenesis include varieties of corn, cotton, soybean and potato expressing an insecticidal Bacillus thuringiensis toxin such as YIELD GARD®, KNOCKOUT©, STARLINK®, BOLLGARD®, NuCOTN® and NEWLEAF®, INVICTA RR2 PRO™, and herbicide-tolerant varieties of corn, cotton, soybean and rapeseed such as ROUNDUP READY®, LIBERTY LINK®, IMI®, STS® and CLEARFIELD®, as well as crops expressing N-acetyltransferase (GAT) to provide resistance to glyphosate herbicide, or crops containing the HRA gene providing resistance to herbicides inhibiting acetolactate synthase (ALS). The present compositions may interact synergistically with traits introduced by genetic engineering or modified by mutagenesis, thus enhancing phenotypic expression or effectiveness of the traits or increasing the invertebrate pest control effectiveness of the present compounds and compositions. In particular, the present compositions may interact synergistically with the phenotypic expression of proteins or other natural products toxic to invertebrate pests to provide greater-than-additive control of these pests, i.e. produce a combined effect greater than the sum of their separate effects.

Compositions of this disclosure can also optionally comprise plant nutrients, e.g., a fertilizer composition comprising at least one plant nutrient selected from nitrogen, phosphorus, potassium, sulfur, calcium, magnesium, iron, copper, boron, manganese, zinc, and molybdenum. Of note are compositions comprising at least one fertilizer composition comprising at least one plant nutrient selected from nitrogen, phosphorus, potassium, sulfur, calcium and magnesium. Compositions of the present disclosure which further comprise at least one plant nutrient can be in the form of liquids or solids. Of note are solid formulations in the form of granules, small sticks or tablets. Solid formulations comprising a fertilizer composition can be prepared by mixing the compound or composition of the present disclosure with the fertilizer composition together with formulating ingredients and then preparing the formulation by methods such as granulation or extrusion. Alternatively solid formulations can be prepared by spraying a solution or suspension of a compound or composition of the present disclosure in a volatile solvent onto a previous prepared fertilizer composition in the form of dimensionally stable mixtures, e.g., granules, small sticks or tablets, and then evaporating the solvent.

Nonagronomic uses refer to invertebrate pest control in the areas other than fields of crop plants. Nonagronomic uses of the present compositions include control of invertebrate pests in stored grains, beans and other foodstuffs, and in textiles such as clothing and carpets. Nonagronomic uses of the present compositions also include invertebrate pest control in ornamental plants, forests, in yards, along roadsides and railroad rights of way, and on turf such as lawns, golf courses and pastures. Nonagronomic uses of the present compositions also include invertebrate pest control in houses and other buildings which may be occupied by humans and/or companion, farm, ranch, zoo or other animals. Nonagronomic uses of the present compositions also include the control of pests such as termites that can damage wood or other structural materials used in buildings.

Nonagronomic uses of the present compositions also include protecting human and animal health by controlling invertebrate pests that are parasitic or transmit infectious diseases. The controlling of animal parasites includes controlling external parasites that are parasitic to the surface of the body of the host animal (e.g., shoulders, armpits, abdomen, inner part of the thighs) and internal parasites that are parasitic to the inside of the body of the host animal (e.g., stomach, intestine, lung, veins, under the skin, lymphatic tissue). External parasitic or disease transmitting pests include, for example, chiggers, ticks, lice, mosquitoes, flies, mites and fleas. Internal parasites include heartworms, hookworms and helminths. of the present disclosure are suitable for systemic and/or non-systemic control of infestation or infection by parasites on animals. Compositions of the present disclosure are particularly suitable for combating external parasitic or disease transmitting pests. Compositions of the present disclosure are suitable for combating parasites that infest agricultural working animals, such as cattle, sheep, goats, horses, pigs, donkeys, camels, buffalos, rabbits, hens, turkeys, ducks, geese and bees; pet animals and domestic animals such as dogs, cats, pet birds and aquarium fish; as well as so-called experimental animals, such as hamsters, guinea pigs, rats and mice. By combating these parasites, fatalities and performance reduction (in terms of meat, milk, wool, skins, eggs, honey, etc.) are reduced, so that applying a composition of the present disclosure allows more economic and simple husbandry of animals.

Examples of agronomic or nonagronomic invertebrate pests include eggs, larvae and adults of the order Lepidoptera, such as armyworms, cutworms, loopers, and heliothines in the family Noctuidae (e.g., pink stem borer (*Sesamia inferens* Walker), corn stalk borer (*Sesamia nonagrioides* Lefebvre), southern armyworm (*Spodoptera eridania* Cramer), fall armyworm (*Spodoptera frugiperda* J. E. Smith), beet armyworm (*Spodoptera exigua* Hubner), cotton leafworm (*Spodoptera littoralis* Boisduval), yellowstriped armyworm (*Spodoptera ornithogalli* Guende), black cutworm (*Agrotis ipsilon* Hufnagel), velvetbean caterpillar (*Anticarsia gemmatalis* Hubner), green fruitworm (*Lithophane antennata* Walker), cabbage armyworm (*Barathra brassicae* Linnaeus), soybean looper (*Pseudoplusia includens* Walker), cabbage looper (*Trichoplusia ni* Hubner), tobacco budworm (*Heliothis virescens* Fabricius)); borers, casebearers, webworms, coneworms, cabbageworms and skeletonizers from the family Pyralidae (e.g., European corn borer (*Ostrinia nubilalis* Hubner), navel orangeworm (*Amyelois transitella* Walker), corn root webworm (*Crambus caliginosellus* Clemens), sod webworms (Pyralidae: Crambinae) such as sod worm (*Herpetogramma licarsisalis* Walker), sugarcane stem borer (*Chilo infuscatellus* Snellen), tomato small borer (*Neoleucinodes elegantalis* Guenee), green leafroller (*Cnaphalocrocis medinalis*), grape leaffolder (*Desmia funeralis* Hubner), melon worm (*Diaphania nitidalis* Stoll), cabbage center grub (*Helluala hydralis* Guende), yellow stem borer (*Scirpophaga incertulas* Walker), early shoot borer (*Scirpophaga infuscatellus* Snellen), white stem borer (*Scirpophaga innotata* Walker), top shoot borer (*Scirpophaga nivella* Fabricius), dark-headed rice borer (*Chilo polychrysus* Meyrick), striped riceborer (*Chilo suppressalis* Walker), cabbage cluster caterpillar (*Crocidolomia binotalis* English)); leafrollers, budworms, seed worms, and fruit worms in the family Tortricidae (e.g., codling moth (*Cydia pomonella* Linnaeus), grape berry moth (*Endopiza viteana* Clemens), oriental fruit moth (*Grapholita molesta* Busck), citrus false codling moth (*Cryptophlebia leucotreta* Meyrick), citrus borer (*Ecdytolopha aurantiana* Lima), redbanded leafroller (*Argyrotaenia velutinana* Walker), obliquebanded leafroller (*Choristoneura rosaceana* Harris), light brown apple moth (*Epiphyas postvittana* Walker), European grape berry moth (*Eupoecilia ambiguella* Hubner), apple bud moth (*Pandemis pyrusana* Kearfott), omnivorous leafroller (*Platynota stultana* Walsingham), barred fruit-tree tortrix (*Pandemis cerasana* Hubner), apple brown tortrix (*Pandemis heparana* Denis & Schiffermüller)); and many other economically important lepidoptera (e.g., diamondback moth (*Plutella xylostella* Linnaeus), pink bollworm (*Pectinophora gossypiella* Saunders), gypsy moth (*Lymantria dispar* Linnaeus), peach fruit borer (*Carposina niponensis* Walsingham), peach twig borer (*Anarsia lineatella* Zeller), potato tuberworm (*Phthorimaea operculella* Zeller), spotted teniform leafminer (*Lithocolletis blancardella* Fabricius), Asiatic apple leafminer (*Lithocolletis ringoniella* Matsumura), rice leaffolder (*Lerodea eufala* Edwards), apple leafminer (*Leucoptera scitella* Zeller)); eggs, nymphs and adults of the order Blattodea including cockroaches from the families Blattellidae and Blattidae (e.g., oriental cockroach (*Blatta orientalis* Linnaeus), Asian cockroach (*Blattella asahinai* Mizukubo), German cockroach (*Blattella germanica* Linnaeus), brownbanded cockroach (*Supella longipalpa* Fabricius), American cockroach (*Periplaneta americana* Linnaeus), brown cockroach (*Periplaneta brunnea* Burmeister), Madeira cockroach (*Leucophaea maderae* Fabricius)), smoky brown cockroach (*Periplaneta fuliginosa* Service), Australian Cockroach (*Periplaneta australasiae* Fabr.), lobster cockroach (*Nauphoeta cinerea* Olivier) and smooth cockroach (*Symploce pallens* Stephens)); eggs, foliar feeding, fruit feeding, root feeding, seed feeding and vesicular tissue feeding larvae and adults of the order Coleoptera including weevils from the families Anthribidae, Bruchidae, and Curculionidae (e.g., boll weevil (*Anthonomus grandis* Boheman), rice water weevil (*Lissorhoptrus oryzophilus* Kuschel), granary weevil (*Sitophilus granarius* Linnaeus), rice weevil (*Sitophilus oryzae* Linnaeus)), annual bluegrass weevil (*Listronotus maculicollis* Dietz), bluegrass billbug (*Sphenophorus parvulus* Gyllenhal), hunting billbug (*Sphenophorus venatus vestitus*), Denver billbug (*Sphenophorus cicatristriatus* Fahraeus)); flea beetles, cucumber beetles, rootworms, leaf beetles, potato beetles, and leafminers in the family Chrysomelidae (e.g., Colorado potato beetle (*Leptinotarsa decemlineata* Say), western corn rootworm (*Diabrotica virgifera* LeConte)); chafers and other beetles from the family Scarabaeidae (e.g., Japanese beetle (*Popillia japonica* Newman), oriental beetle (*Anomala orientalis* Waterhouse, *Exomala orientalis* (Waterhouse) Baraud), northern masked chafer (*Cyclocephala borealis* Arrow), southern masked chafer (*Cyclocephala immaculata* Olivier or *C. lurida* Bland), dung beetle and white grub (*Aphodius* spp.), black turfgrass ataenius (*Ataenius spretulus* Haldeman), green June beetle (*Cotinis nitida* Linnaeus), Asiatic garden beetle (*Maladera castanea* Arrow), May/June beetles (*Phyllophaga* spp.) and European chafer (*Rhizotrogus majalis* Razoumowsky)); carpet beetles from the family Dermestidae; wireworms from the family Elateridae; bark beetles from the family Scolytidae and flour beetles from the family Tenebrionidae.

In addition, agronomic and nonagronomic pests include: eggs, adults and larvae of the order Dermaptera including earwigs from the family Forficulidae (e.g., European earwig (*Forficula auricularia* Linnaeus), black earwig (*Chelisoches morio* Fabricius)); eggs, immatures, adults and nymphs of the orders Hemintera and Homoptera such as, plant bugs from the family Miridae, cicadas from the family Cicadidae, leafhoppers (e.g. *Empoasca* spp.) from the family Cicadellidae, potato leafhoppers, bed bugs (e.g., *Cimex lectularius* Linnaeus) from the family Cimicidae, planthoppers from the families Fulgoroidae and Delphacidae, treehoppers from the family Membracidae, psyllids from the family Psyllidae, whiteflies from the family Aleyrodidae, aphids from the family Aphididae, *Phylloxera* from the family Phylloxeridae, mealybugs from the family Pseudococcidae, scales from the families Coccidae, Diaspididae and Margarodidae, lace bugs from the family Tingidae, stink bugs from the family Pentatomidae, chinch bugs (e.g., hairy chinch bug (*Blissus leucopterus hirtus* Montandon) and southern chinch bug (*Blissus insularis* Barber)) and other seed bugs from the family Lygaeidae, spittlebugs from the family Cercopidae squash bugs from the family Coreidae, and red bugs and cotton stainers from the family Pyrrhocoridae.

Agronomic and nonagronomic pests also include: eggs, larvae, nymphs and adults of the order Acari (mites) such as spider mites and red mites in the family Tetranychidae (e.g., European red mite (*Panonychus ulmi* Koch), two spotted spider mite (*Tetranychus urticae* Koch), McDaniel mite (*Tetranychus mcdanieli* McGregor)); flat mites in the family Tenuipalpidae (e.g., citrus flat mite (*Brevipalpus lewisi* McGregor)); rust and bud mites in the family Eriophyidae and other foliar feeding mites and mites important in human and animal health, i.e. dust mites in the family Epidermoptidae, follicle mites in the family Demodicidae, grain mites in the family Glycyphagidae; ticks in the family Ixodidae, commonly known as hard ticks (e.g., deer tick (*Ixodes scapularis* Say), Australian paralysis tick (*Ixodes holocyclus* Neumann), American dog tick (*Dermacentor variabilis* Say), lone star tick (*Amblyomma americanum* Linnaeus)) and ticks in the family Argasidae, commonly known as soft ticks (e.g., relapsing fever tick (*Ornithodoros turicata*), common fowl tick (*Argas radiatus*)); scab and itch mites in the families Psoroptidae, Pyemotidae, and Sarcoptidae; eggs, adults and immatures of the order Orthoptera including grasshoppers, locusts and crickets (e.g., migratory grasshoppers (e.g., *Melanoplus sanguinipes* Fabricius, *M. differentialis* Thomas), American grasshoppers (e.g., *Schistocerca americana* Drury), desert locust (*Schistocerca gregaria* Forskal), migratory locust (*Locusta migratoria* Linnaeus), bush locust (*Zonocerus* spp.), house cricket (*Acheta domesticus* Linnaeus), mole crickets (e.g., tawny mole cricket (*Scapteriscus vicinus* Scudder) and southern mole cricket (*Scapteriscus borellii* Giglio-Tos)); eggs, adults and immatures of the order Diptera including leafminers (e.g., *Liriomyza* spp. such as serpentine vegetable leafminer (*Liriomyza sativae* Blanchard)), midges, fruit flies (Tephritidae), frit flies (e.g., *Oscinella frit* Linnaeus), soil maggots, house flies (e.g., *Musca domestica* Linnaeus), lesser house flies (e.g., *Fannia canicularis* Linnaeus, *F. femoralis* Stein), stable flies (e.g., *Stomoxys calcitrans* Linnaeus), face flies, horn flies, blow flies (e.g., *Chrysomya* spp., *Phormia* spp.), and other muscoid fly pests, horse flies (e.g., *Tabanus* spp.), bot flies (e.g., *Gastrophilus* spp., *Oestrus* spp.), cattle grubs (e.g., *Hypoderma* spp.), deer flies (e.g., *Chrysops* spp.), keds (e.g., *Melophagus ovinus* Linnaeus) and other Brachycera, mosquitoes (e.g., *Aedes* spp., *Anopheles* spp., *Culex* spp.), black flies (e.g., *Prosimulium* spp., *Simulium* spp.), biting midges, sand flies, sciarids, and other Nematocera; eggs, adults and immatures of the order Thysanoptera including onion thrips (*Thrips tabaci* Lindeman), flower *thrips* (*Frankliniella* spp.), and other foliar feeding *thrips*; insect pests of the order Hymenoptera including ants of the Family Formicidae including the Florida carpenter ant (*Camponotus floridanus* Buckley), red carpenter ant (*Camponotus ferrugineus* Fabricius), black carpenter ant (*Camponotus pennsylvanicus* De Geer), white-footed ant (*Technomyrmex albipes* fr. Smith), big headed ants (*Pheidole* sp.), ghost ant (*Tapinoma melanocephalum* Fabricius); Pharaoh ant (*Monomorium pharaonis* Linnaeus), little fire ant (*Wasmannia auropunctata* Roger), fire ant (*Solenopsis geminata* Fabricius), red imported fire ant (*Solenopsis invicta* Buren), Argentine ant (*Iridomyrmex humilis* Mayr), crazy ant (*Paratrechina longicornis* Latreille), pavement ant (*Tetramorium caespitum* Linnaeus), cornfield ant (*Lasius alienus* Förster) and odorous house ant (*Tapinoma sessile* Say). Other Hymenoptera including bees (including carpenter bees), hornets, yellow jackets, wasps, and sawflies (*Neodiprion* spp.; *Cephus* spp.); insect pests of the order Isoptera including termites in the Termitidae (e.g., *Macrotermes* sp., *Odontotermes obesus* Rambur), Kalotermitidae (e.g., *Cryptotermes* sp.), and Rhinotermitidae (e.g., *Reticulitermes* sp., *Coptotermes* sp., *Heterotermes tenuis* Hagen) families, the eastern subterranean termite (*Reticulitermes flavipes* Kollar), western subterranean termite (*Reticulitermes hesperus* Banks), Formosan subterranean termite (*Coptotermes formosanus* Shiraki), West Indian drywood termite (*Incisitermes immigrans* Snyder), powder post termite (*Cryptotermes brevis* Walker), drywood termite (*Incisitermes snyderi* Light), southeastern subterranean termite (*Reticulitermes virginicus* Banks), western drywood termite (*Incisitermes minor* Hagen), arboreal termites such as *Nasutitermes* sp. and other termites of economic importance; insect pests of the order Thysanura such as silverfish (*Lepisma saccharina* Linnaeus) and firebrat (*Thermobia domestica* Packard); insect pests of the order Mallophaga and including the head louse (*Pediculus humanus* capitis De Geer), body louse (*Pediculus humanus* Linnaeus), chicken body louse (*Menacanthus stramineus* Nitszch), dog biting louse (*Trichodectes canis* De Geer), fluff louse (*Goniocotes gallinae* De Geer), sheep body louse (*Bovicola ovis* Schrank), short-nosed cattle louse (*Haematopinus eurysternus* Nitzsch), long-nosed cattle louse (*Linognathus vituli* Linnaeus) and other sucking and chewing parasitic lice that attack man and animals; insect pests of the order Siphonoptera including the oriental rat flea (*Xenopsylla cheopis* Rothschild), cat flea (*Ctenocephalides felis* Bouche), dog flea (*Ctenocephalides canis* Curtis), hen flea (*Ceratophyllus gallinae* Schrank), sticktight flea (*Echidnophaga gallinacea* Westwood), human flea (*Pulex irritans* Linnaeus) and other fleas afflicting mammals and birds. Additional arthropod pests covered include: spiders in the order Araneae such as the brown recluse spider (*Loxosceles reclusa* Gertsch & Mulaik) and the black widow spider (*Latrodectus mactans* Fabricius), and centipedes in the order Scutigeromorpha such as the house centipede (*Scutigera coleoptrata* Linnaeus).

Examples of invertebrate pests of stored grain include larger grain borer (*Prostephanus truncatus*), lesser grain borer (*Rhyzopertha dominica*), rice weevil (*Stiophilus oryzae*), maize weevil (*Stiophilus zeamais*), cowpea weevil (*Callosobruchus maculatus*), red flour beetle (*Tribolium castaneum*), granary weevil (*Stiophilus granarius*), Indian meal moth (*Plodia interpunctella*), Mediterranean flour beetle (*Ephestia kuhniella*) and flat or rusty grain beetle (*Cryptolestis ferrugineus*).

Compositions of the present disclosure may have activity on members of the Classes Nematoda, Cestoda, Trematoda, and Acanthocephala including economically important members of the orders Strongylida, Ascaridida, Oxyurida, Rhabditida, Spirurida, and Enoplida such as but not limited to economically important agricultural pests (i.e. root knot nematodes in the genus *Meloidogyne*, lesion nematodes in the genus *Pratylenchus*, stubby root nematodes in the genus *Trichodorus*, etc.) and animal and human health pests (i.e. all economically important flukes, tapeworms, and roundworms, such as *Strongylus vulgaris* in horses, *Toxocara canis* in dogs, *Haemonchus contortus* in sheep, *Dirofilaria immitis* Leidy in dogs, *Anoplocephala perfoliata* in horses, *Fasciola hepatica* Linnaeus in ruminants, etc.).

Compositions of the disclosure may have activity against pests in the order Lepidoptera (e.g., *Alabama argillacea* Hubner (cotton leaf worm), *Archips argyrospila* Walker (fruit tree leaf roller), *A. rosana* Linnaeus (European leaf roller) and other *Archips* species, *Chilo suppressalis* Walker (rice stem borer), *Cnaphalocrosis medinalis* Guende (rice leaf roller), *Crambus caliginosellus* Clemens (corn root webworm), *Crambus teterrellus* Zincken (bluegrass webworm), *Cydia pomonella* Linnaeus (codling moth), *Earias insulana* Boisduval (spiny bollworm), *Earias vittella* Fabricius (spotted bollworm), *Helicoverpa armigera* Hubner (American bollworm), *Helicoverpa zea* Boddie (corn earworm), *Heliothis virescens* Fabricius (tobacco budworm), *Herpetogramma licarsisalis* Walker (sod webworm), *Lobesia botrana* Denis & Schiffermüller (grape berry moth), *Pectinophora gossypiella* Saunders (pink bollworm), *Phyllocnistis citrella* Stainton (citrus leafminer), *Pieris brassicae* Linnaeus (large white butterfly), *Pieris rapae* Linnaeus (small white butterfly), *Plutella xylostella* Linnaeus (diamondback moth), *Spodoptera exigua* Hubner (beet armyworm), *Spodoptera litura* Fabricius (tobacco cutworm, cluster caterpillar), *Spodoptera frugiperda* J. E. Smith (fall armyworm), *Trichoplusia ni* Hubner (cabbage looper) and *Tuta absoluta* Meyrick (tomato leafminer)).

Compositions of the disclosure have significant activity on members from the order Homoptera including: *Acyrthosiphon pisum* Harris (pea aphid), *Aphis craccivora* Koch (cowpea aphid), *Aphis fabae* Scopoli (black bean aphid), *Aphis gossypii* Glover (cotton aphid, melon aphid), *Aphis pomi* De Geer (apple aphid), *Aphis spiraecola* Patch (spirea aphid), *Aulacorthum solani* Kaltenbach (foxglove aphid), *Chaetosiphon fragaefolii* Cockerell (strawberry aphid), *Diuraphis noxia* Kurdjumov/Mordvilko (Russian wheat aphid), *Dysaphis plantaginea* Paaserini (rosy apple aphid), *Eriosoma lanigerum* Hausmann (woolly apple aphid), *Hyalopterus pruni* Geoffroy (mealy plum aphid), *Lipaphis erysimi* Kaltenbach (turnip aphid), *Metopolophium dirrhodum* Walker (cereal aphid), *Macrosiphum euphorbiae* Thomas (potato aphid), *Myzus persicae* Sulzer (peach-potato aphid, green peach aphid), *Nasonovia ribisnigri* Mosley (lettuce aphid), *Pemphigus* spp. (root aphids and gall aphids), *Rhopalosiphum maidis* Fitch (corn leaf aphid), *Rhopalosiphum padi* Linnaeus (bird cherry-oat aphid), *Schizaphis graminum* Rondani (greenbug), *Sitobion avenae* Fabricius (English grain aphid), *Therioaphis maculata* Buckton (spotted alfalfa aphid), *Toxoptera aurantii* Boyer de Fonscolombe (black citrus aphid), and *Toxoptera citricida* Kirkaldy (brown citrus aphid); *Adelges* spp. (adelgids); *Phylloxera devastatrix* Pergande (pecan *Phylloxera*); *Bemisia tabaci* Gennadius (tobacco whitefly, sweetpotato whitefly), *Bemisia argentifolii* Bellows & Perring (silverleaf whitefly), *Dialeurodes citri* Ashmead (citrus whitefly) and *Trialeurodes vaporariorum* Westwood (greenhouse whitefly); Empoascafabae Harris (potato leafhopper), *Laodelphax striatellus* Fallen (smaller brown planthopper), *Macrolestes quadrilineatus* Forbes (aster leafhopper), *Nephotettix cinticeps* Uhler (green leafhopper), *Nephotettix nigropictus* Stil (rice leafhopper), *Nilaparvata lugens* Stil (brown planthopper), *Peregrinus maidis* Ashmead (corn planthopper), *Sogatella furcifera* Horvath (white-backed planthopper), *Sogatodes orizicola* Muir (rice delphacid), *Typhlocyba pomaria* McAtee white apple leafhopper, *Erythroneoura* spp. (grape leafhoppers); *Magicidada septendecim* Linnaeus (periodical cicada); *Icerya purchasi* Maskell (cottony cushion scale), *Quadraspidiotus perniciosus* Comstock (San Jose scale); *Planococcus citri* Risso (citrus mealybug); Pseudococcus spp. (other mealybug complex); *Cacopsylla pyricola* Foerster (pear psylla), *Trioza diospyri* Ashmead (persimmon psylla).

Compositions of this disclosure also have activity on members from the order Hemiptera including: *Acrosternum hilare* Say (green stink bug), *Anasa tristis* De Geer (squash bug), *Blissus leucopterus* Say (chinch bug), *Cimex lectularius* Linnaeus (bed bug) *Corythuca gossypii* Fabricius (cotton lace bug), *Cyrtopeltis modesta* Distant (tomato bug), *Dysdercus suturellus* Herrich-Schaffer (cotton stainer), *Euchistus servus* Say (brown stink bug), *Euchistus variolarius* Palisot de Beauvois (one-spotted stink bug), *Graptosthetus* spp. (complex of seed bugs), *Halymorpha halys* Stil (brown marmorated stink bug), *Leptoglossus corculus* Say (leaf-footed pine seed bug), *Lygus lineolaris* Palisot de Beauvois (tarnished plant bug), *Nezara viridula* Linnaeus (southern green stink bug), *Oebalus pugnax* Fabricius (rice stink bug), *Oncopeltus fasciatus* Dallas (large milkweed bug), *Pseudatomoscelis seriatus* Reuter (cotton fleahopper). Other insect orders controlled by compounds of the disclosure include Thysanoptera (e.g., *Frankliniella occidentalis* Pergande (western flower *thrips*), *Scirthothrips citri* Moulton (citrus thrips), *Sericothrips variabilis* Beach (soybean thrips), and *Thrips tabaci* Lindeman (onion thrips); and the order Coleoptera (e.g., *Leptinotarsa decemlineata* Say (Colorado potato beetle), *Epilachna varivestis* Mulsant (Mexican bean beetle) and wireworms of the genera *Agriotes, Athous* or *Limonius*).

Note that some contemporary classification systems place Homoptera as a suborder within the order Hemiptera.

Of note is use of compositions of this disclosure for controlling western flower *thrips (Frankliniella occidentalis)*. Of note is use of compounds of this disclosure for controlling potato leafhopper (*Empoasca fabae*). Of note is use of compounds of this disclosure for controlling cotton melon aphid (*Aphis gossypii*). Of note is use of compounds of this disclosure for controlling diamondback moth (*Plutella xylostella* L.). Of note is use of compounds of this disclosure for controlling silverleaf whitefly (*Bemisia argentifolii* Bellows & Perring).

Compounds of the present disclosure may also be useful for increasing vigor of a crop plant. This method comprises contacting the crop plant (e.g., foliage, flowers, fruit or roots) or the seed from which the crop plant is grown with compounds of Formula I or Formula II in amount sufficient to achieve the desired plant vigor effect (i.e. biologically effective amount). Typically, compounds of Formula I or Formula II is applied in a formulated composition. Although compounds of Formula I or Formula II is often applied directly to the crop plant or its seed, it can also be applied to the locus of the crop plant, i.e. the environment of the crop plant, particularly the portion of the environment in close enough proximity to allow compounds of Formula I or Formula II to migrate to the crop plant. The locus relevant to this method most commonly comprises the growth medium (i.e. medium providing nutrients to the plant), typically soil in which the plant is grown. Treatment of a crop plant to increase vigor of the crop plant thus comprises contacting the crop plant, the seed from which the crop plant is grown or the locus of the crop plant with a biologically effective amount of compounds of Formula I or Formula II.

Increased crop vigor can result in one or more of the following observed effects: (a) optimal crop establishment as demonstrated by excellent seed germination, crop emergence and crop stand; (b) enhanced crop growth as demonstrated by rapid and robust leaf growth (e.g., measured by leaf area index), plant height, number of tillers (e.g., for rice), root mass and overall dry weight of vegetative mass of the crop; (c) improved crop yields, as demonstrated by time to flowering, duration of flowering, number of flowers, total biomass accumulation (i.e. yield quantity) and/or fruit or grain grade marketability of produce (i.e. yield quality); (d) enhanced ability of the crop to withstand or prevent plant disease infections and arthropod, nematode or mollusk pest infestations; and (e) increased ability of the crop to withstand environmental stresses such as exposure to thermal extremes, suboptimal moisture or phytotoxic chemicals.

The compounds of the present disclosure may increase the vigor of treated plants compared to untreated plants by killing or otherwise preventing feeding of phytophagous invertebrate pests in the environment of the plants. In the absence of such control of phytophagous invertebrate pests, the pests reduce plant vigor by consuming plant tissues or sap, or transmitting plant pathogens such as viruses. Even in the absence of phytophagous invertebrate pests, the compounds of the disclosure may increase plant vigor by modifying metabolism of plants. Generally, the vigor of a crop plant will be most significantly increased by treating the plant with a compound of the disclosure if the plant is grown in a nonideal environment, i.e. an environment comprising one or more aspects adverse to the plant achieving the full genetic potential it would exhibit in an ideal environment.

Of note is a method for increasing vigor of a crop plant wherein the crop plant is grown in an environment comprising phytophagous invertebrate pests. Also of note is a method for increasing vigor of a crop plant wherein the crop plant is grown in an environment not comprising phytophagous invertebrate pests. Also of note is a method for increasing vigor of a crop plant wherein the crop plant is grown in an environment comprising an amount of moisture less than ideal for supporting growth of the crop plant. Of note is a method for increasing vigor of a crop plant wherein the crop is rice. Also of note is a method for increasing vigor of a crop plant wherein the crop is maize (corn). Also of note is a method for increasing vigor of a crop plant wherein the crop is soybean.

Compositions of this disclosure can also be mixed with one or more other biologically active compounds or agents including insecticides, fungicides, nematocides, bactericides, acaricides, herbicides, herbicide safeners, growth regulators such as insect molting inhibitors and rooting stimulants, chemosterilants, semiochemicals, repellents, attractants, pheromones, feeding stimulants, other biologically active compounds or entomopathogenic bacteria, virus or fungi to form a multi-component pesticide giving an even broader spectrum of agronomic and nonagronomic utility. Thus, the present disclosure also pertains to a composition comprising a biologically effective amount of at least one compound of Formula I or a compound of Formula II, or a combination of the foregoing compounds, at least one additional component selected from the group consisting of surfactants, solid diluents, and liquid diluents, and at least one additional biologically active compound or agent. For compositions of the present disclosure, the other biologically active compounds or agents can be formulated together with the present compounds, including compounds of Formula I or compounds of Formula II, or a combination of the foregoing compounds, to form a premix, or the other biologically active compounds or agents can be formulated separately from the present compounds, including compounds of Formula I or compounds of Formula II, and the two formulations combined together before application (e.g., in a spray tank) or, alternatively, applied in succession.

Examples of such biologically active compounds or agents with which compounds of this disclosure can be formulated are insecticides such as abamectin, acephate, acequinocyl, acetamiprid, acrinathrin, acynonapyr, afidopyropen ([(3S,4R,4aR,6S,6aS,12R,12aS,12bS)-3-[(cyclopropylcarbonyl)oxy]-1,3,4,4a,5,6,6a,12,12a,12b-decahydro-6,12-dihydroxy-4,6a,12b-trimethyl-11-oxo-9-(3-pyridinyl)-2H,11H-naphtho[2,1-b]pyrano[3,4-e]pyran-4-yl]methyl cyclopropanecarboxylate), amidoflumet, amitraz, avermectin, azadirachtin, azinphos-methyl, benfuracarb, bensultap, benzpyrimoxan, bifenthrin, kappa-bifenthrin, bifenazate, bistrifluron, borate, broflanilide, buprofezin, cadusafos, carbaryl, carbofuran, cartap, carzol, chlorantraniliprole, chlorfenapyr, chlorfluazuron, chloroprallethrin, chlorpyrifos, chlorpyrifos-e, chlorpyrifos-methyl, chromafenozide, clofentezin, chloroprallethrin, clothianidin, cyantraniliprole (Cyazypyr™) (3-bromo-1-(3-chloro-2-pyridinyl)-N-[4-cyano-2-methyl-6-[(methylamino)carbonyl]phenyl]-1H-pyrazole-5-carboxamide), cyclaniliprole (3-bromo-N-[2-bromo-4-chloro-6-[[(1-cyclopropylethyl)amino]carbonyl]phenyl]-1-(3-chloro-2-pyridinyl)-1H-pyrazole-5-carboxamide), cycloprothrin, cycloxaprid ((5S,8R)-1-[(6-chloro-3-pyridinyl)methyl]-2,3,5,6,7,8-hexahydro-9-nitro-5,8-Epoxy-1H-imidazo[1,2-a]azepine), cyenopyrafen, cyflumetofen, cyfluthrin, beta-cyfluthrin, cyhalodiamide, cyhalothrin, gamma-cyhalothrin, lambda-cyhalothrin, cypermethrin, alpha-cypermethrin, zeta-cypermethrin, cyromazine, deltamethrin, diafenthiuron, diazinon, dicloromesotiaz, dieldrin, diflubenzuron, dimefluthrin, dimehypo, dimethoate, dimpropyridaz, dinotefuran, diofenolan, DiPel®, emamectin, emamectin benzoate, endosulfan, esfenvalerate, ethiprole, etofenprox, epsilon-metofluthrin, etoxazole, fenbutatin oxide, fenitrothion, fenothiocarb, fenoxycarb, fenpropathrin, fenvalerate, fipronil, flometoquin (2-ethyl-3,7-dimethyl-6-[4-(trifluoromethoxy)phenoxy]-4-quinolinyl methyl carbonate), flonicamid, fluazaindolizine, flubendiamide, flucythrinate, flufenerim, flufenoxuron, flufenoxystrobin (methyl (αE)-2-[[2-chloro-4-(trifluoromethyl)phenoxy]methyl]-α-(methoxymethylene)benzeneacetate), fluensulfone (5-chloro-2-[(3,4,4-trifluoro-3-buten-1-yl)sulfonyl]thiazole), fluhexafon, fluopyram, flupiprole (1-[2,6-dichloro-4-(trifluoromethyl)phenyl]-5-[(2-methyl-2-propen-1-yl)amino]-4-[(trifluoromethyl)sulfinyl]-1H-pyrazole-3-carbonitrile), flupyradifurone (4-[[(6-chloro-3-pyridinyl)methyl](2,2-difluoroethyl)amino]-2(5H)-furanone), flupyrimin, fluvalinate, tau-fluvalinate, fluxametamide, fonophos, formetanate, fosthiazate, gamma-cyhalothrin, halofenozide, heptafluthrin ([2,3,5,6-tetrafluoro-4-(methoxymethyl)phenyl]methyl 2,2-dimethyl-3-[(1Z)-3,3,3-trifluoro-1-propen-1-yl]cyclopropanecarboxylate), hexaflumuron, hexythiazox, hydramethylnon, imidacloprid, indoxacarb, insecticidal soaps, isofenphos, isocycloseram, kappa-tefluthrin, lambda-cyhalothrin, lufenuron, malathion, meperfluthrin ([2,3,5,6-tetrafluoro-4-(methoxymethyl)phenyl]methyl (1R,3S)-3-(2,2-dichloroethenyl)-2,2-dimethylcyclopropanecarboxylate), metaflumizone, metaldehyde, methamidophos, methidathion, methiocarb, methomyl, methoprene, methoxychlor, metofluthrin, methoxyfenozide, epsilon-metofluthrin, epsilon-momfluorothrin, monocrotophos, monofluorothrin ([2,3,5,6-tetrafluoro-4-(methoxymethyl)phenyl]methyl 3-(2-cyano-1-propen-1-yl)-2,2-dimethylcyclopropanecarboxylate), nicotine, nitenpyram, nithiazine, novaluron, noviflumuron, oxamyl, oxazosulfyl, parathion, parathion-methyl, permethrin, phorate, phosalone, phosmet, phosphamidon, pirimicarb, profenofos, profluthrin, propargite, protrifenbute, pyflubumide (1,3,5-trimethyl-N-(2-methyl-1-oxopropyl)-N-[3-(2-methylpropyl)-4-[2,2,2-trifluoro-1-methoxy-1-(trifluoromethyl)ethyl]phenyl]-1H-pyrazole-4-carboxamide), pymetrozine, pyrafluprole, pyrethrin, pyridaben, pyridalyl, pyrifluquinazon, pyriminostrobin (methyl (αE)-2-[[[2-[(2,4-dichlorophenyl)amino]-6-(trifluoromethyl)-4-pyrimidinyl]oxy]methyl]-α-(methoxymethylene)benzeneacetate), pyriprole, pyriproxyfen, rotenone, ryanodine, silafluofen, spinetoram, spinosad, spirodiclofen, spiromesifen, spiropidion, spirotetramat, sulprofos, sulfoxaflor (N-[methyloxido[1-[6-(trifluoromethyl)-3-pyridinyl]ethyl]-$\lambda^4$-sulfanylidene]cyanamide), tebufenozide, tebufenpyrad, teflubenzuron, tefluthrin, kappa-tefluthrin, terbufos, tetrachlorantraniliprole, tetrachlorvinphos, tetramethrin, tetramethylfluthrin ([2,3,5,6-tetrafluoro-4-(methoxymethyl)phenyl]methyl 2,2,3,3-tetramethylcyclopropanecarboxylate), tetraniliprole, thiacloprid, thiamethoxam, thiodicarb, thiosultap-sodium, tioxazafen (3-phenyl-5-(2-thienyl)-1,2,4-oxadiazole), tolfenpyrad, tralomethrin, triazamate, trichlorfon, triflumezopyrim (2,4-dioxo-1-(5-pyrimidinylmethyl)-3-[3-(trifluoromethyl)phenyl]-2H-pyrido[1,2-a]pyrimidinium inner salt), triflumuron, tyclopyrazoflor, zeta-cypermethrin, *Bacillus thuringiensis* delta-endotoxins, entomopathogenic bacteria, entomopathogenic viruses or entomopathogenic fungi.

Of note are insecticides such as abamectin, acetamiprid, acrinathrin, acynonapyr, afidopyropen, amitraz, avermectin, azadirachtin, benfuracarb, bensultap, bifenthrin, buprofezin, broflanilide, cadusafos, carbaryl, cartap, chlorantraniliprole, chloroprallethrin, chlorfenapyr, chlorpyrifos, clothianidin, cyantraniliprole, cyclaniliprole, cycloprothrin, cyfluthrin, beta-cyfluthrin, cyhalothrin, DiPel®, gamma-cyhalothrin, lambda-cyhalothrin, cypermethrin, alpha-cypermethrin, zeta-cypermethrin, cyromazine, deltamethrin, dieldrin, dinotefuran, diofenolan, emamectin, endosulfan, epsilon-metofluthrin, esfenvalerate, ethiprole, etofenprox, etoxazole, fenitrothion, fenothiocarb, fenoxycarb, fenvalerate, fipronil, flometoquin, fluxametamide, flonicamid, flubendiamide, fluensulfone, flufenoxuron, flufenoxystrobin, flufensulfone, flupiprole, flupyrimin, flupyradifurone, fluvalinate, formetanate, fosthiazate, gamma-cyhalothrin, heptafluthrin, hexaflumuron, hydramethylnon, imidacloprid, indoxacarb, isocycloseram, kappa-tefluthrin, lambda-cyhalothrin, lufenuron, meperfluthrin, metaflumizone, methiodicarb, methomyl, methoprene, methoxyfenozide, metofluthrin, monofluorothrin, nitenpyram, nithiazine, novaluron, oxamyl, pyflubumide, pymetrozine, pyrethrin, pyridaben, pyridalyl, pyriminostrobin, pyriproxyfen, ryanodine, spinetoram, spinosad, spirodiclofen, spiromesifen, spirotetramat, sulfoxaflor, tebufenozide, tetramethrin, tetramethylfluthrin, thiacloprid, thiamethoxam, thiodicarb, thiosultap-sodium, tralomethrin, triazamate, triflumezopyrim, triflumuron, tyclopyrazoflor, zeta-cypermethrin, *Bacillus thuringiensis* delta-endotoxins, all strains of *Bacillus thuringiensis* and all strains of nucleo polyhedrosis viruses.

One embodiment of biological agents for mixing with compounds of this disclosure include entomopathogenic bacteria such as *Bacillus thuringiensis*, and the encapsulated delta-endotoxins of *Bacillus thuringiensis* such as MVP® and MVPII® bioinsecticides prepared by the CellCap® process (CellCap®, MVP® and MVPII® are trademarks of Mycogen Corporation, Indianapolis, Indiana, USA); entomopathogenic fungi such as green muscardine fungus; and entomopathogenic (both naturally occurring and genetically modified) viruses including baculovirus, nucleopolyhedro virus (NPV) such as *Helicoverpa zea* nucleopolyhedrovirus (HzNPV), *Anagrapha falcifera* nucleopolyhedrovirus (AfNPV); and granulosis virus (GV) such as *Cydia pomonella* granulosis virus (CpGV).

One embodiment of biological agents for mixing with compounds of this disclosure include one or a combination of (i) a bacterium of the genus Actinomycetes, *Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comamonas, Corynebacterium, Curtobacterium, Enterobacter, Flavobacterium, Gluconobacter, Hydrogenophaga, Klebsiella, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovorax*, or *Xenorhabdus*, for example a bacterium of *Bacillus amyloliquefaciens, Bacillus cereus, Bacillus firmus, Bacillus, licheniformis, Bacillus pumilus, Bacillus sphaericus, Bacillus subtilis, Bacillus thuringiensis, Bradyrhizobium japonicum, Chromobacterium subtsugae, Pasteuria nishizawae, Pasteuria penetrans, Pasteuria usage, Pseudomonas fluorescens*, and *Streptomyces lydicus*; (ii) a fungus such as green muscardine fungus; (iii) a virus including baculovirus, nucleopolyhedro virus such as *Helicoverpa zea* nucleopolyhedrovirus, *Anagrapha falcifera* nucleopolyhedrovirus; granulosis virus such as *Cydia pomonella* granulosis virus.

Of particular note is such a combination where the other invertebrate pest control active ingredient belongs to a different chemical class or has a different site of action than compounds of Formula I or Formula II. In certain instances, a combination with at least one other invertebrate pest control active ingredient having a similar spectrum of control but a different site of action will be particularly advantageous for resistance management. Thus, a composition of the present disclosure can further comprise a biologically effective amount of at least one additional invertebrate pest control active ingredient having a similar spectrum of control but belonging to a different chemical class or having a different site of action. These additional biologically active compounds or agents include, but are not limited to, acetylcholinesterase (AChE) inhibitors such as the carbamates methomyl, oxamyl, thiodicarb, triazamate, and the organophosphates chlorpyrifos; GABA-gated chloride channel antagonists such as the cyclodienes dieldrin and endosulfan, and the phenylpyrazoles ethiprole and fipronil; sodium channel modulators such as the pyrethroids bifenthrin, cyfluthrin, beta-cyfluthrin, cyhalothrin, lambda-cyhalothrin, cypermethrin, deltamethrin, dimefluthrin, esfenvalerate, metofluthrin and profluthrin; nicotinic acetylcholinereceptor (nAChR) agonists such as the neonicotinoids acetamiprid, clothianidin, dinotefuran, imidacloprid, nitenpyram, nithiazine, thiacloprid, and thiamethoxam, and sulfoxaflor; nicotinic acetylcholine receptor (nAChR) allosteric activators such as the spinosyns spinetoram and spinosad; chloride channel activators such as the avermectins abamectin and emamectin; juvenile hormone mimics such as diofenolan, methoprene, fenoxycarb and pyriproxyfen; selective homopteran feeding blockers such as pymetrozine and flonicamid; mite growth inhibitors such as etoxazole; inhibitors of mitochondrial ATP synthase such as propargite; ucouplers of oxidative phosphorylation via disruption of the proton gradient such as chlorfenapyr; nicotinic acetylcholine receptor (nAChR) channel blockers such as the nereistoxin analogs cartap; inhibitors of chitin biosynthesis such as the benzoylureas flufenoxuron, hexaflumuron, lufenuron, novaluron, noviflumuron and triflumuron, and buprofezin; dipteran moulting disrupters such as cyromazine; ecdysone receptor agonists such as the diacylhydrazines methoxyfenozide and tebufenozide; octopamine receptor agonists such as amitraz; mitochondrial complex III electron transport inhibitors such as hydramethylnon; mitochondrial complex I electron transport inhibitors such as pyridaben; voltage-dependent sodium channel blockers such as indoxacarb; inhibitors of acetyl CoA carboxylase such as the tetronic and tetramic acids spirodiclofen, spiromesifen and spirotetramat; mitochondrial complex II electron transport inhibitors such as the ß-ketonitriles cyenopyrafen and cyflumetofen; ryanidine receptor modulators such as the anthranilic diamides chlorantraniliprole, cyantraniliprole and cyantraniliprole, diamides such as flubendiamide, and ryanodine receptor ligands such as ryanodine; compounds wherein the target site responsible for biological activity is unknown or uncharacterized such as azadirachtin, bifenazate, pyridalyl, pyrifluquinazon and triflumezopyrim; microbial disrupters of insect midgut membranes such as *Bacillus thuringensis* and the delta-endotoxins they produce and *Bacillus sphaericus*; and biological agents including nucleo polyhedro viruses (NPV) and other naturally occurring or genetically modified insecticidal viruses.

Further examples of biologically active compounds or agents with which compounds of this disclosure can be formulated are: fungicides such as acibenzolar-S-methyl, aldimorph, ametoctradin, aminopyrifen, amisulbrom, anilazine, azaconazole, azoxystrobin, benalaxyl (including benalaxyl-M), benodanil, benomyl, benthiavalicarb (including benthiavalicarb-isopropyl), benzovindiflupyr, bethoxazin, binapacryl, biphenyl, bitertanol, bixafen, blasticidin-S, boscalid, bromuconazole, bupirimate, buthiobate, carboxin, carpropamid, captafol, captan, carbendazim, chloroneb, chlorothalonil, chlozolinate, copper hydroxide, copper oxychloride, copper sulfate, coumoxystrobin, cyazofamid, cyflufenamid, cymoxanil, cyproconazole, cyprodinil, dichlobentiazox, dichlofluanid, diclocymet, diclomezine, dicloran, diethofencarb, difenoconazole, diflumetorim, dimethirimol, dimethomorph, dimoxystrobin, diniconazole (including diniconazole-M), dinocap, dipymetitrone, dithianon, dithiolanes, dodemorph, dodine, econazole, etaconazole, edifenphos, enoxastrobin (also known as enestroburin), epoxiconazole, ethaboxam, ethirimol, etridiazole, famoxadone, fenamidone, fenaminstrobin, fenarimol, fenbuconazole, fenfuram, fenhexamide, fenoxanil, fenpiclonil, fenpicoxamid, fenpropidin, fenpropimorph, fenpyrazamine, fentin acetate, fentin hydroxide, ferbam, ferimzone, flometoquin, florylpicoxamid, fluopimomide, fluazinam, flubeneteram, fludioxonil, flufenoxystrobin, fluindapyr, flumorph, fluopicolide, fluopyram, fluoxapiprolin, fluoxastrobin, fluquinconazole, flusilazole, flusulfamide, flutianil, flutolanil, flutriafol, fluxapyroxad, folpet, fthalide (also known as phthalide), fuberidazole, furalaxyl, furametpyr, hexaconazole, hymexazole, guazatine, imazalil, imibenconazole, iminoctadine albesilate, iminoctadine triacetate, inpyrfluxam, iodicarb, ipconazole, ipfentrifluconazole, ipflufenoquin, isofetamid, iprobenfos, iprodione, iprovalicarb, isoflucypram, isoprothiolane, isopyrazam, isotianil, kasugamycin, kresoxim-methyl, lancotrione, mancozeb, mandipropamid, mandestrobin, maneb, mapanipyrin, mefentrifluconazole, mepronil, meptyldinocap, metalaxyl (including metalaxyl-M/mefenoxam), metconazole, methasulfocarb, metiram, metominostrobin, metyltetraprole, metrafenone, myclobutanil, naftitine, neo-asozin (ferric methanearsonate), nuarimol, octhilinone, ofurace, orysastrobin, oxadixyl, oxathiapiprolin, oxolinic acid, oxpoconazole, oxycarboxin, oxytetracycline, penconazole, pencycuron, penflufen, penthiopyrad, perfurazoate, phosphorous acid (including salts thereof, e.g., fosetyl-aluminm), picoxystrobin, piperalin, polyoxin, probenazole, prochloraz, procymidone, propamocarb, propiconazole, propineb, proquinazid, prothiocarb, prothioconazole, pydiflumetofen (Adepidyn®), pyraclostrobin, pyrametostrobin, pyrapropoyne, pyraoxystrobin, pyraziflumid, pyrazophos, pyribencarb, pyributacarb, pyridachlometyl, pyrifenox, pyriofenone, perisoxazole, pyrimethanil, pyrifenox, pyrrolnitrin, pyroquilon, quinconazole, quinmethionate, quinofumelin, quinoxyfen, quintozene, silthiofam, sedaxane, simeconazole, spiroxamine, streptomycin, sulfur, tebuconazole, tebufloquin, teclofthalam, tecloftalam, tecnazene, terbinafine, tetraconazole, thiabendazole, thifluzamide, thiophanate, thiophanate-methyl, thiram, tiadinil, tolclofos-methyl, tolprocarb, tolyfluanid, triadimefon, triadimenol, triarimol, triazoxide, tribasic copper sulfate, triclopyricarb, tridemorph, trifloxystrobin, triflumizole, trimoprhamide triclyazole, trifloxystrobin, triforine, triticonazole, uniconazole, validamycin, valifenalate (also known as valifenal), vinclozolin, zineb, ziram, zoxamide and 1-[4-[4-[5-(2,6-difluorophenyl)-4,5-dihydro-3-isoxazolyl]-2-thiazolyl]-1-piperidinyl]-2-[5-methyl-3-(trifluoromethyl)-1H-pyrazol-1-yl]ethanone; nematocides such as fluopyram, spirotetramat, thiodicarb, fosthiazate, abamectin, iprodione, fluensulfone, dimethyl disulfide, tioxazafen, 1,3-dichloropropene (1,3-D), metam (sodium and potassium), dazomet, chloropicrin, fenamiphos, ethoprophos, cadusaphos, terbufos, imicyafos, oxamyl, carbofuran, tioxazafen, *Bacillus firmus* and *Pasteuria nishizawae*; bactericides such as streptomycin; acaricides such as amitraz, chinomethionat, chlorobenzilate, cyhexatin, dicofol, dienochlor, etoxazole, fenazaquin, fenbutatin oxide, fenpropathrin, fenpyroximate, hexythiazox, propargite, pyridaben and tebufenpyrad.

In certain instances, combinations of a compound of this disclosure with other biologically active (particularly invertebrate pest control) compounds or agents (i.e. active ingredients) can result in a greater-than-additive (i.e. synergistic) effect. Reducing the quantity of active ingredients released in the environment while ensuring effective pest control is always desirable. When synergism of invertebrate pest control active ingredients occurs at application rates giving agronomically satisfactory levels of invertebrate pest control, such combinations can be advantageous for reducing crop production cost and decreasing environmental load.

Compounds of this disclosure and compositions thereof can be applied to plants genetically transformed to express proteins toxic to invertebrate pests (such as *Bacillus thuringiensis* delta-endotoxins). Such an application may provide a broader spectrum of plant protection and be advantageous for resistance management. The effect of the exogenously applied invertebrate pest control compounds of this disclosure may be synergistic with the expressed toxin proteins.

General references for these agricultural protectants (i.e. insecticides, fungicides, nematocides, acaricides, herbicides and biological agents) include *The Pesticide Manual,* 13th

*Edition*, C. D. S. Tomlin, Ed., British Crop Protection Council, Farnham, Surrey, U. K., 2003 and *The Bio Pesticide Manual*, 2$^{nd}$ *Edition*, L. G. Copping, Ed., British Crop Protection Council, Farnham, Surrey, U. K., 2001.

Invertebrate pests are controlled in agronomic and nonagronomic applications by applying one or more compounds of this disclosure, typically in the form of a composition, in a biologically effective amount, to the environment of the pests, including the agronomic and/or nonagronomic locus of infestation, to the area to be protected, or directly on the pests to be controlled.

Thus, the present disclosure comprises a method for controlling an invertebrate pest in agronomic and/or nonagronomic applications, comprising contacting the invertebrate pest or its environment with a biologically effective amount of one or more of the compounds of the disclosure, or with a composition comprising at least one such compound or a composition comprising at least one such compound and a biologically effective amount of at least one additional biologically active compound or agent. Examples of suitable compositions comprising a compound of the disclosure and a biologically effective amount of at least one additional biologically active compound or agent include granular compositions wherein the additional active compound is present on the same granule as the compound of the disclosure or on granules separate from those of the compound of the disclosure.

To achieve contact with a compound or composition of the disclosure to protect a field crop from invertebrate pests, the compound or composition is typically applied to the seed of the crop before planting, to the foliage (e.g., leaves, stems, flowers, fruits) of crop plants, or to the soil or other growth medium before or after the crop is planted.

One embodiment of a method of contact is by spraying. Alternatively, a granular composition comprising a compound of the disclosure can be applied to the plant foliage or the soil. Compounds of this disclosure can also be effectively delivered through plant uptake by contacting the plant with a composition comprising a compound of this disclosure applied as a soil drench of a liquid formulation, a granular formulation to the soil, a nursery box treatment or a dip of transplants. Of note is a composition of the present disclosure in the form of a soil drench liquid formulation. Also of note is a method for controlling an invertebrate pest comprising contacting the invertebrate pest or its environment with a biologically effective amount of a compound of the present disclosure or with a composition comprising a biologically effective amount of a compound of the present disclosure. Of further note is this method wherein the environment is soil and the composition is applied to the soil as a soil drench formulation. Of further note is that compounds of this disclosure are also effective by localized application to the locus of infestation. Other methods of contact include application of a compound or a composition of the disclosure by direct and residual sprays, aerial sprays, gels, seed coatings, microencapsulations, systemic uptake, baits, ear tags, boluses, foggers, fumigants, aerosols, dusts and many others. One embodiment of a method of contact is a dimensionally stable fertilizer granule, stick or tablet comprising a compound or composition of the disclosure. The compounds of this disclosure can also be impregnated into materials for fabricating invertebrate control devices (e.g., insect netting).

Compounds of the disclosure are useful in treating all plants, plant parts and seeds. Plant and seed varieties and cultivars can be obtained by conventional propagation and breeding methods or by genetic engineering methods. Genetically modified plants or seeds (transgenic plants or seeds) are those in which a heterologous gene (transgene) has been stably integrated into the plant's or seed's genome. A transgene that is defined by its particular location in the plant genome is called a transformation or transgenic event.

Genetically modified plant and seed cultivars which can be treated according to the disclosure include those that are resistant against one or more biotic stresses (pests such as nematodes, insects, mites, fungi, etc.) or abiotic stresses (drought, cold temperature, soil salinity, etc.), or that contain other desirable characteristics. Plants and seeds can be genetically modified to exhibit traits of, for example, herbicide tolerance, insect-resistance, modified oil profiles or drought tolerance.

Treatment of genetically modified plants and seeds with compounds of the disclosure may result in super-additive or synergistic effects. For example, reduction in application rates, broadening of the activity spectrum, increased tolerance to biotic/abiotic stresses or enhanced storage stability may be greater than expected from just simple additive effects of the application of compounds of the disclosure on genetically modified plants and seeds.

Compounds of this disclosure are also useful in seed treatments for protecting seeds from invertebrate pests. In the context of the present disclosure and claims, treating a seed means contacting the seed with a biologically effective amount of a compound of this disclosure, which is typically formulated as a composition of the disclosure. This seed treatment protects the seed from invertebrate soil pests and generally can also protect roots and other plant parts in contact with the soil of the seedling developing from the germinating seed. The seed treatment may also provide protection of foliage by translocation of the compound of this disclosure or a second active ingredient within the developing plant. Seed treatments can be applied to all types of seeds, including those from which plants genetically transformed to express specialized traits will germinate. Representative examples include those expressing proteins toxic to invertebrate pests, such as *Bacillus thuringiensis* toxin or those expressing herbicide resistance such as glyphosate acetyltransferase, which provides resistance to glyphosate. Seed treatments with compounds of this disclosure can also increase vigor of plants growing from the seed.

One method of seed treatment is by spraying or dusting the seed with a compound of the disclosure (i.e. as a formulated composition) before sowing the seeds. Compositions formulated for seed treatment generally comprise a film former or adhesive agent. Therefore, typically a seed coating composition of the present disclosure comprises a biologically effective amount of compounds of Formula I or Formula II, and a film former or adhesive agent. Seed can be coated by spraying a flowable suspension concentrate directly into a tumbling bed of seeds and then drying the seeds. Alternatively, other formulation types such as wetted powders, solutions, suspoemulsions, emulsifiable concentrates and emulsions in water can be sprayed on the seed. This process is particularly useful for applying film coatings on seeds. Various coating machines and processes are available to one skilled in the art. Suitable processes include those listed in P. Kosters et al., *Seed Treatment: Progress and Prospects,* 1994 BCPC Monograph No. 57, and references listed therein.

Compounds of Formula I or Formula II and their compositions, both alone and in combination with other insecticides, nematicides, and fungicides, are particularly useful in seed treatment for crops including, but not limited to, maize or corn, soybeans, cotton, cereal (e.g., wheat, oats, barley, rye and rice), potatoes, vegetables and oilseed rape.

Other insecticides with which compounds of Formula I or Formula II can be formulated to provide mixtures useful in seed treatment include abamectin, acetamiprid, acrinathrin, amitraz, avermectin, azadirachtin, bensultap, bifenthrin, buprofezin, cadusafos, carbaryl, carbofuran, cartap, chlorantraniliprole, chlorfenapyr, chlorpyrifos, clothianidin, cyantraniliprole, cyfluthrin, beta-cyfluthrin, cyhalothrin, gamma-cyhalothrin, lambda-cyhalothrin, cypermethrin, alpha-cypermethrin, zeta-cypermethrin, cyromazine, deltamethrin, dieldrin, dinotefuran, diofenolan, DiPel®, emamectin, endosulfan, esfenvalerate, ethiprole, etofenprox, etoxazole, fenothiocarb, fenoxycarb, fenvalerate, fipronil, flonicamid, flubendiamide, flufenoxuron, fluvalinate, formetanate, fosthiazate, hexaflumuron, hydramethylnon, imidacloprid, indoxacarb, lufenuron, metaflumizone, methiocarb, methomyl, methoprene, methoxyfenozide, nitenpyram, nithiazine, novaluron, oxamyl, pymetrozine, pyrethrin, pyridaben, pyridalyl, pyriproxyfen, ryanodine, spinetoram, spinosad, spirodiclofen, spiromesifen, spirotetramat, sulfoxaflor, tebufenozide, tetramethrin, thiacloprid, thiamethoxam, thiodicarb, thiosultap-sodium, tralomethrin, triazamate, triflumuron, *Bacillus thuringiensis* delta-endotoxins, all strains of *Bacillus thuringiensis* and all strains of nucleo polyhedrosis viruses.

Fungicides with which compounds of Formula I or Formula II can be formulated to provide mixtures useful in seed treatment include amisulbrom, azoxystrobin, boscalid, carbendazim, carboxin, cymoxanil, cyproconazole, difenoconazole, dimethomorph, fluazinam, fludioxonil, fluquinconazole, fluopicolide, fluoxastrobin, flutriafol, fluxapyroxad, iponazole, iprodione, metalaxyl, mefenoxam, metconazole, myclobutanil, paclobutrazole, penflufen, picoxystrobin, prothioconazole, pyraclostrobin, sedaxane, silthiofam, tebuconazole, thiabendazole, thiophanate-methyl, thiram, trifloxystrobin and triticonazole.

Compositions comprising compounds of Formula I or Formula II useful for seed treatment can further comprise bacteria and fungi that have the ability to provide protection from the harmful effects of plant pathogenic fungi or bacteria and/or soil born animals such as nematodes. Bacteria exhibiting nematicidal properties may include but are not limited to *Bacillus firmus*, *Bacillus cereus*, *Bacillus subtilis* and *Pasteuria penetrans*. A suitable *Bacillus firmus* strain is strain CNCM I-1582 (GB-126) which is commercially available as BioNem™. A suitable *Bacillus cereus* strain is strain NCMM I-1592. Both *Bacillus* strains are disclosed in U.S. Pat. No. 6,406,690. Other suitable bacteria exhibiting nematicidal activity are *B. amyloliquefaciens* IN937a and *B. subtilis* strain GB03. Bacteria exhibiting fungicidal properties may include but are not limited to *B. pumilus* strain GB34. Fungal species exhibiting nematicidal properties may include but are not limited to *Myrothecium verrucaria*, *Paecilomyces lilacinus* and *Purpureocillium lilacinum*.

For embodiments where one or more of these various mixing partners are used, the weight ratio of these various mixing partners (in total) to the compound of Formula I or II, is typically between about 1:10000 and abut 10000:1. 1:3000 and about 3000:1. Of note are weight ratios between about 1:300 and about 300:1 (for example ratios between about 1:30 and about 30:1).

Useful weight ratios of the at least one additional biological agent or pest control of the compound of Formula I or the compound of Formula II, or a salt thereof to component (b) in the mixtures, compositions and methods of the present disclosure are typically from 10000:1 to 1:1000, from 1000:1 to 1:500, from 100:1 to 1:100, from 20:1 to 1:20, from 10:1 to 1:10.

Of note are mixtures, compositions and methods wherein the weight ratio of component (a) the compound of Formula I or II to component (b) is from 1:150 to 200:1, from 1:150 to 50:1, from 1:50 to 10:1 or from 1:5 to 5:1.

It also is understood that any numerical range recited herein includes all values from the lower value to the upper value. For example, if a weight ratio range is stated as 1:50, it is intended that values such as 2:40, 10:30, or 1:3, etc., are expressly enumerated in this specification. These are only examples of what is specifically intended, and all possible combinations of numerical values between and including the lowest value and the highest value enumerated are to be considered to be expressly stated in this application.

One skilled in the art can easily determine through simple experimentation the biologically effective amounts of active ingredients necessary for the desired spectrum of biological activity. It will be evident that including these additional components can expand the spectrum of invertebrate pests controlled beyond the spectrum controlled by the compound of Formula I or II alone.

Table A lists specific combinations of a compound of Formula I or II with other invertebrate pest control agents illustrative of the mixtures, compositions and methods disclosed herein. The first column of Table A lists the specific invertebrate pest control agents (e.g., "Acetamiprid" in the first line). The second column of Table A lists embodiments of ranges of weight ratios of rates at which a compound of Formula I or II can be applied relative to an invertebrate pest control agent (e.g., "50:1 to 1:50" of compound of Formula I or II relative to acetamiprid by weight).

Thus, for example, the first line of Table A specifically discloses the combination of a compound of Formula I or II with acetamiprid can be applied in a weight ratio between 50:1 to 1:50. The remaining lines of Table A are to be construed similarly. Of further note Table A lists specific combinations of a compound of Formula I or II with other invertebrate pest control agents illustrative of the mixtures, compositions and methods of the present disclosure and includes additional embodiments of weight ratio ranges for application rates.

TABLE A

| Invertebrate Pest Control Agent Component (b) | Typical Weight Ratio | Invertebrate Pest Control Agent Component (b) | Typical Weight Ratio |
|---|---|---|---|
| Acetamiprid | 150:1 to 1:200 | Flupyrimin | 50:1 to 1:500 |
| Acynonapyr | 100:1 to 1:400 | Indoxacarb | 200:1 to 1:50 |
| Avermectin | 50:1 to 1:50 | Imidacloprid | 1000:1 to 1:1000 |
| *Bacillus* spp. and any active crystal proteins | 50:1 to 1:10 | Isocycloseram | 50:1 to 1:100 |
| Benzpyrimoxan | 150:1 to 1:200 | Methomyl | 250:1 to 1:100 |

TABLE A-continued

| Invertebrate Pest Control Agent Component (b) | Typical Weight Ratio | Invertebrate Pest Control Agent Component (b) | Typical Weight Ratio |
|---|---|---|---|
| Bifenthrin | 100:1 to 1:10 | Methoxyfenozide | 500:1 to 1:100 |
| kappa-bifenthrin | 100:1 to 1:250 | epsilon-Metofluthrin | 200:1 to 1:100 |
| Broflanilide, | 150:1 to 1:500 | Novaluron | 100:1 to 1:200 |
| Buprofezin, | 500:1 to 1:50 | Oxazosulfyl | 100:1 to 1:200 |
| Carbofuran | 200:1 to 1:100 | Permethrin | 100:1 to 1:120 |
| Chlorantraniliprole | 100:1 to 1:120 | Pyriproxifen | 250:1 to 1:100 |
| Chlorfenapyr | 100:1 to 1:10 | Spiropidion | 1200:1 to 1:200 |
| Chloroprallethrin | 50:1 to 1:500 | Spirotetramat | 150:1 to 1:100 |
| Chlorpyrifos, | 500:1 to 1:200 | Sulfoxaflor | 200:1 to 1:100 |
| Clothianidin, | 100:1 to 1:400 | kappa-Tefluthrin | 100:1 to 1:1000 |
| Cyantraniliprole | 100:1 to 1:120 | Tetrachlorantraniliprole | 200:1 to 1:100 |
| γ-Cyhalothrin | 50:1 to 1:250 | Thiamethoxam | 1250:1 to 1:1000 |
| ζ-Cypermethrin | 150:1 to 1:200 | Tyclopyrazoflor | 200:1 to 1:500 |
| Cyromazine | 400:1 to 1:50 | *Bacillus thuringiensis* | 50:1 to 1:10 |
| Diafenthiuron | 200:1 to 1:150 | Dimpropyridaz | 250:1 to 1:150 |
| Dicloromezotiaz | 200:1 to 1:150 | Dinotefuran | 150:1 to 1:200 |
| Emamectin Benzoate | 500:1 to 1:100 | Flonicamid | 200:1 to 1:100 |
| Fipronil | 150:1 to 1:100 | Flupyradifurone | 200:1 to 1:200 |

Embodiments of the disclosure include the composition of the present disclosure wherein the at least one additional biologically active compound or agent is selected from the Invertebrate Pest Control Agents listed in Table A above.

The weight ratios of a compound, including a compound of Formula I or II, to the additional invertebrate pest control agent typically are between 10000:1 and 1:1000, with one embodiment between 1000:1 and 1:500, with one embodiment being between 500:1 and 1:500, another embodiment being between 250:1 and 1:200 and another embodiment being between 100:1 and 1:50.

Listed below in Tables A-1 to A-5 are embodiments of specific compositions comprising a compound of Formula I or II (compound numbers (Cmp No.) refer to compounds in Table 1 and Tests A-E.

TABLE A-1

| Mixture No. | Cmp No. | Invertebrate Pest Control Agent |
|---|---|---|
| A1-1 | 1 | Acetamiprid |
| A1-2 | 1 | Acynonapyr |
| A1-3 | 1 | Avermectin |
| A1-4 | 1 | *Bacillus* spp. |
| A1-5 | 1 | Benzpyrimoxan |
| A1-6 | 1 | Bifenthrin |
| A1-7 | 1 | kappa-bifenthrin |
| A1-8 | 1 | Broflanilide |
| A1-9 | 1 | Buprofezin |
| A1-10 | 1 | Carbofuran |
| A1-11 | 1 | Chlorantraniliprole |
| A1-12 | 1 | Chlorfenapyr |
| A1-13 | 1 | Chloroprallethrin |
| A1-14 | 1 | Chlorpyrifos, |
| A1-15 | 1 | Clothianidin, |
| A1-16 | 1 | Cyantraniliprole |
| A1-17 | 1 | γ-Cyhalothrin |
| A1-18 | 1 | ζ-Cypermethrin |
| A1-19 | 1 | Cyromazine |
| A1-20 | 1 | Diafenthiuron |
| A1-21 | 1 | Dicloromezotiaz |
| A1-22 | 1 | Dimpropyridaz |
| A1-23 | 1 | Dinotefuran |
| A1-24 | 1 | Emamectin Benzoate |
| A1-25 | 1 | Fipronil |
| A1-26 | 1 | Flonicamid |
| A1-27 | 1 | Flupyradifurone |
| A1-28 | 1 | Flupyrimin |
| A1-29 | 1 | Indoxacarb |
| A1-30 | 1 | Imidacloprid |
| A1-31 | 1 | Isocycloseram |

TABLE A-1-continued

| Mixture No. | Cmp No. | Invertebrate Pest Control Agent |
|---|---|---|
| A1-32 | 1 | Methomyl |
| A1-33 | 1 | Methoxyfenozide |
| A1-34 | 1 | epsilon-Metofluthrin |
| A1-35 | 1 | Novaluron |
| A1-36 | 1 | Oxazosulfyl |
| A1-37 | 1 | Permethrin |
| A1-38 | 1 | Pyriproxifen |
| A1-39 | 1 | Spiropidion |
| A1-40 | 1 | Spirotetramat |
| A1-41 | 1 | Sulfoxaflor |
| A1-42 | 1 | kappa-Tefluthrin |
| A1-43 | 1 | Tetrachlorantraniliprole |
| A1-44 | 1 | Thiamethoxam |
| A1-45 | 1 | Tyclopyrazoflor |
| A1-46 | 1 | *Bacillus thuringiensis* |

Table A2

Table A2 is identical to Table A1, except that each reference to compound 1 in the column headed "Cmpd. No." is replaced by a reference to compound 2. For example, the first mixture in Table 4 is designated A2-1 and is a mixture of compound 2 and the additional invertebrate pest control agent acetamiprid.

Table A3

Table A3 is identical to Table A1, except that each reference to compound 1 in the column headed "Cmpd. No." is replaced by a reference to compound 3. For example, the first mixture in Table 5 is designated A3-1 and is a mixture of compound 3 and the additional invertebrate pest control agent acetamiprid.

Table A4

Table A4 is identical to Table A1, except that each reference to compound 1 in the column headed "Cmpd. No." is replaced by a reference to compound 4. For example, the first mixture in Table 6 is designated A4-1 and is a mixture of compound 4 and the additional invertebrate pest control agent acetamiprid.

Table A5

Table A5 is identical to Table A1, except that each reference to compound 1 in the column headed "Cmpd. No." is replaced by a reference to compound 5. For example, the first mixture in Table 7 is designated A5-1 and is a mixture of compound 5 and the additional invertebrate pest control agent acetamiprid.

Seed treatments can also include one or more nematicidal agents of natural origin such as the elicitor protein called harpin which is isolated from certain bacterial plant pathogens such as *Erwinia amylovora*. An example is the Harpin-N-Tek seed treatment technology available as N-Hibit™ Gold CST.

Seed treatments can also include one or more species of legume-root nodulating bacteria such as the microsymbiotic nitrogen-fixing bacteria *Bradyrhizobium japonicum*. These inocculants can optionally include one or more lipo-chitooligosaccharides (LCOs), which are nodulation (Nod) factors produced by rhizobia bacteria during the initiation of nodule formation on the roots of legumes. For example, the Optimize® brand seed treatment technology incorporates LCO Promoter Technology™ in combination with an inocculant.

Seed treatments can also include one or more isoflavones which can increase the level of root colonization by mycorrhizal fungi. Mycorrhizal fungi improve plant growth by enhancing the root uptake of nutrients such as water, sulfates, nitrates, phosphates and metals. Examples of isoflavones include, but are not limited to, genistein, biochanin A, formononetin, daidzein, glycitein, hesperetin, naringenin and pratensein. Formononetin is available as an active ingredient in mycorrhizal inocculant products such as PHC Colonize® AG.

Seed treatments can also include one or more plant activators that induce systemic acquired resistance in plants following contact by a pathogen. An example of a plant activator which induces such protective mechanisms is acibenzolar-S-methyl.

The treated seed typically comprises a compound of the present disclosure in an amount from about 0.1 g to 1 kg per 100 kg of seed (i.e. from about 0.0001 to 1% by weight of the seed before treatment). A flowable suspension formulated for seed treatment typically comprises from about 0.5 to about 70% of the active ingredient, from about 0.5 to about 30% of a film-forming adhesive, from about 0.5 to about 20% of a dispersing agent, from 0 to about 5% of a thickener, from 0 to about 5% of a pigment and/or dye, from 0 to about 2% of an antifoaming agent, from 0 to about 1% of a preservative, and from 0 to about 75% of a volatile liquid diluent.

The compounds of this disclosure can be incorporated into a bait composition that is consumed by an invertebrate pest or used within a device such as a trap, bait station, and the like. Such a bait composition can be in the form of granules which comprise (a) active ingredients, namely a biologically effective amount of compounds of Formula I or Formula II (b) one or more food materials; optionally (c) an attractant, and optionally (d) one or more humectants. Of note are granules or bait compositions which comprise between about 0.001-5% active ingredients, about 40-99% food material and/or attractant; and optionally about 0.05-10% humectants, which are effective in controlling soil invertebrate pests at very low application rates, particularly at doses of active ingredient that are lethal by ingestion rather than by direct contact. Some food materials can function both as a food source and an attractant. Food materials include carbohydrates, proteins and lipids. Examples of food materials are vegetable flour, sugar, starches, animal fat, vegetable oil, yeast extracts and milk solids. Examples of attractants are odorants and flavorants, such as fruit or plant extracts, perfume, or other animal or plant component, pheromones or other agents known to attract a target invertebrate pest. Examples of humectants, i.e. moisture retaining agents, are glycols and other polyols, glycerine and sorbitol. Of note is a bait composition (and a method utilizing such a bait composition) used to control at least one invertebrate pest selected from the group consisting of ants, termites and cockroaches. A device for controlling an invertebrate pest can comprise the present bait composition and a housing adapted to receive the bait composition, wherein the housing has at least one opening sized to permit the invertebrate pest to pass through the opening so the invertebrate pest can gain access to the bait composition from a location outside the housing, and wherein the housing is further adapted to be placed in or near a locus of potential or known activity for the invertebrate pest.

One embodiment of the present disclosure relates to a method for controlling invertebrate pests, comprising diluting the pesticidal composition of the present disclosure compounds of Formula I or Formula II formulated with surfactants, solid diluents and liquid diluents or a formulated mixture of compounds of Formula I or Formula II and at least one other pesticide) with water, and optionally adding an adjuvant to form a diluted composition, and contacting the invertebrate pest or its environment with an effective amount of said diluted composition.

Although a spray composition formed by diluting with water a sufficient concentration of the present pesticidal composition can provide sufficient efficacy for controlling invertebrate pests, separately formulated adjuvant products can also be added to spray tank mixtures. These additional adjuvants are commonly known as "spray adjuvants" or "tank-mix adjuvants", and include any substance mixed in a spray tank to improve the performance of a pesticide or alter the physical properties of the spray mixture. Adjuvants can be surfactants, emulsifying agents, petroleum-based crop oils, crop-derived seed oils, acidifiers, buffers, thickeners or defoaming agents. Adjuvants are used to enhancing efficacy (e.g., biological availability, adhesion, penetration, uniformity of coverage and durability of protection), or minimizing or eliminating spray application problems associated with incompatibility, foaming, drift, evaporation, volatilization and degradation. To obtain optimal performance, adjuvants are selected with regard to the properties of the active ingredient, formulation and target (e.g., crops, insect pests).

Among the spray adjuvants, oils including crop oils, crop oil concentrates, vegetable oil concentrates and methylated seed oil concentrates are most commonly used to improve the efficacy of pesticides, possibly by means of promoting more even and uniform spray deposits. In situations where phytotoxicity potentially caused by oils or other water-immiscible liquids are of concern, spray compositions prepared from the composition of the present disclosure will generally not contain oil-based spray adjuvants. However, in situations where phytotoxicity caused by oil-based spray adjuvants is commercially insignificant, spray compositions prepared from the composition of the present composition can also contain oil-based spray adjuvants, which can potentially further increase control of invertebrate pests, as well as rainfastness.

Products identified as "crop oil" typically contain 95 to 98% paraffin or naphtha-based petroleum oil and 1 to 2% of one or more surfactants functioning as emulsifiers. Products identified as "crop oil concentrates" typically consist of 80 to 85% of emulsifiable petroleum-based oil and 15 to 20% of nonionic surfactants. Products correctly identified as "vegetable oil concentrates" typically consist of 80 to 85% of vegetable oil (i.e. seed or fruit oil, most commonly from cotton, linseed, soybean or sunflower) and 15 to 20% of nonionic surfactants. Adjuvant performance can be improved by replacing the vegetable oil with methyl esters of fatty acids that are typically derived from vegetable oils. Examples of methylated seed oil concentrates include MSO® Concentrate (UAP-Loveland Products, Inc.) and Premium MSO Methylated Spray Oil (Helena Chemical Company).

The amount of adjuvants added to spray mixtures generally does not exceed about 2.5% by volume, and more typically the amount is from about 0.1 to about 1% by volume. The application rates of adjuvants added to spray mixtures are typically between about 1 to 5 L per hectare. Representative examples of spray adjuvants include: Adigor® (Syngenta) 47% methylated rapeseed oil in liquid hydrocarbons, Silwet® (Helena Chemical Company) polyalkyleneoxide modified heptamethyltrisiloxane and Assist® (BASF) 17% surfactant blend in 83% paraffin based mineral oil.

The compounds of this disclosure can be applied without other adjuvants, but most often application will be of a formulation comprising one or more active ingredients with suitable carriers, diluents, and surfactants and possibly in combination with a food depending on the contemplated end use. One method of application involves spraying a water dispersion or refined oil solution of a compound of the present disclosure. Combinations with spray oils, spray oil concentrations, spreader stickers, adjuvants, other solvents, and synergists such as piperonyl butoxide often enhance compound efficacy. For nonagronomic uses such sprays can be applied from spray containers such as a can, a bottle or other container, either by means of a pump or by releasing it from a pressurized container, e.g., a pressurized aerosol spray can. Such spray compositions can take various forms, for example, sprays, mists, foams, fumes or fog. Such spray compositions thus can further comprise propellants, foaming agents, etc. as the case may be. Of note is a spray composition comprising a biologically effective amount of a compound or a composition of the present disclosure and a carrier. One embodiment of such a spray composition comprises a biologically effective amount of a compound or a composition of the present disclosure and a propellant. Representative propellants include, but are not limited to, methane, ethane, propane, butane, isobutane, butene, pentane, isopentane, neopentane, pentene, hydrofluorocarbons, chlorofluorocarbons, dimethyl ether, and mixtures of the foregoing. Of note is a spray composition (and a method utilizing such a spray composition dispensed from a spray container) used to control at least one invertebrate pest selected from the group consisting of mosquitoes, black flies, stable flies, deer flies, horse flies, wasps, yellow jackets, hornets, ticks, spiders, ants, gnats, and the like, including individually or in combinations.

The rate of application required for effective control (i.e. "biologically effective amount") will depend on such factors as the species of invertebrate to be controlled, the pest's life cycle, life stage, its size, location, time of year, host crop or animal, feeding behavior, mating behavior, ambient moisture, temperature, and the like. Under normal circumstances, application rates of about 0.01 to 2 kg of active ingredients per hectare are sufficient to control pests in agronomic ecosystems, but as little as 0.0001 kg/hectare may be sufficient or as much as 8 kg/hectare may be required. For non-agronomic applications, effective use rates will range from about 1.0 to 50 mg/square meter but as little as 0.1 mg/square meter may be sufficient or as much as 150 mg/square meter may be required. One skilled in the art can easily determine the biologically effective amount necessary for the desired level of invertebrate pest control.

Enhanced activity has been described as "the cooperative action of two components (e.g., component (a) and component (b)) in a mixture, such that the total effect is greater or more prolonged than the sum of the effects of the two (or more) taken independently" (see P. M. L. Tames, Neth. J. Plant Pathology 1964, 70, 73-80). Mixtures containing the compounds of Formula I together with other invertebrate pest control agents are found to exhibit enhanced effects against certain important invertebrate pests.

The presence of an enhanced effect between two active ingredients is established with the aid of the Colby equation (see S. R. Colby, "Calculating Synergistic and Antagonistic Responses of Herbicide Combinations", Weeds, 1967, 15, 20-22):

$$p = A + B - \left[\frac{A \times B}{100}\right]$$

Using the method of Colby, the presence of an enhanced interaction between two active ingredients is established by first calculating the predicted activity, p, of the mixture based on activities of the two components applied alone. If p is lower than the experimentally established effect, an enhanced interaction has occurred. If p is equal or higher than the experimentally established effect, the interaction between the two components is characterized to be only additive or antagonism. In the equation above, A is the observed result of one component applied alone at rate x. The B term is the observed result of the second component applied at rate y. The equation estimates p, the expected result of the mixture of A at rate x with B at rate y. To use the Colby equation the active ingredients of the mixture are applied in the test separately as well as in combination.

All patents and patent applications mentioned in this application are incorporated by reference herein in their entireties for all purposes. In case of conflict between the present disclosure and that of a patent or publication incorporated by reference, the present disclosure controls.

The following non-limiting examples are purely illustrative.

Biological Examples

The following tests demonstrate the control efficacy of mixtures or compositions of this disclosure on specific pests. The pest control protection afforded by the mixtures or compositions is not limited, however, to these species. The analysis of enhanced activity between the mixtures or compositions was determined using Colby's equation. The average % mortality data for the test compounds alone were inserted into the Colby's equation. If the observed (obs) average % mortality was higher than "p", the expected (exp) % mortality, the mixture or composition had enhanced effects. If the observed average % mortality was equal to or lower than the expected mortality, the mixture or composition either had no enhanced effect. For bioassays where insect feeding damage was evaluated, enhanced activity is identified when the observed plant damage is less than the expected plant damage rating; ratings ranged between 0 (no damage) and 10 (dead plant) and each value was converted to a % plant protection.

100−(Obs Plant Damage*10)

Thus, a plant given a plant damage rating of 3 out of 10 is equivalent to 70% plant protection In all of these tests, compounds of Formula I are Compounds 1 (Cpd 1), 2 (Cpd2), and 3 (Cpd3) and compounds of Formula II are compounds 4 (Cpd4) and 5 (Cpd 5).

Test A

For evaluating control of cyantraniliprole, acetamiprid, imidacloprid, spirotetramat, spirodiclofen, chlorantraniliprole, bifenthrin, indoxacarb, Avermectin, *Bacillus* spp. and any active crystal proteins, Buprofezin, Carbofuran, Chlorfenapyr, Chlorpyrifos, Clothianidin, Cyromazine, Diafenthiuron, Dinotefuran, Emamectin Benzoate, Fipronil, Flonicamid, Flupyradifurone, methomyl (Lannate®), Methoxyfenozide, Novaluron, Permethrin, Pyriproxifen, Sulfoxaflor, Thiamethoxam, γ-Cyhalothrin, or ζ-cypermethrin, broflanilide, dimpropyridaz, isocycloseram, tetrachlorantraniliprole, oxazosulfyl, tyclopyrazoflor, flupyrimin, spiropidion, acynonapyr, benzpyrimoxan, chloroprallethrin, epsilon-metofluthrin, kappa-bifenthrin, dicloromezotiaz, and kappa-tefluthrin.

For evaluating control of silverleaf whitefly (*Bemisia argentifolii* Bellows and Perring) through contact and/or systemic means, each test unit consisted of a small open container with a 12- to 14-day-old cotton plant or 5-7 day old soybean plant inside. This was pre-infested by placing test units into cages containing adult whiteflies so that oviposition on the cotton leaves could occur. The adults were removed from the plants with an air-blast nozzle, and the test units were capped. The test units were then stored 2 to 3 days before spraying.

Test compounds were formulated using a solution containing 10% acetone, 90% water and 300 ppm Activator 90@ Spreader Lo-Foam Formula non-ionic surfactant containing alkylarylpolyoxyethylene, free fatty acids, glycols and 2-propanol (Loveland Industries, Inc.) to provide the desired concentration in ppm. Formulated test solutions were then applied in 1 mL volumes through a SUJ2 atomizer nozzle with ⅛ JJ custom body (Spraying Systems Co.) positioned 1.27 cm (0.5 inches) above the top of each test unit.

The results for all experimental compositions in this test were replicated three times. After spraying of the formulated test composition, each test unit was allowed to dry for 1 hour and the cap removed. The test units were held for 13 days in a growth chamber at 28° C. and 50-70% relative humidity. Each test unit was then assessed for insect mortality using a binocular microscope; the results are listed in Tables 2a-i.

TABLE 2a

Mixtures comprising Cyantraniliprole and their activity on Silverleaf Whitefly

| Treatment | Rate [ppm] | Ratio | % Mortality (obs) | % Mortality (exp) |
| --- | --- | --- | --- | --- |
| Cpd 4 | 50 | | 5.9 | |
| Cpd 4 | 250 | | 11.1 | |
| Cpd 2 | 50 | | 10.9 | |
| Cpd 2 | 250 | | 74.5 | |
| Cpd 1 | 50 | | 0 | |
| Cpd 1 | 250 | | 18.8 | |
| Cpd 3 | 50 | | 25 | |
| Cpd 3 | 250 | | 1.6 | |
| Cpd 5 | 50 | | 17 | |
| Cpd 5 | 250 | | 13.5 | |
| Cyantraniliprole | 3 | | 29.1 | |
| Cyantraniliprole | 5.5 | | 61.1 | |
| Cpd 4 + Cyantraniliprole | 50 + 3 | 1:0.06 | 25 | 62.7 |
| Cpd 4 + Cyantraniliprole | 50 + 5.5 | 1:0.11 | 69.4 | 82.2 |
| Cpd 4 + Cyantraniliprole | 250 + 3 | 1:0.012 | 21.5 | 31.4 |
| Cpd 4 + Cyantraniliprole | 250 + 5.5 | 1:0.022 | 67.9 | 73.3 |
| Cpd 2 + Cyantraniliprole | 50 + 3 | 1:0.06 | 38.2* | 26.5 |
| Cpd 2 + Cyantraniliprole | 50 + 5.5 | 1:0.11 | 66.7 | 76 |
| Cpd 2 + Cyantraniliprole | 250 + 3 | 1:0.012 | 94.8* | 42.9 |
| Cpd 2 + Cyantraniliprole | 250 + 5.5 | 1:0.022 | 100.0* | 84 |
| Cpd 1 + Cyantraniliprole | 50 + 3 | 1:0.06 | 27.9 | 37.3 |
| Cpd 1 + Cyantraniliprole | 50 + 5.5 | 1:0.11 | 89.8* | 76.3 |
| Cpd 1 + Cyantraniliprole | 250 + 3 | 1:0.012 | 76.1* | 16.2 |
| Cpd 1 + Cyantraniliprole | 250 + 5.5 | 1:0.022 | 77.1 | 77.4 |
| Cpd 3 + Cyantraniliprole | 50 + 3 | 1:0.06 | 24.6* | 10.9 |
| Cpd 3 + Cyantraniliprole | 50 + 5.5 | 1:0.11 | 70.5 | 79.3 |
| Cpd 3 + Cyantraniliprole | 250 + 3 | 1:0.012 | 39.2* | 25 |
| Cpd 3 + Cyantraniliprole | 250 + 5.5 | 1:0.022 | 71.6* | 20.1 |
| Cpd 5 + Cyantraniliprole | 50 + 3 | 1:0.06 | 39.2* | 37.7 |
| Cpd 5 + Cyantraniliprole | 50 + 5.5 | 1:0.11 | 45.8* | 14.9 |
| Cpd 5 + Cyantraniliprole | 250 + 3 | 1:0.012 | 59.2* | 41.2 |
| Cpd 5 + Cyantraniliprole | 250 + 5.5 | 1:0.022 | 68.2* | 66.3 |

*Denotes enhanced efficacy based on Colby formula

TABLE 2b

Mixtures comprising Acetamiprid and their activity on Silverleaf Whitefly

| Treatment | Rate [ppm] | Ratio | % Mortality (obs) | % Mortality (exp) |
|---|---|---|---|---|
| Cpd 4 | 50 | | 46.7 | |
| Cpd 4 | 250 | | 20 | |
| Cpd 2 | 50 | | 80 | |
| Cpd 2 | 250 | | 53.3 | |
| Cpd 1 | 50 | | 80 | |
| Cpd 1 | 250 | | 0 | |
| Cpd 3 | 50 | | 0 | |
| Cpd 3 | 250 | | 0 | |
| Cpd 5 | 50 | | 49 | |
| Cpd 5 | 250 | | 19.2 | |
| Acetamiprid | 2.52 | | 6.5 | |
| Acetamiprid | 6.88 | | 25.4 | |
| Cpd 4 + Acetamiprid | 50 + 2.52 | 1:0.0504 | 65.7* | 50.1 |
| Cpd 4 + Acetamiprid | 50 + 6.88 | 1:0.1376 | 43.6 | 60.2 |
| Cpd 4 + Acetamiprid | 250 + 2.52 | 1:0.01008 | 40.3* | 25.2 |
| Cpd 4 + Acetamiprid | 250 + 6.88 | 1:0.02752 | 81.9* | 40.3 |
| Cpd 2 + Acetamiprid | 50 + 2.52 | 1:0.0504 | 28 | 81.3 |
| Cpd 2 + Acetamiprid | 50 + 6.88 | 1:0.1376 | 53.1 | 85.1 |
| Cpd 2 + Acetamiprid | 250 + 2.52 | 1:0.01008 | 60.0* | 56.3 |
| Cpd 2 + Acetamiprid | 250 + 6.88 | 1:0.02752 | 100.0* | 65.2 |
| Cpd1 + Acetamiprid | 50 + 2.52 | 1:0.0504 | 34.1 | 81.3 |
| Cpd 1 + Acetamiprid | 50 + 6.88 | 1:0.1376 | 44.7* | 25.4 |
| Cpd 1 + Acetamiprid | 250 + 2.52 | 1:0.01008 | 23.3* | 6.5 |
| Cpd1 + Acetamiprid | 250 + 6.88 | 1:0.02752 | 62.3* | 25.4 |
| Cpd 3 + Acetamiprid | 50 + 2.52 | 1:0.0504 | 20.5* | 6.5 |
| Cpd 3 + Acetamiprid | 50 + 6.88 | 1:0.1376 | 40.4* | 25.4 |
| Cpd 3 + Acetamiprid | 250 + 2.52 | 1:0.01008 | 21.6* | 6.5 |
| Cpd 3 + Acetamiprid | 250 + 6.88 | 1:0.02752 | 62.2* | 25.4 |
| Cpd 5 + Acetamiprid | 50 + 2.52 | 1:0.0504 | 45.3 | 52.3 |
| Cpd 5 + Acetamiprid | 50 + 6.88 | 1:0.1376 | 83.7* | 61.9 |
| Cpd 5 + Acetamiprid | 250 + 2.52 | 1:0.01008 | 56.4* | 24.4 |
| Cpd 5 + Acetamiprid | 250 + 6.88 | 1:0.02752 | 64.4* | 39.7 |

*Denotes enhanced efficacy based on Colby formula

TABLE 2c

Mixtures comprising Imidacloprid and their activity on Silverleaf Whitefly

| Treatment | Rate [ppm] | Ratio | % Mortality (obs) | % Mortality (exp) |
|---|---|---|---|---|
| Cpd 4 | 50 | | 16.1 | |
| Cpd 4 | 250 | | 20.5 | |
| Cpd 2 | 50 | | 11.8 | |
| Cpd 2 | 250 | | 75.4 | |
| Cpd 1 | 50 | | 0 | |
| Cpd 1 | 250 | | 3.1 | |
| Cpd 3 | 50 | | 16.1 | |
| Cpd 3 | 250 | | 26.7 | |
| Cpd 5 | 50 | | 56.5 | |
| Cpd 5 | 250 | | 41.1 | |
| Imidacloprid | 15.1 | | 0 | |
| Imidacloprid | 21.15 | | 24.7 | |
| Cpd 4 + Imidacloprid | 50 + 15.1 | 1:0.302 | 50.0* | 16.1 |
| Cpd 4 + Imidacloprid | 50 + 21.15 | 1:0.423 | 39.7* | 36.8 |
| Cpd 4 + Imidacloprid | 250 + 15.1 | 1:0.0604 | 0 | 20.5 |
| Cpd 4 + Imidacloprid | 250 + 21.15 | 1:0.0846 | 13 | 40.1 |
| Cpd 2 + Imidacloprid | 50 + 15.1 | 1:0.302 | 26.3* | 11.8 |
| Cpd 2 + Imidacloprid | 50 + 21.15 | 1:0.423 | 58.1* | 33.5 |
| Cpd 2 + Imidacloprid | 250 + 15.1 | 1:0.0604 | 96.7* | 75.4 |
| Cpd 2 + Imidacloprid | 250 + 21.15 | 1:0.0846 | 100.0* | 81.5 |
| Cpd 1 + Imidacloprid | 50 + 15.1 | 1:0.302 | 34.3* | 0 |
| Cpd 1 + Imidacloprid | 50 + 21.15 | 1:0.423 | 41.3* | 24.7 |
| Cpd 1 + Imidacloprid | 250 + 15.1 | 1:0.0604 | 23.8* | 3.1 |
| Cpd 1 + Imidacloprid | 250 + 21.15 | 1:0.0846 | 34.7 | 40.1 |
| Cpd 3 + Imidacloprid | 50 + 15.1 | 1:0.302 | 0 | 16.1 |
| Cpd 3 + Imidacloprid | 50 + 21.15 | 1:0.423 | 13.7 | 36.8 |
| Cpd 3 + Imidacloprid | 250 + 15.1 | 1:0.0604 | 0 | 26.7 |
| Cpd 3 + Imidacloprid | 250 + 21.15 | 1:0.0846 | 36.0* | 27 |
| Cpd 5 + Imidacloprid | 50 + 15.1 | 1:0.302 | 25.2* | 16.1 |
| Cpd 5 + Imidacloprid | 50 + 21.15 | 1:0.423 | 54.4 | 67.3 |

TABLE 2c-continued

Mixtures comprising Imidacloprid and their activity on Silverleaf Whitefly

| Treatment | Rate [ppm] | Ratio | % Mortality (obs) | % Mortality (exp) |
|---|---|---|---|---|
| Cpd 5 + Imidacloprid | 250 + 15.1 | 1:0.0604 | 54.4 | 55.6 |
| Cpd 5 + Imidacloprid | 250 + 21.15 | 1:0.0846 | 23.4 | 55.6 |

*Denotes enhanced efficacy based on Colby formula

TABLE 2d

Mixtures comprising Spirotetramat and their activity on Silverleaf Whitefly

| Treatment | Rate [ppm] | Ratio | % Mortality (obs) | % Mortality (exp) |
|---|---|---|---|---|
| Cpd 4 | 50 | | 4.9 | |
| Cpd 4 | 250 | | 8.3 | |
| Cpd 2 | 50 | | 7.5 | |
| Cpd 2 | 250 | | 28 | |
| Cpd 1 | 50 | | 0 | |
| Cpd 1 | 250 | | 1.3 | |
| Cpd 3 | 50 | | 1.2 | |
| Cpd 3 | 250 | | 1.1 | |
| Cpd 5 | 50 | | 8.9 | |
| Cpd 5 | 250 | | 11.7 | |
| Spirotetramat | 50 | | 2.1 | |
| Spirotetramat | 250 | | 34.4 | |
| Cpd 4 + Spirotetramat | 50 + 50 | 1:1 | 0 | 6.8 |
| Cpd 4 + Spirotetramat | 50 + 250 | 1:5 | 9.1 | 37.6 |
| Cpd 4 + Spirotetramat | 250 + 50 | 1:0.2 | 0 | 10.2 |
| Cpd 4 + Spirotetramat | 250 + 250 | 1:1 | 1.9 | 39.9 |
| Cpd 2 + Spirotetramat | 50 + 50 | 1:1 | 0 | 9.4 |
| Cpd 2 + Spirotetramat | 50 + 250 | 1:5 | 9.4 | 39.3 |
| Cpd 2 + Spirotetramat | 250 + 50 | 1:0.2 | 25.3 | 29.5 |
| Cpd 2 + Spirotetramat | 250 + 250 | 1:1 | 53.0* | 52.8 |
| Cpd 1 + Spirotetramat | 50 + 50 | 1:1 | 2.4* | 2.1 |
| Cpd 1 + Spirotetramat | 50 + 250 | 1:5 | 20.5 | 34.4 |
| Cpd 1 + Spirotetramat | 250 + 50 | 1:0.2 | 0 | 2.1 |
| Cpd 1 + Spirotetramat | 250 + 250 | 1:1 | 31.4 | 34.4 |
| Cpd 3 + Spirotetramat | 50 + 50 | 1:1 | 0 | 2.1 |
| Cpd 3 + Spirotetramat | 50 + 250 | 1:5 | 28.1 | 34.4 |
| Cpd 3 + Spirotetramat | 250 + 50 | 1:0.2 | 0 | 2.1 |
| Cpd 3 + Spirotetramat | 250 + 250 | 1:1 | 61.0* | 34.4 |
| Cpd 5 + Spirotetramat | 50 + 50 | 1:1 | 32.8* | 10.8 |
| Cpd 5 + Spirotetramat | 50 + 250 | 1:5 | 35.7 | 40.2 |
| Cpd 5 + Spirotetramat | 250 + 50 | 1:0.2 | 46.4* | 13.5 |
| Cpd 5 + Spirotetramat | 250 + 250 | 1:1 | 28.8 | 42.1 |

*Denotes enhanced efficacy based on Colby formula

TABLE 2e

Mixtures comprising Chlorantraniliprole and their activity on Silverleaf Whitefly

| Treatment | Rate [ppm] | Ratio | % Mortality (obs) | % Mortality (exp) |
|---|---|---|---|---|
| Cpd 4 | 50 | | 29 | |
| Cpd 4 | 250 | | 38.3 | |
| Cpd 2 | 50 | | 17.8 | |
| Cpd 2 | 250 | | 90.2 | |
| Cpd 1 | 50 | | 0 | |
| Cpd 1 | 250 | | 2.2 | |
| Cpd 3 | 50 | | 1.3 | |
| Cpd 3 | 250 | | 1.2 | |
| Cpd 5 | 50 | | 56.3 | |
| Cpd 5 | 250 | | 11.2 | |
| Chlorantraniliprole | 0.54 | | 0 | |
| Chlorantraniliprole | 189.1 | | 59.2 | |
| Cpd 4 + Chlorantraniliprole | 50 + 0.54 | 1:0.0108 | 27.6 | 29 |
| Cpd 4 + Chlorantraniliprole | 50 + 189.1 | 1:3.782 | 97.1* | 71.1 |
| Cpd 4 + Chlorantraniliprole | 250 + 0.54 | 1:0.0022 | 20.6 | 38.3 |
| Cpd 4 + Chlorantraniliprole | 250 + 189.1 | 1:0.7564 | 69.1 | 74.9 |
| Cpd 2 + Chlorantraniliprole | 50 + 0.54 | 1:0.0108 | 1.2 | 17.8 |
| Cpd 2 + Chlorantraniliprole | 50 + 189.1 | 1:3.782 | 59.7 | 66.5 |
| Cpd 2 + Chlorantraniliprole | 250 + 0.54 | 1:0.0022 | 70.5 | 90.2 |

TABLE 2e-continued

Mixtures comprising Chlorantraniliprole and their activity on Silverleaf Whitefly

| Treatment | Rate [ppm] | Ratio | % Mortality (obs) | % Mortality (exp) |
|---|---|---|---|---|
| Cpd 2 + Chlorantraniliprole | 250 + 189.1 | 1:0.7564 | 78.1 | 96 |
| Cpd 1 + Chlorantraniliprole | 50 + 0.54 | 1:0.0108 | 0 | 0 |
| Cpd 1 + Chlorantraniliprole | 50 + 189.1 | 1:3.782 | 55.1 | 59.2 |
| Cpd 1 + Chlorantraniliprole | 250 + 0.54 | 1:0.0022 | 1.3 | 2.2 |
| Cpd 1 + Chlorantraniliprole | 250 + 189.1 | 1:0.7564 | 75.0* | 60.2 |
| Cpd 3 + Chlorantraniliprole | 50 + 0.54 | 1:0.0108 | 3.7* | 1.3 |
| Cpd 3 + Chlorantraniliprole | 50 + 189.1 | 1:3.782 | 39.7 | 59.8 |
| Cpd 3 + Chlorantraniliprole | 250 + 0.54 | 1:0.0022 | 12.0* | 1.2 |
| Cpd 3 + Chlorantraniliprole | 250 + 189.1 | 1:0.7564 | 69.0* | 59.7 |
| Cpd 5 + Chlorantraniliprole | 50 + 0.54 | 1:0.0108 | 7.9 | 56.3 |
| Cpd 5 + Chlorantraniliprole | 50 + 189.1 | 1:3.782 | 48.9 | 82.2 |
| Cpd 5 + Chlorantraniliprole | 250 + 0.54 | 1:0.0022 | 13.5* | 11.2 |
| Cpd 5 + Chlorantraniliprole | 250 + 189.1 | 1:0.7564 | 59.7 | 63.8 |

*Denotes enhanced efficacy based on Colby formula

TABLE 2f

Mixtures comprising Bifenthrin and their activity on Silverleaf Whitefly

| Treatment | Rate [ppm] | Ratio | % Mortality (obs) | % Mortality (exp) |
|---|---|---|---|---|
| Cpd 4 | 50 | | 15 | |
| Cpd 4 | 250 | | 17.9 | |
| Cpd 2 | 50 | | 15.7 | |
| Cpd 2 | 250 | | 90.6 | |
| Cpd 1 | 50 | | 9.3 | |
| Cpd 1 | 250 | | 0 | |
| Cpd 3 | 50 | | 21.2 | |
| Cpd 3 | 250 | | 25.3 | |
| Cpd 5 | 50 | | 84.4 | |
| Cpd 5 | 250 | | 55.1 | |
| Bifenthrin | 50 | | 0 | |
| Bifenthrin | 250 | | 0 | |
| Cpd 4 + Bifenthrin | 50 + 50 | 1:1 | 17.9* | 15 |
| Cpd 4 + Bifenthrin | 50 + 250 | 1:5 | 78.3* | 15 |
| Cpd 4 + Bifenthrin | 250 + 50 | 1:0.2 | 14.3 | 17.9 |
| Cpd 4 + Bifenthrin | 250 + 250 | 1:1 | 60.3* | 17.9 |
| Cpd 2 + Bifenthrin | 50 + 50 | 1:1 | 22.5* | 15.7 |
| Cpd 2 + Bifenthrin | 50 + 250 | 1:5 | 75.0* | 15.7 |
| Cpd 2 + Bifenthrin | 250 + 50 | 1:0.2 | 100* | 90.6 |
| Cpd 2 + Bifenthrin | 250 + 250 | 1:1 | 100* | 90.6 |
| Cpd 1 + Bifenthrin | 50 + 50 | 1:1 | 0 | 9.3 |
| Cpd 1 + Bifenthrin | 50 + 250 | 1:5 | 4.8* | 0 |
| Cpd 1 + Bifenthrin | 250 + 50 | 1:0.2 | 3.6* | 0 |
| Cpd 1 + Bifenthrin | 250 + 250 | 1:1 | 11.9* | 0 |
| Cpd 3 + Bifenthrin | 50 + 50 | 1:1 | 0 | 0 |
| Cpd 3 + Bifenthrin | 50 + 250 | 1:5 | 24.2* | 0 |
| Cpd 3 + Bifenthrin | 250 + 50 | 1:0.2 | 0 | 0 |
| Cpd 3 + Bifenthrin | 250 + 250 | 1:1 | 27.6* | 0 |
| Cpd 5 + Bifenthrin | 50 + 50 | 1:1 | 26.7 | 84.4 |
| Cpd 5 + Bifenthrin | 50 + 250 | 1:5 | 95.2* | 84.4 |
| Cpd 5 + Bifenthrin | 250 + 50 | 1:0.2 | 27.3 | 55.1 |
| Cpd 5 + Bifenthrin | 250 + 250 | 1:1 | 74.6* | 55.1 |

*Denotes enhanced efficacy based on Colby formula

TABLE 2g

Mixtures comprising Indoxacarb and their activity on Silverleaf Whitefly

| Treatment | Rate [ppm] | Ratio | % Mortality (obs) | % Mortality (exp) |
|---|---|---|---|---|
| Cpd 4 | 50 | | 30.6 | |
| Cpd 4 | 250 | | 23.1 | |
| Cpd 2 | 50 | | 31.1 | |
| Cpd 2 | 250 | | 91.7 | |
| Cpd 1 | 50 | | 2.6 | |
| Cpd 1 | 250 | | 2.1 | |

TABLE 2g-continued

Mixtures comprising Indoxacarb and their activity on Silverleaf Whitefly

| Treatment | Rate [ppm] | Ratio | % Mortality (obs) | % Mortality (exp) |
|---|---|---|---|---|
| Cpd 3 | 50 | | 18 | |
| Cpd 3 | 250 | | 27.7 | |
| Cpd 5 | 50 | | 30 | |
| Cpd 5 | 250 | | 73.4 | |
| Indoxacarb | 50 | | 1.2 | |
| Indoxacarb | 250 | | 0 | |
| Cpd 4 + Indoxacarb | 50 + 50 | 1:1 | 38.2* | 31.5 |
| Cpd 4 + Indoxacarb | 50 + 250 | 1:5 | 90.3* | 30.6 |
| Cpd 4 + Indoxacarb | 250 + 50 | 1:0.2 | 11.1 | 24 |
| Cpd 4 + Indoxacarb | 250 + 250 | 1:1 | 35.5* | 23.1 |
| Cpd 2 + Indoxacarb | 50 + 50 | 1:1 | 1.7 | 32 |
| Cpd 2 + Indoxacarb | 50 + 250 | 1:5 | 2.5 | 31.1 |
| Cpd 2 + Indoxacarb | 250 + 50 | 1:0.2 | 100.0* | 91.8 |
| Cpd 2 + Indoxacarb | 250 + 250 | 1:1 | 97.4* | 91.7 |
| Cpd 1 + Indoxacarb | 50 + 50 | 1:1 | 8.0* | 3.8 |
| Cpd 1 + Indoxacarb | 50 + 250 | 1:5 | 1.5* | 0 |
| Cpd 1 + Indoxacarb | 250 + 50 | 1:0.2 | 0 | 1.2 |
| Cpd 1 + Indoxacarb | 250 + 250 | 1:1 | 6.7* | 0 |
| Cpd 3 + Indoxacarb | 50 + 50 | 1:1 | 20.4* | 1.2 |
| Cpd 3 + Indoxacarb | 50 + 250 | 1:5 | 8.8* | 0 |
| Cpd 3 + Indoxacarb | 250 + 50 | 1:0.2 | 1.6* | 1.2 |
| Cpd 3 + Indoxacarb | 250 + 250 | 1:1 | 0 | 0 |
| Cpd 5 + Indoxacarb | 50 + 50 | 1:1 | 46.0* | 30.9 |
| Cpd 5 + Indoxacarb | 50 + 250 | 1:5 | 83.8* | 30 |
| Cpd 5 + Indoxacarb | 250 + 50 | 1:0.2 | 50 | 73.8 |
| Cpd 5 + Indoxacarb | 250 + 250 | 1:1 | 73.9* | 73.4 |

*Denotes enhanced efficacy based on Colby formula

TABLE 2h

Mixtures with Spinetoram and activity on Silverleaf Whitefly

| Treatment | Rate [ppm] | Ratio | % Mortality (obs) | % Mortality (exp) |
|---|---|---|---|---|
| Cpd 4 | 50 | | 0.9 | |
| Cpd 4 | 250 | | 9.2 | |
| Cpd 2 | 50 | | 0 | |
| Cpd 2 | 250 | | 2.9 | |
| Cpd 1 | 50 | | 2.4 | |
| Cpd 1 | 250 | | 7.6 | |
| Cpd 3 | 50 | | 0 | |
| Cpd 3 | 250 | | 0 | |
| Cpd 5 | 50 | | 0 | |
| Cpd 5 | 250 | | 6.9 | |
| Spinetoram | 5 | | 0 | |
| Spinetoram | 29.5 | | 64.4 | |
| Cpd 4 + Spinetoram | 50 + 5 | 1:0.1 | 20.5 | 0.9 |
| Cpd 4 + Spinetoram | 50 + 29.5 | 1:0.59 | 88.9* | 64.7 |
| Cpd 4 + Spinetoram | 250 + 5 | 1:0.02 | 44.6 | 67.7 |
| Cpd 4 + Spinetoram | 250 + 29.5 | 1:0.118 | 77.6* | 67.7 |
| Cpd 2 + Spinetoram | 50 + 5 | 1:0.1 | 23.9 | 64.7 |
| Cpd 2 + Spinetoram | 50 + 29.5 | 1:0.59 | 85.5* | 64.7 |
| Cpd 2 + Spinetoram | 250 + 5 | 1:0.02 | 21.1* | 9.2 |
| Cpd 2 + Spinetoram | 250 + 29.5 | 1:0.118 | 92.2* | 67.7 |
| Cpd 1 + Spinetoram | 50 + 5 | 1:0.1 | 20.5* | 0.9 |
| Cpd 1 + Spinetoram | 50 + 29.5 | 1:0.59 | 83.8* | 64.7 |
| Cpd 1 + Spinetoram | 250 + 5 | 1:0.02 | 16.7* | 9.2 |
| Cpd 1 + Spinetoram | 250 + 29.5 | 1:0.118 | 98.0* | 67.7 |
| Cpd 3 + Spinetoram | 50 + 5 | 1:0.1 | 8.5* | 0.9 |
| Cpd 3 + Spinetoram | 50 + 29.5 | 1:0.59 | 62.0 | 64.7 |
| Cpd 3 + Spinetoram | 250 + 5 | 1:0.02 | 19.1* | 9.2 |
| Cpd 3 + Spinetoram | 250 + 29.5 | 1:0.118 | 48.0 | 67.7 |
| Cpd 5 + Spinetoram | 50 + 5 | 1:0.1 | 20.0* | 0.9 |
| Cpd 5 + Spinetoram | 50 + 29.5 | 1:0.59 | 100* | 64.7 |
| Cpd 5 + Spinetoram | 250 + 5 | 1:0.02 | 22.6* | 9.2 |
| Cpd 5 + Spinetoram | 250 + 29.5 | 1:0.118 | 70.7* | 67.7 |

*Denotes enhanced efficacy based on Colby formula

TABLE 2i

Mixtures with Pyriproxyfen and activity on Silverleaf Whitefly

| Treatment | Rate [ppm] | Ratio | % Mortality (obs) | % Mortality (exp) |
|---|---|---|---|---|
| Cpd 4 | 50 | | 7 | |
| Cpd 4 | 250 | | 8 | |
| Cpd 5 | 50 | | 0 | |
| Cpd 5 | 250 | | 0 | |
| Pyriproxyfen | 0.053 | | 68 | |
| Cpd 4 + Pyriproxyfen | 50 + 0.053 | 1:0.00106 | 46 | 70 |
| Cpd 4 + Pyriproxyfen | 250 + 0.053 | 1:0.000212 | 66 | 70 |
| Cpd 5 + Pyriproxyfen | 50 + 0.053 | 1:0.00106 | 64 | 68 |
| Cpd 5 + Pyriproxyfen | 250 + 0.053 | 1:0.000212 | 65 | 68 |

Test B

For evaluating control of the Western Flower *Thrips* (*Frankliniella occidentalis* Pergande) through contact and/or systemic means, each test unit consisted of a small open container with a 5- to 7-day-old bean (var. Soleil) plant inside.

Test solutions were formulated and sprayed with 3 replications as described for Test A. After spraying, the test units were allowed to dry for 1 hour, 22 to 27 adult *thrips* were added to each unit and then a black, screened cap was placed on top. The test units were held for 7 days at 25° C. and 45-55% relative humidity. To evaluate the level of plant protection provided by each treatment, each test unit was then visually assessed for plant damage inflicted by insect feeding and rated 0-10, where 0=undamaged and 10=plant is dead; the results are listed in Tables 3a-g.

TABLE 3a

Mixtures comprising Cyantraniliprole and their activity on Western Flower Thrips

| Treatment | Rate [ppm] | Ratio | Plant Damage (obs) | Plant Damage (exp) |
|---|---|---|---|---|
| Cpd 4 | 11.1 | | 43.3 | |
| Cpd 4 | 36.8 | | 86.7 | |
| Cpd 2 | 1.5 | | 13.3 | |
| Cpd 2 | 4.5 | | 56.7 | |
| Cpd 1 | 3.18 | | 33.3 | |
| Cpd 1 | 9.75 | | 73.3 | |
| Cpd 3 | 2.93 | | 13.3 | |
| Cpd 3 | 16.1 | | 83.3 | |
| Cpd 5 | 0.4 | | 20.0 | |
| Cpd 5 | 2 | | 40.0 | |
| Cyantraniliprole | 0.08 | | 6.7 | |
| Cyantraniliprole | 0.28 | | 43.3 | |
| Cpd 4 + Cyantraniliprole | 11.1 + 0.08 | 1:0.0072 | 46.7 | 47.1 |
| Cpd 4 + Cyantraniliprole | 11.1 + 0.28 | 1:0.0252 | 83.3* | 67.9 |
| Cpd 4 + Cyantraniliprole | 36.8 + 0.08 | 1:0.0022 | 73.3 | 87.6 |
| Cpd 4 + Cyantraniliprole | 36.8 + 0.28 | 1:0.0076 | 86.7* | 50.9 |
| Cpd 2 + Cyantraniliprole | 1.5 + 0.08 | 1:0.0533 | 56.7* | 19.1 |
| Cpd 2 + Cyantraniliprole | 1.5 + 0.28 | 1:0.1867 | 66.7* | 59.6 |
| Cpd 2 + Cyantraniliprole | 4.5 + 0.08 | 1:0.0178 | 76.7 | 76.9 |
| Cpd 2 + Cyantraniliprole | 4.5 + 0.28 | 1:0.0622 | 86.7* | 75.4 |
| Cpd 1 + Cyantraniliprole | 3.18 + 0.08 | 1:0.0252 | 70.0* | 37.8 |
| Cpd 1 + Cyantraniliprole | 3.18 + 0.28 | 1:0.0881 | 70.0* | 62.2 |
| Cpd 1 + Cyantraniliprole | 9.75 + 0.08 | 1:0.0082 | 36.7 | 75.1 |
| Cpd 1 + Cyantraniliprole | 9.75 + 0.28 | 1:0.0287 | 90.0* | 84.9 |
| Cpd 3 + Cyantraniliprole | 2.93 + 0.08 | 1:0.0273 | 36.7* | 19.1 |
| Cpd 3 + Cyantraniliprole | 2.93 + 0.28 | 1:0.0956 | 63.3* | 50.9 |
| Cpd 3 + Cyantraniliprole | 16.1 + 0.08 | 1:0.005 | 70.0 | 90.6 |
| Cpd 3 + Cyantraniliprole | 16.1 + 0.28 | 1:0.0174 | 96.7* | 90.6 |
| Cpd 5 + Cyantraniliprole | 0.4 + 0.08 | 1:0.2 | 20.0 | 25.3 |
| Cpd 5 + Cyantraniliprole | 0.4 + 0.28 | 1:0.7 | 23.3 | 54.7 |
| Cpd 5 + Cyantraniliprole | 2 + 0.08 | 1:0.04 | 36.7 | 44.0 |
| Cpd 5 + Cyantraniliprole | 2 + 0.28 | 1:0.14 | 60.0 | 66.0 |

*Denotes enhanced plant protection based on Colby formula

TABLE 3b

Mixtures comprising Acetamiprid and their activity on Western Flower Thrips

| Treatment | Rate [ppm] | Ratio | Plant Protection (obs) | Plant Protection (exp) |
|---|---|---|---|---|
| Cpd 4 | 11.1 | | 40.0 | |
| Cpd 4 | 36.8 | | 86.7 | |

TABLE 3b-continued

Mixtures comprising Acetamiprid and their activity on Western Flower Thrips

| Treatment | Rate [ppm] | Ratio | Plant Protection (obs) | Plant Protection (exp) |
|---|---|---|---|---|
| Cpd 2 | 1.5 | | 16.7 | |
| Cpd 2 | 4.5 | | 83.3 | |
| Cpd 1 | 3.18 | | 73.3 | |
| Cpd 1 | 9.75 | | 76.7 | |
| Cpd 3 | 2.93 | | 40.0 | |
| Cpd 3 | 16.1 | | 76.7 | |
| Cpd 5 | 0.4 | | 23.3 | |
| Cpd 5 | 2 | | 36.7 | |
| Acetamiprid | 5.49 | | 30.0 | |
| Acetamiprid | 7.04 | | 70.0 | |
| Cpd 4 + Acetamiprid | 11.1 + 5.49 | 1:0.4946 | 90.0* | 58.0 |
| Cpd 4 + Acetamiprid | 11.1 + 7.04 | 1:0.6342 | 93.3* | 82.0 |
| Cpd 4 + Acetamiprid | 36.8 + 5.49 | 1:0.1492 | 93.3* | 90.7 |
| Cpd 4 + Acetamiprid | 36.8 + 7.04 | 1:0.1913 | 96.7* | 75.0 |
| Cpd 2 + Acetamiprid | 1.5 + 5.49 | 1:3.66 | 86.7* | 41.7 |
| Cpd 2 + Acetamiprid | 1.5 + 7.04 | 1:4.6933 | 86.7 | 88.3 |
| Cpd 2 + Acetamiprid | 4.5 + 5.49 | 1:1.22 | 80.0 | 98.3 |
| Cpd 2 + Acetamiprid | 4.5 + 7.04 | 1:1.5644 | 90.0 | 95.0 |
| Cpd 1 + Acetamiprid | 3.18 + 5.49 | 1:1.7264 | 86.7* | 81.3 |
| Cpd 1 + Acetamiprid | 3.18 + 7.04 | 1:2.2138 | 90.0 | 92.0 |
| Cpd 1 + Acetamiprid | 9.75 + 5.49 | 1:0.5631 | 93.3* | 83.7 |
| Cpd 1 + Acetamiprid | 9.75 + 7.04 | 1:0.7221 | 100.0* | 93.0 |
| Cpd 3 + Acetamiprid | 2.93 + 5.49 | 1:1.8737 | 80.0* | 58.0 |
| Cpd 3 + Acetamiprid | 2.93 + 7.04 | 1:2.4027 | 90.0* | 82.0 |
| Cpd 3 + Acetamiprid | 16.1 + 5.49 | 1:0.341 | 93.3* | 93.0 |
| Cpd 3 + Acetamiprid | 16.1 + 7.04 | 1:0.4373 | 100.0* | 93.0 |
| Cpd 5 + Acetamiprid | 0.4 + 5.49 | 1:13.725 | 30.0 | 46.3 |
| Cpd 5 + Acetamiprid | 0.4 + 7.04 | 1:17.6 | 63.3 | 77.0 |
| Cpd 5 + Acetamiprid | 2 + 5.49 | 1:2.745 | 63.3* | 55.7 |
| Cpd 5 + Acetamiprid | 2 + 7.04 | 1:3.52 | 80.0 | 81.0 |

*Denotes enhanced plant protection based on Colby formula

TABLE 3c

Mixtures comprising Imidacloprid and their activity on Western Flower Thrips

| Treatment | Rate [ppm] | Ratio | Plant Protection (obs) | Plant Protection (exp) |
|---|---|---|---|---|
| Cpd 4 | 11.1 | | 36.7 | |
| Cpd 4 | 36.8 | | 70.0 | |
| Cpd 2 | 1.5 | | 43.3 | |
| Cpd 2 | 4.5 | | 80.0 | |
| Cpd 1 | 3.18 | | 63.3 | |
| Cpd 1 | 9.75 | | 83.3 | |
| Cpd 3 | 2.93 | | 33.3 | |
| Cpd 3 | 16.1 | | 80.0 | |
| Cpd 5 | 0.4 | | 16.7 | |
| Cpd 5 | 2 | | 40.0 | |
| Imidacloprid | 6.4 | | 66.7 | |
| Imidacloprid | 10.9 | | 86.7 | |
| Cpd 4 + Imidacloprid | 11.1 + 6.4 | 1:0.5766 | 90.0* | 78.9 |
| Cpd 4 + Imidacloprid | 11.1 + 10.9 | 1:0.982 | 90.0 | 91.6 |
| Cpd 4 + Imidacloprid | 36.8 + 6.4 | 1:0.1739 | 83.3 | 90.0 |
| Cpd 4 + Imidacloprid | 36.8 + 10.9 | 1:0.2962 | 96.7* | 92.4 |
| Cpd 2 + Imidacloprid | 1.5 + 6.4 | 1:4.2667 | 73.3 | 81.1 |
| Cpd 2 + Imidacloprid | 1.5 + 10.9 | 1:7.2667 | 90.0 | 93.3 |
| Cpd 2 + Imidacloprid | 4.5 + 6.4 | 1:1.4222 | 83.3 | 98.0 |
| Cpd 2 + Imidacloprid | 4.5 + 10.9 | 1:2.4222 | 93.3 | 97.3 |
| Cpd 1 + Imidacloprid | 3.18 + 6.4 | 1:2.0126 | 86.7 | 87.8 |
| Cpd 1 + Imidacloprid | 3.18 + 10.9 | 1:3.4277 | 93.3 | 95.1 |
| Cpd 1 + Imidacloprid | 9.75 + 6.4 | 1:0.6564 | 90.0 | 94.4 |
| Cpd 1 + Imidacloprid | 9.75 + 10.9 | 1:1.1179 | 90.0 | 97.8 |
| Cpd 3 + Imidacloprid | 2.93 + 6.4 | 1:2.1843 | 83.3* | 77.8 |
| Cpd 3 + Imidacloprid | 2.93 + 10.9 | 1:3.7201 | 93.3* | 91.1 |
| Cpd 3 + Imidacloprid | 16.1 + 6.4 | 1:0.3975 | 80.0 | 97.3 |
| Cpd 3 + Imidacloprid | 16.1 + 10.9 | 1:0.677 | 100.0* | 97.3 |
| Cpd 5 + Imidacloprid | 0.4 + 6.4 | 1:16 | 80.0* | 72.2 |
| Cpd 5 + Imidacloprid | 0.4 + 10.9 | 1:27.25 | 80.0 | 88.9 |
| Cpd 5 + Imidacloprid | 2 + 6.4 | 1:3.2 | 46.7 | 80.0 |
| Cpd 5 + Imidacloprid | 2 + 10.9 | 1:5.45 | 86.7 | 92.0 |

*Denotes enhanced plant protection based on Colby formula

TABLE 3d

Mixtures comprising Spirotetramat and their activity on Western Flower Thrips

| Treatment | Rate [ppm] | Ratio | Plant Protection (obs) | Plant Protection (exp) |
|---|---|---|---|---|
| Cpd 4 | 11.1 | | 60.0 | |
| Cpd 4 | 36.8 | | 93.3 | |
| Cpd 2 | 1.5 | | 36.7 | |
| Cpd 2 | 4.5 | | 76.7 | |
| Cpd 1 | 3.18 | | 63.3 | |
| Cpd 1 | 9.75 | | 90.0 | |
| Cpd 4 | 2.93 | | 50.0 | |
| Cpd 4 | 16.1 | | 86.7 | |
| Cpd 5 | 0.4 | | 43.3 | |
| Cpd 5 | 2 | | 63.3 | |
| Spirotetramat | 100 | | 53.3 | |
| Spirotetramat | 250 | | 73.3 | |
| Cpd 4 + Spirotetramat | 11.1 + 100 | 1:9.009 | 66.7 | 81.3 |
| Cpd 4 + Spirotetramat | 11.1 + 250 | 1:22.5225 | 83.3 | 89.3 |
| Cpd 4 + Spirotetramat | 36.8 + 100 | 1:2.7174 | 93.3 | 96.9 |
| Cpd 4 + Spirotetramat | 36.8 + 250 | 1:6.7935 | 86.7* | 83.1 |
| Cpd 2 + Spirotetramat | 1.5 + 100 | 1:66.6667 | 60.0 | 70.4 |
| Cpd 2 + Spirotetramat | 1.5 + 250 | 1:166.6667 | 86.7 | 89.1 |
| Cpd 2 + Spirotetramat | 4.5 + 100 | 1:22.2222 | 90.0 | 92.2 |
| Cpd 2 + Spirotetramat | 4.5 + 250 | 1:55.5556 | 96.7* | 93.8 |
| Cpd 1 + Spirotetramat | 3.18 + 100 | 1:31.4465 | 86.7* | 82.9 |
| Cpd 1 + Spirotetramat | 3.18 + 250 | 1:78.6164 | 86.7 | 90.2 |
| Cpd 1 + Spirotetramat | 9.75 + 100 | 1:10.2564 | 86.7 | 95.3 |
| Cpd 1 + Spirotetramat | 9.75 + 250 | 1:25.641 | 96.7 | 97.3 |
| Cpd 3 + Spirotetramat | 2.93 + 100 | 1:34.1297 | 56.7 | 76.7 |
| Cpd 3 + Spirotetramat | 2.93 + 250 | 1:85.3242 | 86.7 | 86.7 |
| Cpd 3 + Spirotetramat | 16.1 + 100 | 1:6.2112 | 93.3 | 96.4 |
| Cpd 3 + Spirotetramat | 16.1 + 250 | 1:15.528 | 96.7* | 96.4 |
| Cpd 5 + Spirotetramat | 0.4 + 100 | 1:250 | 33.3 | 73.6 |
| Cpd 5 + Spirotetramat | 0.4 + 250 | 1:625 | 80.0 | 84.9 |
| Cpd 5 + Spirotetramat | 2 + 100 | 1:50 | 33.3 | 82.9 |
| Cpd 5 + Spirotetramat | 2 + 250 | 1:125 | 73.3 | 90.2 |

*Denotes enhanced plant protection based on Colby formula

TABLE 3e

Mixtures comprising Chlorantraniliprole and their activity on Western Flower Thrips

| Treatment | Rate [ppm] | Ratio | Plant Protection (obs) | Plant Protection (exp) |
|---|---|---|---|---|
| Cpd 4 | 11.1 | | 60.0 | |
| Cpd 4 | 36.8 | | 76.7 | |
| Cpd 2 | 1.5 | | 66.7 | |
| Cpd 2 | 4.5 | | 43.3 | |
| Cpd 1 | 3.18 | | 76.7 | |
| Cpd 1 | 9.75 | | 66.7 | |
| Cpd 3 | 2.93 | | 83.3 | |
| Cpd 3 | 16.1 | | 80.0 | |
| Cpd 5 | 0.4 | | 70.0 | |
| Cpd 5 | 2 | | 26.7 | |
| Chlorantraniliprole | 2.08 | | 63.3 | |
| Chlorantraniliprole | 28.7 | | 60.0 | |
| Cpd 4 + Chlorantraniliprole | 11.1 + 2.08 | 1:0.1874 | 76.7 | 85.3 |
| Cpd 4 + Chlorantraniliprole | 11.1 + 28.7 | 1:2.5856 | 90.0* | 84.0 |
| Cpd 4 + Chlorantraniliprole | 36.8 + 2.08 | 1:0.0565 | 83.3 | 91.4 |
| Cpd 4 + Chlorantraniliprole | 36.8 + 28.7 | 1:0.7799 | 93.3* | 86.7 |
| Cpd 2 + Chlorantraniliprole | 1.5 + 2.08 | 1:1.3867 | 63.3 | 87.8 |
| Cpd 2 + Chlorantraniliprole | 1.5 + 28.7 | 1:19.1333 | 90.0* | 79.2 |
| Cpd 2 + Chlorantraniliprole | 4.5 + 2.08 | 1:0.4622 | 80.0 | 86.8 |
| Cpd 2 + Chlorantraniliprole | 4.5 + 28.7 | 1:6.3778 | 93.3* | 77.3 |
| Cpd 1 + Chlorantraniliprole | 3.18 + 2.08 | 1:0.6541 | 66.7 | 91.4 |
| Cpd 1 + Chlorantraniliprole | 3.18 + 28.7 | 1:9.0252 | 90.0 | 90.7 |
| Cpd 1 + Chlorantraniliprole | 9.75 + 2.08 | 1:0.2133 | 36.7 | 87.8 |
| Cpd 1 + Chlorantraniliprole | 9.75 + 28.7 | 1:2.9436 | 100.0* | 86.7 |
| Cpd 3 + Chlorantraniliprole | 2.93 + 2.08 | 1:0.7099 | 53.3 | 93.9 |
| Cpd 3 + Chlorantraniliprole | 2.93 + 28.7 | 1:9.7952 | 86.7 | 93.3 |
| Cpd 3 + Chlorantraniliprole | 16.1 + 2.08 | 1:0.1292 | 86.7 | 92.0 |
| Cpd 3 + Chlorantraniliprole | 16.1 + 28.7 | 1:1.7826 | 90.0 | 92.0 |
| Cpd 5 + Chlorantraniliprole | 0.4 + 2.08 | 1:5.2 | 33.3 | 89.0 |
| Cpd 5 + Chlorantraniliprole | 0.4 + 28.7 | 1:71.75 | 76.7 | 88.0 |

TABLE 3e-continued

Mixtures comprising Chlorantraniliprole and their activity on Western Flower Thrips

| Treatment | Rate [ppm] | Ratio | Plant Protection (obs) | Plant Protection (exp) |
|---|---|---|---|---|
| Cpd 5 + Chlorantraniliprole | 2 + 2.08 | 1:1.04 | 76.7* | 73.1 |
| Cpd 5 + Chlorantraniliprole | 2 + 28.7 | 1:14.35 | 93.3* | 70.7 |

*Denotes enhanced plant protection based on Colby formula

TABLE 3f

Mixtures comprising Bifenthrin and their activity on Western Flower Thrips

| Treatment | Rate [ppm] | Ratio | Plant Protection (obs) | Plant Protection (exp) |
|---|---|---|---|---|
| Cpd 4 | 11.1 | | 73.3 | |
| Cpd 4 | 36.8 | | 90.0 | |
| Cpd 2 | 1.5 | | 43.3 | |
| Cpd 2 | 4.5 | | 73.3 | |
| Cpd 1 | 3.18 | | 33.3 | |
| Cpd 1 | 9.75 | | 80.0 | |
| Cpd 3 | 2.93 | | 40.0 | |
| Cpd 3 | 16.1 | | 86.7 | |
| Cpd 5 | 0.4 | | 33.3 | |
| Cpd 5 | 2 | | 60.0 | |
| Bifenthrin | 50 | | 36.7 | |
| Bifenthrin | 250 | | 70.0 | |
| Cpd 4 + Bifenthrin | 11.1 + 50 | 1:4.5045 | 86.7 | 83.1 |
| Cpd 4 + Bifenthrin | 11.1 + 250 | 1:22.5225 | 96.7* | 92.0 |
| Cpd 4 + Bifenthrin | 36.8 + 50 | 1:1.3587 | 90.0 | 93.7 |
| Cpd 4 + Bifenthrin | 36.8 + 250 | 1:6.7935 | 100.0* | 83.0 |
| Cpd 2 + Bifenthrin | 1.5 + 50 | 1:33.3333 | 56.7 | 64.1 |
| Cpd 2 + Bifenthrin | 1.5 + 250 | 1:166.6667 | 90.0* | 83.1 |
| Cpd 2 + Bifenthrin | 4.5 + 50 | 1:11.1111 | 66.7 | 96.4 |
| Cpd 2 + Bifenthrin | 4.5 + 250 | 1:55.5556 | 93.38 | 92.0 |
| Cpd 1 + Bifenthrin | 3.18 + 50 | 1:15.7233 | 83.3* | 57.8 |
| Cpd 1 + Bifenthrin | 3.18 + 250 | 1:78.6164 | 90.0* | 80.0 |
| Cpd 1 + Bifenthrin | 9.75 + 50 | 1:5.1282 | 86.7 | 87.3 |
| Cpd 1 + Bifenthrin | 9.75 + 250 | 1:25.641 | 100.0* | 94.0 |
| Cpd 3 + Bifenthrin | 2.93 + 50 | 1:17.0648 | 73.3* | 62.0 |
| Cpd 3 + Bifenthrin | 2.93 + 250 | 1:85.3242 | 83.3* | 82.0 |
| Cpd 3 + Bifenthrin | 16.1 + 50 | 1:3.1056 | 73.3 | 96.0 |
| Cpd 3 + Bifenthrin | 16.1 + 250 | 1:15.528 | 93.3 | 96.0 |
| Cpd 5 + Bifenthrin | 0.4 + 50 | 1:125 | 33.3 | 57.8 |
| Cpd 5 + Bifenthrin | 0.4 + 250 | 1:625 | 73.3 | 80.0 |
| Cpd 5 + Bifenthrin | 2 + 50 | 1:25 | 66.7 | 74.7 |
| Cpd 5 + Bifenthrin | 2 + 250 | 1:125 | 90.0* | 88.0 |

*Denotes enhanced plant protection based on Colby formula

TABLE 3g

Mixtures comprising Indoxacarb and their activity on Western Flower Thrips

| Treatment | Rate [ppm] | Ratio | Plant Protection (obs) | Plant Protection (exp) |
|---|---|---|---|---|
| Cpd 4 | 11.1 | | 20.0 | |
| Cpd 4 | 36.8 | | 73.3 | |
| Cpd 2 | 1.5 | | 16.7 | |
| Cpd 2 | 4.5 | | 33.3 | |
| Cpd 1 | 3.18 | | 10.0 | |
| Cpd 1 | 9.75 | | 76.7 | |
| Cpd 3 | 2.93 | | 43.3 | |
| Cpd 3 | 16.1 | | 70.0 | |
| Cpd 5 | 0.4 | | 13.3 | |
| Cpd 5 | 2 | | 26.7 | |
| Indoxacarb | 50 | | 10.0 | |
| Indoxacarb | 250 | | 36.7 | |
| Cpd 4 + Indoxacarb | 11.1 + 50 | 1:4.5045 | 33.3* | 28.0 |
| Cpd 4 + Indoxacarb | 11.1 + 250 | 1:22.5225 | 90.0* | 49.3 |
| Cpd 4 + Indoxacarb | 36.8 + 50 | 1:1.3587 | 86.7* | 76.0 |
| Cpd 4 + Indoxacarb | 36.8 + 250 | 1:6.7935 | 100.0* | 47.2 |
| Cpd 2 + Indoxacarb | 1.5 + 50 | 1:33.3333 | 33.3* | 25.0 |

TABLE 3g-continued

Mixtures comprising Indoxacarb and their activity on Western Flower Thrips

| Treatment | Rate [ppm] | Ratio | Plant Protection (obs) | Plant Protection (exp) |
|---|---|---|---|---|
| Cpd 2 + Indoxacarb | 1.5 + 250 | 1:166.6667 | 80.0* | 40.0 |
| Cpd 2 + Indoxacarb | 4.5 + 50 | 1:11.1111 | 33.3 | 55.6 |
| Cpd 2 + Indoxacarb | 4.5 + 250 | 1:55.5556 | 80.0* | 57.8 |
| Cpd 1 + Indoxacarb | 3.18 + 50 | 1:15.7233 | 86.7* | 19.0 |
| Cpd 1 + Indoxacarb | 3.18 + 250 | 1:78.6164 | 90.0* | 43.0 |
| Cpd 1 + Indoxacarb | 9.75 + 50 | 1:5.1282 | 86.7* | 79.0 |
| Cpd 1 + Indoxacarb | 9.75 + 250 | 1:25.641 | 100.0* | 85.2 |
| Cpd 3 + Indoxacarb | 2.93 + 50 | 1:17.0648 | 76.7* | 49.0 |
| Cpd 3 + Indoxacarb | 2.93 + 250 | 1:85.3242 | 96.7* | 64.1 |
| Cpd 3 + Indoxacarb | 16.1 + 50 | 1:3.1056 | 76.7 | 81.0 |
| Cpd 3 + Indoxacarb | 16.1 + 250 | 1:15.528 | 93.3* | 81.0 |
| Cpd 5 + Indoxacarb | 0.4 + 50 | 1:125 | 40.0* | 22.0 |
| Cpd 5 + Indoxacarb | 0.4 + 250 | 1:625 | 70.0* | 45.1 |
| Cpd 5 + Indoxacarb | 2 + 50 | 1:25 | 70.0* | 34.0 |
| Cpd 5 + Indoxacarb | 2 + 250 | 1:125 | 86.7* | 53.6 |

*Denotes enhanced plant protection based on Colby formula

Test C

For evaluating control of Potato Leafhopper (*Empoasca fabae* Harris) through contact and/or systemic means, each test unit consisted of a small open container with a 5- to 6-day-old Longio bean plant (primary leaves emerged) inside. White sand was added to the top of the soil, and one of the primary leaves was excised prior to application. Test compounds were formulated and sprayed with 3 replications as described for Test A. After spraying, the test units were allowed to dry for 1 hour before they were infested with 5 potato leafhoppers (18- to 21-day-old adults). A black, screened cap was placed on the top of each container. The test units were held for 6 days in a growth chamber at 19-21° C. and 50-70% relative humidity. Each test unit was then visually assessed for insect mortality; the results are listed in Tables 4a-c.

For evaluating control of corn planthopper (*Peregrinus maidis* (Ashmead)) through contact and/or systemic means, the test unit consisted of a small open container with a 3-4-day-old corn (maize) plant inside. White sand was added to the top of the soil prior to application of the test compound.

Test compounds were formulated and sprayed at 250 and/or 50 ppm and/or 10 ppm. After spraying of the formulated test compound, the test units were allowed to dry for 1 h before they were post-infested with ~15-20 nymphs (18-to-21-day-old). A black, screened cap was placed on the top of each test unit, and the test units were held for 6 days in a growth chamber at 19-21° C. and 50-70% relative humidity. Each test unit was then visually assessed for insect mortality; the results are listed in Tables 4d-g.

TABLE 4a

Mixtures comprising Cyantraniliprole and their activity on Potato Leafhopper

| Treatment | Rate [ppm] | Ratio | % Mortality (obs) | % Mortality (exp) |
|---|---|---|---|---|
| Cpd 4 | 50 | | 7.1 | |
| Cpd 4 | 250 | | 6.7 | |
| Cpd 2 | 50 | | 46.7 | |
| Cpd 2 | 250 | | 86.7 | |
| Cpd 1 | 50 | | 60 | |
| Cpd 1 | 250 | | 35.7 | |
| Cpd 3 | 50 | | 0 | |
| Cpd 3 | 250 | | 0 | |
| Cpd 5 | 50 | | 0 | |
| Cpd 5 | 250 | | 26.7 | |
| Cyantraniliprole | 1.75 | | 13.3 | |
| Cyantraniliprole | 3.3 | | 28.6 | |
| Cpd 4 + Cyantraniliprole | 50 + 1.75 | 1:0.035 | 33.3* | 19.5 |
| Cpd 4 + Cyantraniliprole | 50 + 3.3 | 1:0.066 | 53.3* | 33.7 |
| Cpd 4 + Cyantraniliprole | 250 + 1.75 | 1:0.007 | 13.3 | 19.1 |
| Cpd 4 + Cyantraniliprole | 250 + 3.3 | 1:0.0132 | 46.7* | 33.3 |
| Cpd 2 + Cyantraniliprole | 50 + 1.75 | 1:0.035 | 26.7 | 53.8 |
| Cpd 2 + Cyantraniliprole | 50 + 3.3 | 1:0.066 | 35.7 | 61.9 |
| Cpd 2 + Cyantraniliprole | 250 + 1.75 | 1:0.007 | 80 | 88.4 |
| Cpd 2 + Cyantraniliprole | 250 + 3.3 | 1:0.0132 | 80 | 90.5 |
| Cpd 1 + Cyantraniliprole | 50 + 1.75 | 1:0.035 | 53.3 | 72.9 |
| Cpd 1 + Cyantraniliprole | 50 + 3.3 | 1:0.066 | 60 | 71.4 |
| Cpd 1 + Cyantraniliprole | 250 + 1.75 | 1:0.007 | 53.3* | 44.3 |
| Cpd 1 + Cyantraniliprole | 250 + 3.3 | 1:0.0132 | 73.3* | 54.1 |
| Cpd 3 + Cyantraniliprole | 50 + 1.75 | 1:0.035 | 20.0* | 13.3 |
| Cpd 3 + Cyantraniliprole | 50 + 3.3 | 1:0.066 | 33.3* | 28.6 |
| Cpd 3 + Cyantraniliprole | 250 + 1.75 | 1:0.007 | 14.3* | 13.3 |
| Cpd 3 + Cyantraniliprole | 250 + 3.3 | 1:0.0132 | 60.0* | 28.6 |
| Cpd 5 + Cyantraniliprole | 50 + 1.75 | 1:0.035 | 14.3* | 13.3 |
| Cpd 5 + Cyantraniliprole | 50 + 3.3 | 1:0.066 | 40.0* | 28.6 |

TABLE 4a-continued

Mixtures comprising Cyantraniliprole and their activity on Potato Leafhopper

| Treatment | Rate [ppm] | Ratio | % Mortality (obs) | % Mortality (exp) |
|---|---|---|---|---|
| Cpd 5 + Cyantraniliprole | 250 + 1.75 | 1:0.007 | 33.3 | 36.4 |
| Cpd 5 + Cyantraniliprole | 250 + 3.3 | 1:0.0132 | 73.3* | 47.6 |

*Denotes enhanced efficacy based on Colby formula

TABLE 4b

Mixtures comprising Imidacloprid and their activity on Potato Leafhopper

| Treatment | Rate [ppm] | Ratio | % Mortality (obs) | % Mortality (exp) |
|---|---|---|---|---|
| Cpd 4 | 50 | | 0 | |
| Cpd 4 | 250 | | 14.3 | |
| Cpd 2 | 50 | | 6.7 | |
| Cpd 2 | 250 | | 85.7 | |
| Cpd 1 | 50 | | 20 | |
| Cpd 1 | 250 | | 6.7 | |
| Cpd 3 | 50 | | 13.3 | |
| Cpd 3 | 250 | | 0 | |
| Cpd 5 | 50 | | 0 | |
| Cpd 5 | 250 | | 6.7 | |
| Imidacloprid | 0.82 | | 53.3 | |
| Imidacloprid | 2.25 | | 40 | |
| Cpd 4 + Imidacloprid | 50 + 0.82 | 1:0.0164 | 33.3 | 53.3 |
| Cpd 4 + Imidacloprid | 50 + 2.25 | 1:0.045 | 21.4 | 40 |
| Cpd 4 + Imidacloprid | 250 + 0.82 | 1:0.00328 | 33.3 | 60 |
| Cpd 4 + Imidacloprid | 250 + 2.25 | 1:0.009 | 60.0* | 48.6 |
| Cpd 2 + Imidacloprid | 50 + 0.82 | 1:0.0164 | 33.3 | 56.4 |
| Cpd 2 + Imidacloprid | 50 + 2.25 | 1:0.045 | 66.7* | 44 |
| Cpd 2 + Imidacloprid | 250 + 0.82 | 1:0.00328 | 86.7 | 93.3 |
| Cpd 2 + Imidacloprid | 250 + 2.25 | 1:0.009 | 100.0* | 66.7 |
| Cpd 1 + Imidacloprid | 50 + 0.82 | 1:0.0164 | 40 | 62.7 |
| Cpd 1 + Imidacloprid | 50 + 2.25 | 1:0.045 | 73.3* | 52 |
| Cpd 1 + Imidacloprid | 250 + 0.82 | 1:0.00328 | 66.7* | 56.4 |
| Cpd 1 + Imidacloprid | 250 + 2.25 | 1:0.009 | 73.3* | 44 |
| Cpd 3 + Imidacloprid | 50 + 0.82 | 1:0.0164 | 42.9 | 59.6 |
| Cpd 3 + Imidacloprid | 50 + 2.25 | 1:0.045 | 33.3 | 48 |
| Cpd 3 + Imidacloprid | 250 + 0.82 | 1:0.00328 | 20 | 40 |
| Cpd 3 + Imidacloprid | 250 + 2.25 | 1:0.009 | 85.7* | 53.3 |
| Cpd 5 + Imidacloprid | 50 + 0.82 | 1:0.0164 | 33.3 | 40 |
| Cpd 5 + Imidacloprid | 50 + 2.25 | 1:0.045 | 73.3* | 40 |
| Cpd 5 + Imidacloprid | 250 + 0.82 | 1:0.00328 | 50 | 56.4 |
| Cpd 5 + Imidacloprid | 250 + 2.25 | 1:0.009 | 35.7 | 44 |

*Denotes enhanced efficacy based on Colby formula

TABLE 4c

Mixtures comprising Imidacloprid and their activity on Potato Leafhopper

| Treatment | Rate [ppm] | Ratio | % Mortality (obs) | % Mortality (exp) |
|---|---|---|---|---|
| Cpd 4 | 50 | | 26.7 | |
| Cpd 4 | 250 | | 0 | |
| Cpd 2 | 50 | | 20 | |
| Cpd 2 | 250 | | 73.3 | |
| Cpd 1 | 50 | | 6.7 | |
| Cpd 1 | 250 | | 33.3 | |
| Cpd 3 | 50 | | 6.7 | |
| Cpd 3 | 250 | | 0 | |
| Cpd 5 | 50 | | 6.7 | |
| Cpd 5 | 250 | | 26.7 | |
| Spirotetramat | 50 | | 28.6 | |
| Spirotetramat | 250 | | 73.3 | |
| Cpd 4 + Spirotetramat | 50 + 50 | | 53.3* | 47.6 |
| Cpd 4 + Spirotetramat | 50 + 250 | | 50 | 80.4 |
| Cpd 4 + Spirotetramat | 250 + 50 | | 33.3* | 28.6 |
| Cpd 4 + Spirotetramat | 250 + 250 | | 66.7 | 73.3 |
| Cpd 2 + Spirotetramat | 50 + 50 | | 46.7* | 42.9 |

TABLE 4c-continued

Mixtures comprising Imidacloprid and their activity on Potato Leafhopper

| Treatment | Rate [ppm] | Ratio | % Mortality (obs) | % Mortality (exp) |
|---|---|---|---|---|
| Cpd 2 + Spirotetramat | 50 + 250 | | 86.7* | 78.7 |
| Cpd 2 + Spirotetramat | 250 + 50 | | 66.7 | 81 |
| Cpd 2 + Spirotetramat | 250 + 250 | | 93.3* | 92.9 |
| Cpd 1 + Spirotetramat | 50 + 50 | | 40.0* | 35.5 |
| Cpd 1 + Spirotetramat | 50 + 250 | | 73.3 | 75.1 |
| Cpd 1 + Spirotetramat | 250 + 50 | | 26.7 | 52.4 |
| Cpd 1 + Spirotetramat | 250 + 250 | | 73.3 | 82.2 |
| Cpd 3 + Spirotetramat | 50 + 50 | | 33.3 | 33.3 |
| Cpd 3 + Spirotetramat | 50 + 250 | | 50 | 75.1 |
| Cpd 3 + Spirotetramat | 250 + 50 | | 46.7* | 28.6 |
| Cpd 3 + Spirotetramat | 250 + 250 | | 46.7 | 73.3 |
| Cpd 5 + Spirotetramat | 50 + 50 | | 20 | 33.3 |
| Cpd 5 + Spirotetramat | 50 + 250 | | 80.0* | 75.1 |
| Cpd 5 + Spirotetramat | 250 + 50 | | 53.3* | 47.6 |
| Cpd 5 + Spirotetramat | 250 + 250 | | 80 | 81 |

*Denotes enhanced efficacy based on Colby formula

TABLE 4d

Mixtures with Imidacloprid and activity on Corn Planthopper

| Treatment | Rate [ppm] | Ratio | % Mortality (obs) | % Mortality (exp) |
|---|---|---|---|---|
| Cpd 4 | 50 | | 0.0 | |
| Cpd 4 | 250 | | 9.1 | |
| Cpd 2 | 50 | | 0.0 | |
| Cpd 2 | 250 | | 54.1 | |
| Cpd 1 | 50 | | 14.8 | |
| Cpd 1 | 250 | | 45.8 | |
| Cpd 3 | 50 | | 8.3 | |
| Cpd 3 | 250 | | 0.0 | |
| Cpd 5 | 50 | | 5.3 | |
| Cpd 5 | 250 | | 75.0 | |
| Imidacloprid | 0.09 | | 29.2 | |
| Imidacloprid | 0.16 | | 20.0 | |
| Cpd 4 + Imidacloprid | 50 + 0.09 | 1:0.0018 | 0.0 | 29.2 |
| Cpd 4 + Imidacloprid | 50 + 0.16 | 1:0.0032 | 4.2 | 20.0 |
| Cpd 4 + Imidacloprid | 250 + 0.09 | 1:0.00036 | 12.0 | 27.3 |
| Cpd 4 + Imidacloprid | 250 + 0.16 | 1:0.00064 | 12.5 | 27.3 |
| Cpd 2 + Imidacloprid | 50 + 0.09 | 1:0.0018 | 81.8* | 20.0 |
| Cpd 2 + Imidacloprid | 50 + 0.16 | 1:0.0032 | 36.4* | 20.0 |
| Cpd 2 + Imidacloprid | 250 + 0.09 | 1:0.00036 | 48.8* | 35.6 |
| Cpd 2 + Imidacloprid | 250 + 0.16 | 1:0.00064 | 23.1 | 27.3 |
| Cpd 1 + Imidacloprid | 50 + 0.09 | 1:0.0018 | 22.2 | 29.2 |
| Cpd 1 + Imidacloprid | 50 + 0.16 | 1:0.0032 | 100* | 20.0 |
| Cpd 1 + Imidacloprid | 250 + 0.09 | 1:0.00036 | 100* | 35.6 |
| Cpd 1 + Imidacloprid | 250 + 0.16 | 1:0.00064 | 88.9* | 27.3 |
| Cpd 3 + Imidacloprid | 50 + 0.09 | 1:0.0018 | 66.7* | 29.2 |
| Cpd 3 + Imidacloprid | 50 + 0.16 | 1:0.0032 | 22.6* | 20.0 |
| Cpd 3 + Imidacloprid | 250 + 0.09 | 1:0.00036 | 25.0 | 35.6 |
| Cpd 3 + Imidacloprid | 250 + 0.16 | 1:0.00064 | 43.5* | 27.3 |
| Cpd 5 + Imidacloprid | 50 + 0.09 | 1:0.0018 | 63.2* | 29.2 |
| Cpd 5 + Imidacloprid | 50 + 0.16 | 1:0.0032 | 50.0* | 20.0 |
| Cpd 5 + Imidacloprid | 250 + 0.09 | 1:0.00036 | 38.1* | 35.6 |
| Cpd 5 + Imidacloprid | 250 + 0.16 | 1:0.00064 | 0 | 27.3 |

*Denotes enhanced efficacy based on Colby formula

TABLE 4e

Mixtures with Spinetoram and activity on Corn Planthopper

| Treatment | Rate [ppm] | Ratio | % Mortality (obs) | % Mortality (exp) |
|---|---|---|---|---|
| Cpd 4 | 50 | | 38.9 | |
| Cpd 4 | 250 | | 34.8 | |
| Cpd 2 | 50 | | 7.3 | |
| Cpd 2 | 250 | | 22.4 | |

TABLE 4e-continued

Mixtures with Spinetoram and activity on Corn Planthopper

| Treatment | Rate [ppm] | Ratio | % Mortality (obs) | % Mortality (exp) |
|---|---|---|---|---|
| Cpd 1 | 50 | | 18.9 | |
| Cpd 1 | 250 | | 7.6 | |
| Cpd 3 | 50 | | 5.0 | |
| Cpd 3 | 250 | | 1.2 | |
| Cpd 5 | 50 | | 21.6 | |
| Cpd 5 | 250 | | 13.1 | |
| Spinetoram | 8.46 | | 7.5 | |
| Spinetoram | 20.79 | | 14.1 | |
| Cpd 4 + Spinetoram | 50 + 8.46 | 1:0.1692 | 13.2 | 43.4 |
| Cpd 4 + Spinetoram | 50 + 20.79 | 1:0.4158 | 21.0 | 47.5 |
| Cpd 4 + Spinetoram | 250 + 8.46 | 1:0.03384 | 16.7 | 43.4 |
| Cpd 4 + Spinetoram | 250 + 20.79 | 1:0.08316 | 34.9 | 44.0 |
| Cpd 2 + Spinetoram | 50 + 8.46 | 1:0.1692 | 21.4 | 47.5 |
| Cpd 2 + Spinetoram | 50 + 20.79 | 1:0.4158 | 30.1 | 47.5 |
| Cpd 2 + Spinetoram | 250 + 8.46 | 1:0.03384 | 4.1 | 39.7 |
| Cpd 2 + Spinetoram | 250 + 20.79 | 1:0.08316 | 27.9 | 44.0 |
| Cpd 1 + Spinetoram | 50 + 8.46 | 1:0.1692 | 16.4 | 43.4 |
| Cpd 1 + Spinetoram | 50 + 20.79 | 1:0.4158 | 38.7 | 47.5 |
| Cpd 1 + Spinetoram | 250 + 8.46 | 1:0.03384 | 4.9 | 39.7 |
| Cpd 1 + Spinetoram | 250 + 20.79 | 1:0.08316 | 26.9 | 44.0 |
| Cpd 3 + Spinetoram | 50 + 8.46 | 1:0.1692 | 1.4 | 43.4 |
| Cpd 3 + Spinetoram | 50 + 20.79 | 1:0.4158 | 14.1 | 47.5 |
| Cpd 3 + Spinetoram | 250 + 8.46 | 1:0.03384 | 10.4 | 39.7 |
| Cpd 3 + Spinetoram | 250 + 20.79 | 1:0.08316 | 27.3 | 44.0 |
| Cpd 5 + Spinetoram | 50 + 8.46 | 1:0.1692 | 6.0 | 43.4 |
| Cpd 5 + Spinetoram | 50 + 20.79 | 1:0.4158 | 13.2 | 47.5 |
| Cpd 5 + Spinetoram | 250 + 8.46 | 1:0.03384 | 4.2 | 39.7 |
| Cpd 5 + Spinetoram | 250 + 20.79 | 1:0.08316 | 22.6 | 44.0 |

TABLE 4f

Mixtures with Buprofezin and activity on Corn Planthopper

| Treatment | Rate [ppm] | Ratio | % Mortality (obs) | % Mortality (exp) |
|---|---|---|---|---|
| Cpd 4 | 50 | | 1.8 | |
| Cpd 4 | 250 | | 10.8 | |
| Cpd 5 | 50 | | 15.3 | |
| Cpd 5 | 250 | | 22.4 | |
| Buprofezin | 0.524 | | 83.7 | |
| Buprofezin | 0.984 | | 94.6 | |
| Cpd 4 + Buprofezin | 50 + 0.524 | 1:0.01048 | 78.9 | 84.0 |
| Cpd 4 + Buprofezin | 50 + 0.984 | 1:0.01968 | 98.4* | 94.7 |
| Cpd 4 + Buprofezin | 250 + 0.524 | 1:0.002096 | 75.9 | 85.5 |
| Cpd 4 + Buprofezin | 250 + 0.984 | 1:0.003936 | 92.9 | 95.2 |
| Cpd 5 + Buprofezin | 50 + 0.524 | 1:0.01048 | 90.0* | 86.2 |
| Cpd 5 + Buprofezin | 50 + 0.984 | 1:0.01968 | 81.8 | 95.5 |
| Cpd 5 + Buprofezin | 250 + 0.524 | 1:0.002096 | 70.3 | 87.4 |
| Cpd 5 + Buprofezin | 250 + 0.984 | 1:0.003936 | 89.1 | 95.8 |

*Denotes enhanced efficacy based on Colby formula

TABLE 4g

Mixtures with Fipronil and activity on Corn Planthopper

| Treatment | Rate [ppm] | Ratio | % Mortality (obs) | % Mortality (exp) |
|---|---|---|---|---|
| Cpd 4 | 50 | | 1.8 | |
| Cpd 4 | 250 | | 10.8 | |
| Cpd 5 | 50 | | 15.3 | |
| Cpd 5 | 250 | | 22.4 | |
| Fipronil | 0.78 | | 65.2 | |
| Fipronil | 1.197 | | 85.5 | |
| Cpd 4 + Fipronil | 50 + 0.78 | 1:0.0156 | 61.7 | 65.8 |
| Cpd 4 + Fipronil | 50 + 1.197 | 1:0.02394 | 85.7 | 85.7 |
| Cpd 4 + Fipronil | 250 + 0.78 | 1:0.00312 | 40.8 | 68.9 |
| Cpd 4 + Fipronil | 250 + 1.197 | 1:0.004788 | 87.0 | 87.1 |

TABLE 4g-continued

Mixtures with Fipronil and activity on Corn Planthopper

| Treatment | Rate [ppm] | Ratio | % Mortality (obs) | % Mortality (exp) |
|---|---|---|---|---|
| Cpd 5 + Fipronil | 50 + 0.78 | 1:0.0156 | 57.5 | 70.5 |
| Cpd 5 + Fipronil | 50 + 1.197 | 1:0.02394 | 82.2 | 87.7 |
| Cpd 5 + Fipronil | 250 + 0.78 | 1:0.00312 | 41.1 | 73.0 |
| Cpd 5 + Fipronil | 250 + 1.197 | 1:0.004788 | 90.9* | 88.7 |

*Denotes enhanced efficacy based on Colby formula

Test D

For evaluating control of cotton melon aphid (*Aphis gossypii* Glover) through contact and/or systemic means, each test unit consisted of a small open container with a 6- to 7-day-old okra plant inside. This was pre-infested by placing on a leaf of the test plant 30 to 40 aphids on a piece of leaf excised from a culture plant (cut-leaf method). The larvae moved onto the test plant as the leaf piece desiccated. After pre-infestation, the soil of the test unit was covered with a layer of sand.

Test compounds were formulated and sprayed as described for Test A. The applications were replicated three times. After spraying of the formulated test compounds, each test unit was allowed to dry for 1 hour and then a black, screened cap was placed on top. The test units were held for 6 days in a growth chamber at 19-21° C. and 50-70% relative humidity. Each test unit was then visually assessed for insect mortality; the results are listed in Tables 5a-n.

TABLE 5a

Mixtures comprising Cyantraniliprole and their activity on Cotton Melon Aphid

| Treatment | Rate [ppm] | Ratio | % Mortality (obs) | % Mortality (exp) |
|---|---|---|---|---|
| Cpd 4 | 0.2 | | 48.3 | |
| Cpd 4 | 0.5 | | 58.9 | |
| Cpd 2 | 0.05 | | 40.1 | |
| Cpd 2 | 0.18 | | 31.4 | |
| Cpd 1 | 0.08 | | 23.8 | |
| Cpd 1 | 0.12 | | 49.8 | |
| Cpd 3 | 0.02 | | 20.0 | |
| Cpd 3 | 0.08 | | 43.2 | |
| Cpd 5 | 0.12 | | 34.0 | |
| Cpd 5 | 0.18 | | 62.7 | |
| Cyantraniliprole | 0.06 | | 21.1 | |
| Cyantraniliprole | 0.12 | | 45.1 | |
| Cpd 4 + Cyantraniliprole | 0.2 + 0.06 | 1:0.3 | 84.0* | 59.0 |
| Cpd 4 + Cyantraniliprole | 0.2 + 0.12 | 1:0.6 | 82.0* | 72.0 |
| Cpd 4 + Cyantraniliprole | 0.5 + 0.06 | 1:0.12 | 85.0* | 68.0 |
| Cpd 4 + Cyantraniliprole | 0.5 + 0.12 | 1:0.24 | 93.0* | 77.0 |
| Cpd 2 + Cyantraniliprole | 0.05 + 0.06 | 1:1.2 | 36.0 | 53.0 |
| Cpd 2 + Cyantraniliprole | 0.05 + 0.12 | 1:2.4 | 42.0 | 67.0 |
| Cpd 2 + Cyantraniliprole | 0.18 + 0.06 | 1:0.3333 | 56.0* | 46.0 |
| Cpd 2 + Cyantraniliprole | 0.18 + 0.12 | 1:0.6667 | 68.0* | 62.0 |
| Cpd 1 + Cyantraniliprole | 0.08 + 0.06 | 1:0.75 | 41.0* | 40.0 |
| Cpd 1 + Cyantraniliprole | 0.08 + 0.12 | 1:1.5 | 64.0* | 58.0 |
| Cpd 1 + Cyantraniliprole | 0.12 + 0.06 | 1:0.5 | 72.0* | 60.0 |
| Cpd 1 + Cyantraniliprole | 0.12 + 0.12 | 1:1 | 61.0 | 72.0 |
| Cpd 3 + Cyantraniliprole | 0.02 + 0.06 | 1:3 | 19.0 | 37.0 |
| Cpd 3 + Cyantraniliprole | 0.02 + 0.12 | 1:6 | 39.0 | 56.0 |
| Cpd 3 + Cyantraniliprole | 0.08 + 0.06 | 1:0.75 | 36.0 | 55.0 |
| Cpd 3 + Cyantraniliprole | 0.08 + 0.12 | 1:1.5 | 56.0 | 69.0 |
| Cpd 5 + Cyantraniliprole | 0.12 + 0.06 | 1:0.5 | 63.0* | 48.0 |
| Cpd 5 + Cyantraniliprole | 0.12 + 0.12 | 1:1 | 73.0* | 64.0 |
| Cpd 5 + Cyantraniliprole | 0.18 + 0.06 | 1:0.3333 | 72.0* | 71.0 |
| Cpd 5 + Cyantraniliprole | 0.18 + 0.12 | 1:0.6667 | 81.0* | 80.0 |

*Denotes enhanced efficacy based on Colby formula

TABLE 5b

Mixtures comprising Acetamiprid and their activity on Cotton Melon Aphid

| Treatment | Rate [ppm] | Ratio | % Mortality (obs) | % Mortality (exp) |
|---|---|---|---|---|
| Cpd 4 | 0.2 | | 48.3 | |
| Cpd 4 | 0.5 | | 58.9 | |
| Cpd 2 | 0.05 | | 40.1 | |

TABLE 5b-continued

Mixtures comprising Acetamiprid and their activity on Cotton Melon Aphid

| Treatment | Rate [ppm] | Ratio | % Mortality (obs) | % Mortality (exp) |
|---|---|---|---|---|
| Cpd 2 | 0.18 | | 31.4 | |
| Cpd 1 | 0.08 | | 23.8 | |
| Cpd 1 | 0.12 | | 49.8 | |
| Cpd 3 | 0.02 | | 20 | |
| Cpd 3 | 0.08 | | 43.2 | |
| Cpd 5 | 0.12 | | 34 | |
| Cpd 5 | 0.18 | | 62.7 | |
| Acetamiprid | 0.03 | | 21.1 | |
| Acetamiprid | 0.06 | | 45.1 | |
| Cpd 4 + Acetamiprid | 0.2 + 0.03 | 1:0.15 | 59.1 | 59.2 |
| Cpd 4 + Acetamiprid | 0.2 + 0.06 | 1:0.3 | 71.9* | 71.6 |
| Cpd 4 + Acetamiprid | 0.5 + 0.03 | 1:0.06 | 75.9* | 67.6 |
| Cpd 4 + Acetamiprid | 0.5 + 0.06 | 1:0.12 | 93.3* | 77.4 |
| Cpd 2 + Acetamiprid | 0.05 + 0.03 | 1:0.6 | 31.7 | 52.8 |
| Cpd 2 + Acetamiprid | 0.05 + 0.06 | 1:1.2 | 44.7 | 67.1 |
| Cpd 2 + Acetamiprid | 0.18 + 0.03 | 1:0.1667 | 58.3* | 45.9 |
| Cpd 2 + Acetamiprid | 0.18 + 0.06 | 1:0.3333 | 76.4* | 62.3 |
| Cpd 1 + Acetamiprid | 0.08 + 0.03 | 1:0.375 | 34 | 39.9 |
| Cpd 1 + Acetamiprid | 0.08 + 0.06 | 1:0.75 | 67.2* | 58.2 |
| Cpd 1 + Acetamiprid | 0.12 + 0.03 | 1:0.25 | 63.5* | 60.4 |
| Cpd 1 + Acetamiprid | 0.12 + 0.06 | 1:0.5 | 68.8 | 72.4 |
| Cpd 3 + Acetamiprid | 0.02 + 0.03 | 1:1.5 | 16.3 | 36.9 |
| Cpd 3 + Acetamiprid | 0.02 + 0.06 | 1:3 | 39.5 | 56.1 |
| Cpd 3 + Acetamiprid | 0.08 + 0.03 | 1:0.375 | 18.5 | 55.2 |
| Cpd 3 + Acetamiprid | 0.08 + 0.06 | 1:0.75 | 41.2 | 68.8 |
| Cpd 5 + Acetamiprid | 0.12 + 0.03 | 1:0.25 | 28.9 | 47.9 |
| Cpd 5 + Acetamiprid | 0.12 + 0.06 | 1:0.5 | 56.3 | 63.7 |
| Cpd 5 + Acetamiprid | 0.18 + 0.03 | 1:0.1667 | 55.8 | 70.6 |
| Cpd 5 + Acetamiprid | 0.18 + 0.06 | 1:0.3333 | 79.8* | 79.5 |

*Denotes enhanced efficacy based on Colby formula

TABLE 5c

Mixtures comprising Imidacloprid and their activity on Cotton Melon Aphid

| Treatment | Rate [ppm] | Ratio | % Mortality (obs) | % Mortality (exp) |
|---|---|---|---|---|
| Cpd 4 | 0.2 | | 6.7 | |
| Cpd 4 | 0.5 | | 6.7 | |
| Cpd 2 | 0.05 | | 0 | |
| Cpd 2 | 0.18 | | 80 | |
| Cpd 1 | 0.08 | | 100 | |
| Cpd 1 | 0.12 | | 26.7 | |
| Cpd 3 | 0.02 | | 0 | |
| Cpd 3 | 0.08 | | 20 | |
| Cpd 5 | 0.12 | | 73.3 | |
| Cpd 5 | 0.18 | | 6.7 | |
| Imidacloprid | 0.05 | | 33.3 | |
| Imidacloprid | 0.1 | | 6.7 | |
| Cpd 4 + Imidacloprid | 0.2 + 0.05 | 1:0.25 | 53.7* | 52.6 |
| Cpd 4 + Imidacloprid | 0.2 + 0.1 | 1:0.5 | 67.0* | 66.9 |
| Cpd 4 + Imidacloprid | 0.5 + 0.05 | 1:0.1 | 78.4* | 73.4 |
| Cpd 4 + Imidacloprid | 0.5 + 0.1 | 1:0.2 | 86.0* | 81.4 |
| Cpd 2 + Imidacloprid | 0.05 + 0.05 | 1:1 | 41.9 | 52.6 |
| Cpd 2 + Imidacloprid | 0.05 + 0.1 | 1:2 | 54 | 66.9 |
| Cpd 2 + Imidacloprid | 0.18 + 0.05 | 1:0.2778 | 61.6 | 78.7 |
| Cpd 2 + Imidacloprid | 0.18 + 0.1 | 1:0.5556 | 75 | 85.1 |
| Cpd 1 + Imidacloprid | 0.08 + 0.05 | 1:0.625 | 51.7 | 52.2 |
| Cpd 1 + Imidacloprid | 0.08 + 0.1 | 1:1.25 | 59.6 | 66.6 |
| Cpd 1 + Imidacloprid | 0.12 + 0.05 | 1:0.4167 | 44.7 | 61.7 |
| Cpd 1 + Imidacloprid | 0.12 + 0.1 | 1:0.8333 | 61.3 | 73.2 |
| Cpd 3 + Imidacloprid | 0.02 + 0.05 | 1:2.5 | 45.2* | 41.4 |
| Cpd 3 + Imidacloprid | 0.02 + 0.1 | 1:5 | 47.6 | 59.1 |
| Cpd 3 + Imidacloprid | 0.08 + 0.05 | 1:0.625 | 35.8 | 58.1 |
| Cpd 3 + Imidacloprid | 0.08 + 0.1 | 1:1.25 | 56.4 | 70.7 |
| Cpd 5 + Imidacloprid | 0.12 + 0.05 | 1:0.4167 | 44.1 | 48.3 |
| Cpd 5 + Imidacloprid | 0.12 + 0.1 | 1:0.8333 | 56 | 63.8 |
| Cpd 5 + Imidacloprid | 0.18 + 0.05 | 1:0.2778 | 49.6 | 74.4 |
| Cpd 5 + Imidacloprid | 0.18 + 0.1 | 1:0.5556 | 61 | 82.1 |

*Denotes enhanced efficacy based on Colby formula

TABLE 5d

Mixtures comprising Spirotetramat and their activity on Cotton Melon Aphid

| Treatment | Rate [ppm] | Ratio | % Mortality (obs) | % Mortality (exp) |
|---|---|---|---|---|
| Cpd 4 | 0.2 | | 48.3 | |
| Cpd 4 | 0.5 | | 58.9 | |
| Cpd 2 | 0.05 | | 40.1 | |
| Cpd 2 | 0.18 | | 31.4 | |
| Cpd 1 | 0.08 | | 23.8 | |
| Cpd 1 | 0.12 | | 49.8 | |
| Cpd 3 | 0.02 | | 20 | |
| Cpd 3 | 0.08 | | 43.2 | |
| Cpd 5 | 0.12 | | 34 | |
| Cpd 5 | 0.18 | | 62.7 | |
| Spirotetramat | 0.25 | | 21.1 | |
| Spirotetramat | 0.85 | | 45.1 | |
| Cpd 4 + Spirotetramat | 0.2 + 0.25 | 1:1.25 | 59.1 | 59.2 |
| Cpd 4 + Spirotetramat | 0.2 + 0.85 | 1:4.25 | 71.9* | 71.6 |
| Cpd 4 + Spirotetramat | 0.5 + 0.25 | 1:0.5 | 75.9* | 67.6 |
| Cpd 4 + Spirotetramat | 0.5 + 0.85 | 1:1.7 | 93.3* | 77.4 |
| Cpd 2 + Spirotetramat | 0.05 + 0.25 | 1:5 | 31.7 | 52.8 |
| Cpd 2 + Spirotetramat | 0.05 + 0.85 | 1:17 | 44.7 | 67.1 |
| Cpd 2 + Spirotetramat | 0.18 + 0.25 | 1:1.3889 | 58.3* | 45.9 |
| Cpd 2 + Spirotetramat | 0.18 + 0.85 | 1:4.7222 | 76.4* | 62.3 |
| Cpd 1 + Spirotetramat | 0.08 + 0.25 | 1:3.125 | 34 | 39.9 |
| Cpd 1 + Spirotetramat | 0.08 + 0.85 | 1:10.625 | 67.2* | 58.2 |
| Cpd 1 + Spirotetramat | 0.12 + 0.25 | 1:2.0833 | 63.5* | 60.4 |
| Cpd 1 + Spirotetramat | 0.12 + 0.85 | 1:7.0833 | 68.8 | 72.4 |
| Cpd 3 + Spirotetramat | 0.02 + 0.25 | 1:12.5 | 16.3 | 36.9 |
| Cpd 3 + Spirotetramat | 0.02 + 0.85 | 1:42.5 | 39.5 | 56.1 |
| Cpd 3 + Spirotetramat | 0.08 + 0.25 | 1:3.125 | 18.5 | 55.2 |
| Cpd 3 + Spirotetramat | 0.08 + 0.85 | 1:10.625 | 41.2 | 68.8 |
| Cpd 5 + Spirotetramat | 0.12 + 0.25 | 1:2.0833 | 28.9 | 47.9 |
| Cpd 5 + Spirotetramat | 0.12 + 0.85 | 1:7.0833 | 56.3 | 63.7 |
| Cpd 5 + Spirotetramat | 0.18 + 0.25 | 1:1.3889 | 55.8 | 70.6 |
| Cpd 5 + Spirotetramat | 0.18 + 0.85 | 1:4.7222 | 79.8* | 79.5 |

*Denotes enhanced efficacy based on Colby formula

TABLE 5e

Mixtures comprising Chlorantraniliprole and their activity on Cotton Melon Aphid

| Treatment | Rate [ppm] | Ratio | % Mortality (obs) | % Mortality (exp) |
|---|---|---|---|---|
| Cpd 4 | 0.2 | | 30.8 | |
| Cpd 4 | 0.5 | | 69.7 | |
| Cpd 2 | 0.05 | | 16.3 | |
| Cpd 2 | 0.18 | | 37 | |
| Cpd 1 | 0.08 | | 21.3 | |
| Cpd 1 | 0.12 | | 35.3 | |
| Cpd 3 | 0.02 | | 19.9 | |
| Cpd 3 | 0.08 | | 31.1 | |
| Cpd 5 | 0.12 | | 32.2 | |
| Cpd 5 | 0.18 | | 61.6 | |
| Chlorantraniliprole | 0.23 | | 21 | |
| Chlorantraniliprole | 0.63 | | 42.3 | |
| Cpd 4 + Chlorantraniliprole | 0.2 + 0.23 | 1:1.15 | 65.3* | 45.3 |
| Cpd 4 + Chlorantraniliprole | 0.2 + 0.63 | 1:3.15 | 73.3* | 60.1 |
| Cpd 4 + Chlorantraniliprole | 0.5 + 0.23 | 1:0.46 | 85.9* | 76 |
| Cpd 4 + Chlorantraniliprole | 0.5 + 0.63 | 1:1.26 | 99.0* | 82.5 |
| Cpd 2 + Chlorantraniliprole | 0.05 + 0.23 | 1:4.6 | 17.4 | 33.8 |
| Cpd 2 + Chlorantraniliprole | 0.05 + 0.63 | 1:12.6 | 36 | 51.7 |
| Cpd 2 + Chlorantraniliprole | 0.18 + 0.23 | 1:1.2778 | 42.8 | 50.2 |
| Cpd 2 + Chlorantraniliprole | 0.18 + 0.63 | 1:3.5 | 63.8* | 63.6 |
| Cpd 1 + Chlorantraniliprole | 0.08 + 0.23 | 1:2.875 | 21.8 | 37.8 |
| Cpd 1 + Chlorantraniliprole | 0.08 + 0.63 | 1:7.875 | 43.3 | 54.6 |
| Cpd 1 + Chlorantraniliprole | 0.12 + 0.23 | 1:1.9167 | 26.9 | 48.8 |
| Cpd 1 + Chlorantraniliprole | 0.12 + 0.63 | 1:5.25 | 48.9 | 62.6 |
| Cpd 3 + Chlorantraniliprole | 0.02 + 0.23 | 1:11.5 | 19.8 | 36.7 |
| Cpd 3 + Chlorantraniliprole | 0.02 + 0.63 | 1:31.5 | 31.1 | 53.8 |
| Cpd 3 + Chlorantraniliprole | 0.08 + 0.23 | 1:2.875 | 26 | 45.5 |
| Cpd 3 + Chlorantraniliprole | 0.08 + 0.63 | 1:7.875 | 39.6 | 60.2 |
| Cpd 5 + Chlorantraniliprole | 0.12 + 0.23 | 1:1.9167 | 49.2* | 46.5 |
| Cpd 5 + Chlorantraniliprole | 0.12 + 0.63 | 1:5.25 | 76.3* | 60.9 |

TABLE 5e-continued

Mixtures comprising Chlorantraniliprole and their activity on Cotton Melon Aphid

| Treatment | Rate [ppm] | Ratio | % Mortality (obs) | % Mortality (exp) |
|---|---|---|---|---|
| Cpd 5 + Chlorantraniliprole | 0.18 + 0.23 | 1:1.2778 | 60.3 | 69.7 |
| Cpd 5 + Chlorantraniliprole | 0.18 + 0.63 | 1:3.5 | 71.9 | 77.9 |

*Denotes enhanced efficacy based on Colby formula

TABLE 5f

Mixtures comprising Spinetoram and their activity on Cotton Melon Aphid

| Treatment | Rate [ppm] | Ratio | % Mortality (obs) | % Mortality (exp) |
|---|---|---|---|---|
| Cpd 4 | 0.2 | | 40.7 | |
| Cpd 4 | 0.5 | | 73.4 | |
| Cpd 2 | 0.05 | | 17.1 | |
| Cpd 2 | 0.18 | | 37.2 | |
| Cpd 1 | 0.08 | | 20.8 | |
| Cpd 1 | 0.12 | | 39.4 | |
| Cpd 3 | 0.02 | | 17.6 | |
| Cpd 3 | 0.08 | | 39 | |
| Cpd 5 | 0.12 | | 44.9 | |
| Cpd 5 | 0.18 | | 58.9 | |
| Spinetoram | 50 | | 51.2 | |
| Spinetoram | 250 | | 73.9 | |
| Cpd 4 + Spinetoram | 0.2 + 50 | 1:250 | 75.2* | 71.1 |
| Cpd 4 + Spinetoram | 0.2 + 250 | 1:1250 | 93.0* | 84.5 |
| Cpd 4 + Spinetoram | 0.5 + 50 | 1:100 | 82.7 | 87 |
| Cpd 4 + Spinetoram | 0.5 + 250 | 1:500 | 94.2* | 93.1 |
| Cpd 2 + Spinetoram | 0.05 + 50 | 1:1000 | 46.7 | 59.5 |
| Cpd 2 + Spinetoram | 0.05 + 250 | 1:5000 | 79.1* | 78.4 |
| Cpd 2 + Spinetoram | 0.18 + 50 | 1:277.7778 | 62.4 | 69.3 |
| Cpd 2 + Spinetoram | 0.18 + 250 | 1:1388.8889 | 81.4 | 83.6 |
| Cpd 1 + Spinetoram | 0.08 + 50 | 1:625 | 57.5 | 61.3 |
| Cpd 1 + Spinetoram | 0.08 + 250 | 1:3125 | 86.9* | 79.3 |
| Cpd 1 + Spinetoram | 0.12 + 50 | 1:416.6667 | 63 | 70.4 |
| Cpd 1 + Spinetoram | 0.12 + 250 | 1:2083.3333 | 79.3 | 84.2 |
| Cpd 3 + Spinetoram | 0.02 + 50 | 1:2500 | 40.5 | 59.8 |
| Cpd 3 + Spinetoram | 0.02 + 250 | 1:12500 | 58.3 | 78.5 |
| Cpd 3 + Spinetoram | 0.08 + 50 | 1:625 | 48.9 | 70.2 |
| Cpd 3 + Spinetoram | 0.08 + 250 | 1:3125 | 78.1 | 84.1 |
| Cpd 5 + Spinetoram | 0.12 + 50 | 1:416.6667 | 66.9 | 73.1 |
| Cpd 5 + Spinetoram | 0.12 + 250 | 1:2083.3333 | 79.0 | 85.6 |
| Cpd 5 + Spinetoram | 0.18 + 50 | 1:277.7778 | 86.2* | 79.9 |
| Cpd 5 + Spinetoram | 0.18 + 250 | 1:1388.8889 | 87.5 | 89.3 |

*Denotes enhanced efficacy based on Colby formula

TABLE 5g

Mixtures comprising Bifenthrin and their activity on Cotton Melon Aphid

| Treatment | Rate [ppm] | Ratio | % Mortality (obs) | % Mortality (exp) |
|---|---|---|---|---|
| Cpd 4 | 0.2 | | 21.0 | |
| Cpd 4 | 0.5 | | 45.1 | |
| Cpd 2 | 0.05 | | 23.4 | |
| Cpd 2 | 0.18 | | 38.3 | |
| Cpd 1 | 0.08 | | 29.1 | |
| Cpd 1 | 0.12 | | 35.9 | |
| Cpd 3 | 0.02 | | 15.8 | |
| Cpd 3 | 0.08 | | 30.6 | |
| Cpd 5 | 0.12 | | 25.8 | |
| Cpd 5 | 0.18 | | 44.3 | |
| Bifenthrin | 50 | | 28.7 | |
| Bifenthrin | 250 | | 58.2 | |
| Cpd 4 + Bifenthrin | 0.2 + 50 | 1:250 | 70.3* | 43.6 |
| Cpd 4 + Bifenthrin | 0.2 + 250 | 1:1250 | 76.3* | 66.9 |
| Cpd 4 + Bifenthrin | 0.5 + 50 | 1:100 | 84.2* | 60.8 |
| Cpd 4 + Bifenthrin | 0.5 + 250 | 1:500 | 97.1* | 77.0 |
| Cpd 2 + Bifenthrin | 0.05 + 50 | 1:1000 | 26.4 | 45.3 |

TABLE 5g-continued

Mixtures comprising Bifenthrin and their activity on Cotton Melon Aphid

| Treatment | Rate [ppm] | Ratio | % Mortality (obs) | % Mortality (exp) |
|---|---|---|---|---|
| Cpd 2 + Bifenthrin | 0.05 + 250 | 1:5000 | 52.8 | 67.9 |
| Cpd 2 + Bifenthrin | 0.18 + 50 | 1:277.7778 | 41.7 | 56.0 |
| Cpd 2 + Bifenthrin | 0.18 + 250 | 1:1388.8889 | 65.5 | 74.2 |
| Cpd 1 + Bifenthrin | 0.08 + 50 | 1:625 | 35.7 | 49.4 |
| Cpd 1 + Bifenthrin | 0.08 + 250 | 1:3125 | 69.0 | 70.3 |
| Cpd 1 + Bifenthrin | 0.12 + 50 | 1:416.6667 | 54.3 | 54.3 |
| Cpd 1 + Bifenthrin | 0.12 + 250 | 1:2083.3333 | 54.3 | 73.2 |
| Cpd 3 + Bifenthrin | 0.02 + 50 | 1:2500 | 22.8 | 40.0 |
| Cpd 3 + Bifenthrin | 0.02 + 250 | 1:12500 | 27.4 | 64.8 |
| Cpd 3 + Bifenthrin | 0.08 + 50 | 1:625 | 38.1 | 50.5 |
| Cpd 3 + Bifenthrin | 0.08 + 250 | 1:3125 | 63.8 | 71.0 |
| Cpd 5 + Bifenthrin | 0.12 + 50 | 1:416.6667 | 61.9* | 47.1 |
| Cpd 5 + Bifenthrin | 0.12 + 250 | 1:2083.3333 | 83.8* | 68.9 |
| Cpd 5 + Bifenthrin | 0.18 + 50 | 1:277.7778 | 81.9* | 60.3 |
| Cpd 5 + Bifenthrin | 0.18 + 250 | 1:1388.8889 | 86.7* | 76.7 |

*Denotes enhanced efficacy based on Colby formula

TABLE 5h

Mixtures comprising Indoxacarb and their activity on Cotton Melon Aphid

| Treatment | Rate [ppm] | Ratio | % Mortality (obs) | % Mortality (exp) |
|---|---|---|---|---|
| Cpd 4 | 0.2 | | 44.6 | |
| Cpd 4 | 0.5 | | 68.7 | |
| Cpd 2 | 0.05 | | 43.9 | |
| Cpd 2 | 0.18 | | 57.5 | |
| Cpd 1 | 0.08 | | 37.3 | |
| Cpd 1 | 0.12 | | 50.5 | |
| Cpd 3 | 0.02 | | 37.4 | |
| Cpd 3 | 0.08 | | 43.5 | |
| Cpd 5 | 0.12 | | 40.0 | |
| Cpd 5 | 0.18 | | 68.4 | |
| Indoxacarb | 50 | | 23.4 | |
| Indoxacarb | 250 | | 37.5 | |
| Cpd 4 + Indoxacarb | 0.2 + 50 | 1:250 | 79.6* | 57.6 |
| Cpd 4 + Indoxacarb | 0.2 + 250 | 1:1250 | 55.6 | 65.3 |
| Cpd 4 + Indoxacarb | 0.5 + 50 | 1:100 | 94.2* | 76.0 |
| Cpd 4 + Indoxacarb | 0.5 + 250 | 1:500 | 92.7* | 80.4 |
| Cpd 2 + Indoxacarb | 0.05 + 50 | 1:1000 | 41.7 | 57.0 |
| Cpd 2 + Indoxacarb | 0.05 + 250 | 1:5000 | 38.8 | 64.9 |
| Cpd 2 + Indoxacarb | 0.18 + 50 | 1:277.7778 | 67.5* | 67.5 |
| Cpd 2 + Indoxacarb | 0.18 + 250 | 1:1388.8889 | 74.0* | 73.5 |
| Cpd 1 + Indoxacarb | 0.08 + 50 | 1:625 | 39.0 | 52.0 |
| Cpd 1 + Indoxacarb | 0.08 + 250 | 1:3125 | 68.8* | 60.8 |
| Cpd 1 + Indoxacarb | 0.12 + 50 | 1:416.6667 | 61.8 | 62.1 |
| Cpd 1 + Indoxacarb | 0.12 + 250 | 1:2083.3333 | 79.3* | 69.1 |
| Cpd 3 + Indoxacarb | 0.02 + 50 | 1:2500 | 71.3* | 52.1 |
| Cpd 3 + Indoxacarb | 0.02 + 250 | 1:12500 | 60.8 | 60.9 |
| Cpd 3 + Indoxacarb | 0.08 + 50 | 1:625 | 57.0* | 56.8 |
| Cpd 3 + Indoxacarb | 0.08 + 250 | 1:3125 | 56.1 | 64.7 |
| Cpd 5 + Indoxacarb | 0.12 + 50 | 1:416.6667 | 76.4* | 54.1 |
| Cpd 5 + Indoxacarb | 0.12 + 250 | 1:2083.3333 | 89.0* | 62.5 |
| Cpd 5 + Indoxacarb | 0.18 + 50 | 1:277.7778 | 80.3* | 75.8 |
| Cpd 5 + Indoxacarb | 0.18 + 250 | 1:1388.8889 | 87.5* | 80.3 |

*Denotes enhanced efficacy based on Colby formula

TABLE 5i

Mixtures with Sulfoxaflor and activity on Cotton Melon Aphid

| Treatment | Rate [ppm] | Ratio | % Mortality (obs) | % Mortality (exp) |
|---|---|---|---|---|
| Cpd 4 | 0.2 | | 33.5 | |
| Cpd 4 | 0.5 | | 80.3 | |
| Cpd 5 | 0.12 | | 41.6 | |
| Cpd 5 | 0.18 | | 70.3 | |
| Sulfoxaflor | 0.016 | | 23.4 | |
| Sulfoxaflor | 0.04 | | 48.0 | |
| Cpd 4 + Sulfoxaflor | 0.2 + 0.016 | 1:0.08 | 61.3* | 49.1 |
| Cpd 4 + Sulfoxaflor | 0.2 + 0.04 | 1:0.2 | 77.9* | 65.4 |

TABLE 5i-continued

Mixtures with Sulfoxaflor and activity on Cotton Melon Aphid

| Treatment | Rate [ppm] | Ratio | % Mortality (obs) | % Mortality (exp) |
|---|---|---|---|---|
| Cpd 4 + Sulfoxaflor | 0.5 + 0.016 | 1:0.032 | 87.0* | 84.9 |
| Cpd 4 + Sulfoxaflor | 0.5 + 0.04 | 1:0.08 | 97.1* | 89.7 |
| Cpd 5 + Sulfoxaflor | 0.12 + 0.016 | 1:0.133 | 56.3* | 55.2 |
| Cpd 5 + Sulfoxaflor | 0.12 + 0.04 | 1:0.333 | 85.3* | 69.6 |
| Cpd 5 + Sulfoxaflor | 0.18 + 0.016 | 1:0.088 | 89.6* | 77.2 |
| Cpd 5 + Sulfoxaflor | 0.18 + 0.04 | 1:0.222 | 97.9* | 84.5 |

*Denotes enhanced efficacy based on Colby formula

TABLE 5j

Mixtures with Flupyradifurone and activity on Cotton Melon Aphid

| Treatment | Rate [ppm] | Ratio | % Mortality (obs) | % Mortality (exp) |
|---|---|---|---|---|
| Cpd 4 | 0.2 | | 33.5 | |
| Cpd 4 | 0.5 | | 80.3 | |
| Cpd 5 | 0.12 | | 41.6 | |
| Cpd 5 | 0.18 | | 70.3 | |
| Flupyradifurone | 0.02 | | 23.4 | |
| Flupyradifurone | 0.075 | | 48.0 | |
| Cpd 4 + Flupyradifurone | 0.2 + 0.02 | 1:0.1 | 61.3* | 49.1 |
| Cpd 4 + Flupyradifurone | 0.2 + 0.075 | 1:0.375 | 77.9* | 65.4 |
| Cpd 4 + Flupyradifurone | 0.5 + 0.02 | 1:0.04 | 87* | 84.9 |
| Cpd 4 + Flupyradifurone | 0.5 + 0.075 | 1:0.15 | 97.1* | 89.7 |
| Cpd 5 + Flupyradifurone | 0.12 + 0.02 | 1:0.166 | 56.3* | 55.2 |
| Cpd 5 + Flupyradifurone | 0.12 + 0.075 | 1:0.625 | 85.3* | 69.6 |
| Cpd 5 + Flupyradifurone | 0.18 + 0.02 | 1:0.111 | 89.6* | 77.2 |
| Cpd 5 + Flupyradifurone | 0.18 + 0.075 | 1:0.417 | 97.9* | 84.5 |

*Denotes enhanced efficacy based on Colby formula

TABLE 5k

Mixtures with Flonicamid and activity on Cotton Melon Aphid

| Treatment | Rate [ppm] | Ratio | % Mortality (obs) | % Mortality (exp) |
|---|---|---|---|---|
| Cpd 4 | 0.2 | | 40.2 | |
| Cpd 4 | 0.5 | | 69.3 | |
| Cpd 5 | 0.12 | | 35.9 | |
| Cpd 5 | 0.18 | | 67.2 | |
| Flonicamid | 0.027 | | 24.2 | |
| Flonicamid | 0.267 | | 49.3 | |
| Cpd 4 + Flonicamid | 0.2 + 0.027 | 1:0.135 | 69.4* | 54.7 |
| Cpd 4 + Flonicamid | 0.2 + 0.267 | 1:1.335 | 78.6* | 69.7 |
| Cpd 4 + Flonicamid | 0.5 + 0.027 | 1:0.054 | 80.1* | 76.7 |
| Cpd 4 + Flonicamid | 0.5 + 0.267 | 1:0.534 | 93.8* | 84.4 |
| Cpd 5 + Flonicamid | 0.12 + 0.027 | 1:0.225 | 62.9* | 51.4 |
| Cpd 5 + Flonicamid | 0.12 + 0.267 | 1:2.225 | 78.8* | 67.5 |
| Cpd 5 + Flonicamid | 0.18 + 0.027 | 1:0.15 | 77.7* | 75.2 |
| Cpd 5 + Flonicamid | 0.18 + 0.267 | 1:1.483 | 72.7 | 83.4 |

*Denotes enhanced efficacy based on Colby formul

TABLE 5l

Mixtures with Chlorpyrifos and activity on Cotton Melon Aphid

| Treatment | Rate [ppm] | Ratio | % Mortality (obs) | % Mortality (exp) |
|---|---|---|---|---|
| Cpd 4 | 0.2 | | 40.2 | |
| Cpd4 | 0.5 | | 69.3 | |
| Cpd 5 | 0.12 | | 35.9 | |
| Cpd 5 | 0.18 | | 67.2 | |
| Chlorpyrifos | 0.173 | | 17.7 | |
| Chlorpyrifos | 0.624 | | 37.9 | |
| Cpd 4 + Chlorpyrifos | 0.2 + 0.173 | 1:0.865 | 78.9* | 50.8 |
| Cpd 4 + Chlorpyrifos | 0.2 + 0.624 | 1:3.12 | 83.7* | 62.9 |
| Cpd 4 + Chlorpyrifos | 0.5 + 0.173 | 1:0.346 | 86.8* | 74.7 |
| Cpd 4 + Chlorpyrifos | 0.5 + 0.624 | 1:1.248 | 94.5* | 80.9 |
| Cpd 5 + Chlorpyrifos | 0.12 + 0.173 | 1:1.442 | 81.3* | 47.2 |
| Cpd 5 + Chlorpyrifos | 0.12 + 0.624 | 1:5.2 | 92.5* | 60.2 |
| Cpd 5 + Chlorpyrifos | 0.18 + 0.173 | 1:0.961 | 78.3* | 73 |
| Cpd 5 + Chlorpyrifos | 0.18 + 0.624 | 1:3.467 | 93.2* | 79.7 |

*Denotes enhanced efficacy based on Colby formula

TABLE 5m

Mixtures with Permethrin and activity on Cotton Melon Aphid

| Treatment | Rate [ppm] | Ratio | % Mortality (obs) | % Mortality (exp) |
|---|---|---|---|---|
| Cpd 4 | 0.2 | | 42.5 | |
| Cpd 4 | 0.5 | | 65 | |
| Cpd 5 | 0.12 | | 37.3 | |
| Cpd 5 | 0.18 | | 61.7 | |
| Permethrin | 0.0004 | | 15.6 | |
| Permethrin | 0.04 | | 32.1 | |
| Cpd 4 + Permethrin | 0.2 + 0.0004 | 1:0.002 | 65* | 51.5 |
| Cpd 4 + Permethrin | 0.5 + 0.04 | 1:0.2 | 62.3* | 61 |
| Cpd 4 + Permethrin | 0.12 + 0.0004 | 1:0.0008 | 84.2 | 87.8 |
| Cpd 4 + Permethrin | 0.18 + 0.04 | 1:0.08 | 86.5* | 76.3 |
| Cpd 5 + Permethrin | 0.2 + 0.0004 | 1:0.003 | 51.1 | 51.5 |
| Cpd 5 + Permethrin | 0.5 + 0.04 | 1:0.333 | 65.1* | 61 |
| Cpd 5 + Permethrin | 0.12 + 0.0004 | 1:0.002 | 72.1* | 70.5 |
| Cpd 5 + Permethrin | 0.18 + 0.04 | 1:0.222 | 69.9 | 76.3 |

*Denotes enhanced efficacy based on Colby formula

TABLE 5n

Mixtures with Tolfenpyrad and activity on Cotton Melon Aphid

| Treatment | Rate [ppm] | Ratio | % Mortality (obs) | % Mortality (exp) |
|---|---|---|---|---|
| Cpd 4 | 0.2 | | 57.1 | |
| Cpd 4 | 0.5 | | 73.9 | |
| Cpd 5 | 0.12 | | 48.9 | |
| Cpd 5 | 0.18 | | 77.7 | |
| Tolfenpyrad | 0.192 | | 29 | |

TABLE 5n-continued

Mixtures with Tolfenpyrad and activity on Cotton Melon Aphid

| Treatment | Rate [ppm] | Ratio | % Mortality (obs) | % Mortality (exp) |
|---|---|---|---|---|
| Tolfenpyrad | 0.753 | | 61.9 | |
| Cpd 4 + Tolfenpyrad | 0.2 + 0.192 | 1:0.96 | 78.2* | 69.6 |
| Cpd 4 + Tolfenpyrad | 0.2 + 0.753 | 1:3.765 | 87.1* | 83.7 |
| Cpd 4 + Tolfenpyrad | 0.5 + 0.192 | 1:0.384 | 92.6* | 81.5 |
| Cpd 4 + Tolfenpyrad | 0.5 + 0.753 | 1:1.506 | 98.4* | 90.1 |
| Cpd 5 + Tolfenpyrad | 0.12 + 0.192 | 1:1.6 | 84* | 63.7 |
| Cpd 5 + Tolfenpyrad | 0.12 + 0.753 | 1:6.275 | 85.8* | 80.5 |
| Cpd 5+ Tolfenpyrad | 0.18 + 0.192 | 1:1.067 | 89.1* | 84.2 |
| Cpd 5 + Tolfenpyrad | 0.18 + 0.753 | 1:4.183 | 90.8 | 91.5 |

*Denotes enhanced efficacy based on Colby formula

Test E

For evaluating control of diamondback moth (*Plutella xylostella* L.) through contact and/or systemic means, each test unit consisted of a small open container with a 10- to 12-day-old mustard plant inside. Test compounds were formulated and sprayed with 3 replications as described for Test A. After spraying, the test units were allowed to dry for 1 hour before they were infested with 30-50 neonate larvae. A black, screened cap was placed on the top of each container. The test units were held for 6 days in a growth chamber at 24-25° C. and 70% relative humidity. Each test unit was then visually assessed for plant damage and rated 0-10, where 0=undamaged and 10=plant is dead; the results are listed in Tables 6a-b.

For evaluating control of diamondback moth (*Plutella xylostella* L.) through ingestion only, the test substance Dipel® (active ingredient *Bacillus thuringiensis* kurstaki) was formulated by diluting in water and then adding an MSO based adjuvant at 0.1% v/v. Cabbage plants were sprayed with Dipel® to runoff and allowed to dry for three hours. Once dry, plants leaf tissue was excised and one piece was placed into one well in an eight well tray. Test units were maintained in a growth chamber at 24-25° C. and 70% relative humidity. Each well was then inspected for mortality after 4 days; the result is listed in Table 6c.

For evaluating control of fall armyworm (*Spodoptera frugiperda* (J. E. Smith)) the test unit consisted of a small open container with a 4-5-day-old corn (maize) plant inside. This was pre-infested with 10-15 1-day-old larvae on a piece of insect diet. Test compounds were formulated and sprayed with 3 replications as described for Test A. After spraying of the formulated test compound, the test units were maintained in a growth chamber for 6 days at 25° C. and 70% relative humidity. Plant feeding damage was then visually assessed based on foliage consumed, and larvae were assessed for mortality. Each test unit was then visually assessed for plant damage and rated 0-10, where 0=undamaged and 10=plant is dead; the results are listed in Tables 6d-i.

TABLE 6a

| Mixtures comprising Cyantraniliprole and their activity on Diamondback Moth | | | | |
|---|---|---|---|---|
| Treatment | Rate [ppm] | Ratio | Plant Protection (obs) | Plant Protection (exp) |
| Cpd 4 | 50 | | 0.0 | |
| Cpd 4 | 250 | | 0.0 | |
| Cpd2 | 50 | | 0.0 | |
| Cpd2 | 250 | | 0.0 | |
| Cpd 1 | 50 | | 0.0 | |
| Cpd 1 | 250 | | 0.0 | |
| Cpd 3 | 50 | | 0.0 | |
| Cpd 3 | 250 | | 0.0 | |
| Cpd 5 | 50 | | 0.0 | |
| Cpd 5 | 250 | | 0.0 | |
| Cyantraniliprole | 0.02 | | 20.0 | |
| Cyantraniliprole | 0.013 | | 73.3 | |
| Cpd 4 + Cyantraniliprole | 50 + 0.02 | 1:0.0004 | 50.0* | 20.0 |
| Cpd 4 + Cyantraniliprole | 50 + 0.013 | 1:0.00026 | 63.3 | 73.3 |
| Cpd 4 + Cyantraniliprole | 250 + 0.02 | 1:0.00008 | 50.0* | 20.0 |
| Cpd 4 + Cyantraniliprole | 250 + 0.013 | 1:0.000052 | 90.0* | 73.3 |
| Cpd 2 + Cyantraniliprole | 50 + 0.02 | 1:0.0004 | 46.7* | 20.0 |
| Cpd 2 + Cyantraniliprole | 50 + 0.013 | 1:0.00026 | 86.7* | 73.3 |
| Cpd 2 + Cyantraniliprole | 250 + 0.02 | 1:0.00008 | 23.3* | 20.0 |
| Cpd 2 + Cyantraniliprole | 250 + 0.013 | 1:0.000052 | 63.3 | 73.3 |
| Cpd 1 + Cyantraniliprole | 50 + 0.02 | 1:0.0004 | 33.3* | 20.0 |
| Cpd 1 + Cyantraniliprole | 50 + 0.013 | 1:0.00026 | 73.3 | 73.3 |
| Cpd 1 + Cyantraniliprole | 250 + 0.02 | 1:0.00008 | 63.3* | 20.0 |
| Cpd 1 + Cyantraniliprole | 250 + 0.013 | 1:0.000052 | 66.7 | 73.3 |
| Cpd 3 + Cyantraniliprole | 50 + 0.02 | 1:0.0004 | 26.7* | 20.0 |
| Cpd 3 + Cyantraniliprole | 50 + 0.013 | 1:0.00026 | 76.7* | 73.3 |
| Cpd 3 + Cyantraniliprole | 250 + 0.02 | 1:0.00008 | 56.7* | 20.0 |
| Cpd 3 + Cyantraniliprole | 250 + 0.013 | 1:0.000052 | 66.7 | 73.3 |
| Cpd 5 + Cyantraniliprole | 50 + 0.02 | 1:0.0004 | 6.7 | 20.0 |
| Cpd 5 + Cyantraniliprole | 50 + 0.013 | 1:0.00026 | 70.0 | 73.3 |
| Cpd 5 + Cyantraniliprole | 250 + 0.02 | 1:0.00008 | 46.7* | 20.0 |
| Cpd 5 + Cyantraniliprole | 250 + 0.013 | 1:0.000052 | 70.0 | 73.3 |

*Denotes enhanced plant protection based on Colby formula

TABLE 6b

Mixtures comprising Spirotetramat and their activity on Diamondback Moth

| Treatment | Rate [ppm] | Ratio | Plant Protection (obs) | Plant Protection (exp) |
|---|---|---|---|---|
| Cpd 4 | 50 | | 0.0 | |
| Cpd 4 | 250 | | 0.0 | |
| Cpd2 | 50 | | 0.0 | |
| Cpd2 | 250 | | 0.0 | |
| Cpd 1 | 50 | | 0.0 | |
| Cpd 1 | 250 | | 0.0 | |
| Cpd 3 | 50 | | 0.0 | |
| Cpd 3 | 250 | | 0.0 | |
| Cpd 5 | 50 | | 0.0 | |
| Cpd 5 | 250 | | 0.0 | |
| Spirotetramat | 83.2 | | 73.3 | |
| Spirotetramat | 150 | | 80.0 | |
| Cpd 4 + Spirotetramat | 50 + 83.23 | 1:2 | 76.7* | 73.3 |
| Cpd 4 + Spirotetramat | 50 + 150 | 1:5 | 96.7* | 80.0 |
| Cpd 4 + Spirotetramat | 250 + 83.23 | 1:0.4 | 86.7* | 73.3 |
| Cpd 4 + Spirotetramat | 250 + 150 | 1:1 | 93.3* | 80.0 |
| Cpd 2 + Spirotetramat | 50 + 83.23 | 1:2 | 93.3* | 73.3 |
| Cpd 2 + Spirotetramat | 50 + 150 | 1:5 | 86.7* | 80.0 |
| Cpd 2 + Spirotetramat | 250 + 83.23 | 1:0.4 | 90.0* | 73.3 |
| Cpd 2 + Spirotetramat | 250 + 150 | 1:1 | 80.0 | 80.0 |
| Cpd 1 + Spirotetramat | 50 + 83.23 | 1:2 | 93.3* | 73.3 |
| Cpd 1 + Spirotetramat | 50 + 150 | 1:5 | 93.3* | 80.0 |
| Cpd 1 + Spirotetramat | 250 + 83.23 | 1:0.4 | 90.0* | 73.3 |
| Cpd 1 + Spirotetramat | 250 + 150 | 1:1 | 96.7* | 80.0 |
| Cpd 3 + Spirotetramat | 50 + 83.23 | 1:2 | 83.3* | 73.3 |
| Cpd 3 + Spirotetramat | 50 + 150 | 1:5 | 93.3* | 80.0 |
| Cpd 3 + Spirotetramat | 250 + 83.23 | 1:0.4 | 83.3* | 73.3 |
| Cpd 3 + Spirotetramat | 250 + 150 | 1:1 | 86.7* | 80.0 |
| Cpd 5 + Spirotetramat | 50 + 83.23 | 1:2 | 90.0* | 73.3 |
| Cpd 5 + Spirotetramat | 50 + 150 | 1:5 | 93.3* | 80.0 |
| Cpd 5 + Spirotetramat | 250 + 83.23 | 1:0.4 | 73.3 | 73.3 |
| Cpd 5 + Spirotetramat | 250 + 150 | 1:1 | 93.3* | 80.0 |

*Denotes enhanced plant protection based on Colby formula

TABLE 6c

Mixtures with Dipel ®(*Bacillus thuringiensis kurstaki*) and activity on Diamondback Moth

| Treatment | Rate [ppm] | Ratio | % Mortality (obs) | % Mortality (exp) |
|---|---|---|---|---|
| Cpd 4 | 50 | | 12.5 | |
| Cpd4 | 250 | | 17 | |
| Cpd 5 | 50 | | 21 | |
| Cpd 5 | 250 | | 25 | |
| Dipel ® | 0.15 | | 25 | |
| Dipel ® | 0.43 | | 50 | |
| Cpd 4 + Dipel ® | 50 + 0.15 | 1:0.003 | 25 | 34.4 |
| Cpd 4 + Dipel ® | 50 + 0.43 | 1:0.0086 | 70.8* | 56.3 |
| Cpd 4 + Dipel ® | 250 + 0.15 | 1:0.0006 | 45.8* | 37.5 |
| Cpd 4 + Dipel ® | 250 + 0.43 | 1:0.00172 | 62.5* | 58.3 |
| Cpd 5 + Dipel ® | 50 + 0.15 | 1:0.003 | 29.2 | 34.4 |
| Cpd 5 + Dipel ® | 50 + 0.43 | 1:0.0086 | 41.7 | 56.3 |
| Cpd 5 + Dipel ® | 250 + 0.15 | 1:0.0006 | 16.7 | 37.5 |
| Cpd 5 + Dipel ® | 250 + 0.43 | 1:0.00172 | 100* | 58.3 |

*Denotes enhanced plant protection based on Colby formula

TABLE 6d

Mixtures with Methomyl and activity on Fall Armyworm

| Treatment | Rate [ppm] | Ratio | Plant Protection (obs) | Plant Protection (exp) |
|---|---|---|---|---|
| Cpd 4 | 50 | | 0 | |
| Cpd 4 | 250 | | 0 | |
| Cpd 5 | 50 | | 0 | |
| Cpd 5 | 250 | | 13.3 | |
| Methomyl | 8.5 | | 43.3 | |
| Cpd 4 + Methomyl | 50 + 8.5 | 1:0.17 | 36.7 | 43.3 |
| Cpd 4 + Methomyl | 250 + 8.5 | 1:0.034 | 80* | 43.3 |
| Cpd 5 + Methomyl | 50 + 8.5 | 1:0.17 | 100* | 43.3 |
| Cpd 5 + Methomyl | 250 + 8.5 | 1:0.034 | 76.7* | 50.9 |

*Denotes enhanced plant protection based on Colby formula

TABLE 6e

Mixtures with Indoxacarb and activity on Fall Armyworm

| Treatment | Rate [ppm] | Ratio | Plant Protection (obs) | Plant Protection (exp) |
|---|---|---|---|---|
| Cpd 4 | 50 | | 0 | |
| Cpd 4 | 250 | | 0 | |
| Cpd2 | 50 | | 0 | |
| Cpd2 | 250 | | 0 | |
| Cpd 1 | 50 | | 0 | |
| Cpd 1 | 250 | | 0 | |
| Cpd 3 | 50 | | 0 | |
| Cpd 3 | 250 | | 0 | |
| Cpd 5 | 50 | | 0 | |
| Cpd 5 | 250 | | 0 | |
| Indoxacarb | 0.2 | | 70 | |
| Indoxacarb | 0.5 | | 70 | |
| Cpd 4 + Indoxacarb | 50 + 0.2 | 1:2 | 60 | 70 |
| Cpd 4 + Indoxacarb | 50 + 0.5 | 1:5 | 93.3* | 70 |
| Cpd 4 + Indoxacarb | 250 + 0.2 | 1:0.4 | 66.7 | 70 |
| Cpd 4 + Indoxacarb | 250 + 0.5 | 1:1 | 96.7* | 70 |
| Cpd 2 + Indoxacarb | 50 + 0.2 | 1:2 | 50 | 70 |
| Cpd 2 + Indoxacarb | 50 + 0.5 | 1:5 | 93.3* | 70 |
| Cpd 2 + Indoxacarb | 250 + 0.2 | 1:0.4 | 70 | 70 |
| Cpd 2+ Indoxacarb | 250 + 0.5 | 1:1 | 100* | 70 |
| Cpd 1 + Indoxacarb | 50 + 0.2 | 1:2 | 30.0 | 70 |
| Cpd 1 + Indoxacarb | 50 + 0.5 | 1:5 | 86.7* | 70 |
| Cpd 1 + Indoxacarb | 250 + 0.2 | 1:0.4 | 46.7 | 70 |
| Cpd 1 + Indoxacarb | 250 + 0.5 | 1:1 | 90* | 70 |
| Cpd 3 + Indoxacarb | 50 + 0.2 | 1:2 | 43.3 | 70 |
| Cpd 3 + Indoxacarb | 50 + 0.5 | 1:5 | 73.3* | 70 |
| Cpd 3 + Indoxacarb | 250 + 0.2 | 1:0.4 | 73.3* | 70 |
| Cpd 3 + Indoxacarb | 250 + 0.5 | 1:1 | 86.7* | 70 |
| Cpd 5 + Indoxacarb | 50 + 0.2 | 1:2 | 56.7 | 70 |
| Cpd 5 + Indoxacarb | 50 + 0.5 | 1:5 | 93.3* | 70 |
| Cpd 5 + Indoxacarb | 250 + 0.2 | 1:0.4 | 60 | 70 |
| Cpd 5 + Indoxacarb | 250 + 0.5 | 1:1 | 93.3* | 70 |

*Denotes enhanced plant protection based on Colby formula

TABLE 6f

Mixtures with Emamectin Benzoate and activity on Fall Armyworm

| Treatment | Rate [ppm] | Ratio | Plant Protection (obs) | Plant Protection (exp) |
|---|---|---|---|---|
| Cpd 4 | 50 | | 0 | |
| Cpd 4 | 250 | | 0 | |
| Cpd 5 | 50 | | 0 | |
| Cpd 5 | 250 | | 0 | |
| Emamectin Benzoate | 0.03 | | 43.3 | |
| Emamectin Benzoate | 0.06 | | 23.3 | |

TABLE 6f-continued

Mixtures with Emamectin Benzoate and activity on Fall Armyworm

| Treatment | Rate [ppm] | Ratio | Plant Protection (obs) | Plant Protection (exp) |
|---|---|---|---|---|
| Cpd 4 + Emamectin Benzoate | 50 + 0.03 | 1:0.0006 | 73.3 | 43.3 |
| Cpd 4 + Emamectin Benzoate | 50 + 0.06 | 1:0.0012 | 96.7 | 23.3 |
| Cpd 4 + Emamectin Benzoate | 250 + 0.03 | 1:0.00012 | 96.7 | 43.3 |
| Cpd 4 + Emamectin Benzoate | 250 + 0.06 | 1:0.00024 | 96.7 | 23.3 |
| Cpd 5 + Emamectin Benzoate | 50 + 0.03 | 1:0.0006 | 70 | 43.3 |
| Cpd 5 + Emamectin Benzoate | 50 + 0.06 | 1:0.0012 | 60 | 23.3 |
| Cpd 5 + Emamectin Benzoate | 250 + 0.03 | 1:0.00012 | 43.3 | 43.3 |
| Cpd 5 + Emamectin Benzoate | 250 + 0.06 | 1:0.00024 | 96.7 | 23.3 |

*Denotes enhanced plant protection based on Colby formula

TABLE 6g

Mixtures with Chlorfenapyr and activity on Fall Armyworm

| Treatment | Rate [ppm] | Ratio | Plant Protection (obs) | Plant Protection (exp) |
|---|---|---|---|---|
| Cpd 4 | 50 | | 0 | |
| Cpd 4 | 250 | | 20 | |
| Cpd 5 | 50 | | 0 | |
| Cpd 5 | 250 | | 0 | |
| Chlorfenapyr | 3.7 | | 66.7 | |
| Chlorfenapyr | 5.0 | | 53.3 | |
| Cpd 4 + Chlorfenapyr | 50 + 3.7 | 1:0.074 | 30 | 66.7 |
| Cpd 4 + Chlorfenapyr | 50 + 5 | 1:0.1 | 60* | 53.3 |
| Cpd 4 + Chlorfenapyr | 250 + 3.7 | 1:0.0148 | 80* | 73.3 |
| Cpd 4 + Chlorfenapyr | 250 + 5 | 1:0.02 | 93.3* | 62.7 |
| Cpd 5 + Chlorfenapyr | 50 + 3.7 | 1:0.074 | 70* | 66.7 |
| Cpd 5 + Chlorfenapyr | 50 + 5 | 1:0.1 | 93.3* | 53.3 |
| Cpd 5 + Chlorfenapyr | 250 + 3.7 | 1:0.0148 | 76.7* | 66.7 |
| Cpd 5 + Chlorfenapyr | 250 + 5 | 1:0.02 | 100* | 53.3 |

*Denotes enhanced plant protection based on Colby formula

TABLE 6h

Mixtures with Methoxyfenozide and activity on Fall Armyworm

| Treatment | Rate [ppm] | Ratio | Plant Protection (obs) | Plant Protection (exp) |
|---|---|---|---|---|
| Cpd 4 | 50 | | 0 | |
| Cpd 4 | 250 | | 20 | |
| Cpd 5 | 50 | | 0 | |
| Cpd 5 | 250 | | 0 | |
| Methoxyfenozide | 2.8 | | 36.7 | |
| Cpd 4 + Methoxyfenozide | 50 + 2.8 | 1:0.056 | 90* | 36.7 |
| Cpd 4 + Methoxyfenozide | 250 + 2.8 | 1:0.011 | 86.7* | 49.3 |
| Cpd 5 + Methoxyfenozide | 50 + 2.8 | 1:0.056 | 80* | 36.7 |
| Cpd 5 + Methoxyfenozide | 250 + 2.8 | 1:0.011 | 66.7* | 36.7 |

*Denotes enhanced plant protection based on Colby formula

TABLE 6i

Mixtures with Novaluron and activity on Fall Armyworm

| Treatment | Rate [ppm] | Ratio | Plant Protection (obs) | Plant Protection (exp) |
|---|---|---|---|---|
| Cpd 4 | 50 | | 0.0 | |
| Cpd 4 | 250 | | 0.0 | |
| Cpd 5 | 50 | | 0.0 | |
| Cpd 5 | 250 | | 13.3 | |
| Novaluron | 0.21 | | 33.3 | |
| Novaluron | 0.36 | | 80.0 | |
| Cpd 4 + Novaluron | 50 + 0.21 | 1:0.004 | 60.0* | 33.3 |
| Cpd 4 + Novaluron | 50 + 0.36 | 1:0.007 | 83.3* | 80.0 |
| Cpd 4 + Novaluron | 250 + 0.21 | 1:0.0008 | 80.0* | 33.3 |
| Cpd 4 + Novaluron | 250 + 0.36 | 1:0.001 | 76.7 | 80.0 |
| Cpd 5 + Novaluron | 50 + 0.21 | 1:0.004 | 53.3* | 33.3 |
| Cpd 5 + Novaluron | 50 + 0.36 | 1:0.007 | 80.0 | 80.0 |
| Cpd 5 + Novaluron | 250 + 0.21 | 1:0.0008 | 33.3 | 42.2 |
| Cpd 5 + Novaluron | 250 + 0.36 | 1:0.001 | 73.3 | 82.7 |

*Denotes enhanced plant protection based on Colby formula

Test F

Tomato seeds (cv Tiny Tim) were germinated in plugs in Sunshine mix for 21 days. Seedlings with 3-4 true leaves were transplanted into 4" pots filled with pasteurized loamy sand soil (82.6% sand, 11.6% silt, and 5.6% clay, organic matter 1%, pH 6.6). The soil was treated at transplanting according to Table 1. 10% (v/v) acetone or water were included as negative controls and abamectin at 10 ppm was included as a positive control. Second application was made 7 days after transplanting and plants were inoculated with 7500 eggs of root knot nematode (*Meloidogyne incognita*). Each treatment had four replications. The plants were watered and fertilized as needed. The temperature in the greenhouse ranged from 25 to 30° C. The assay was terminated after 6 weeks and severity of nematode infection was evaluated using 0-10 galling index scale (Bridge and Page 1980).

The observed % reduction of root galling (X) was calculated using the formula:

$$X = (UTC - T)/UTC * 100\%,$$

where X—observed % reduction of root galling, UTC—galling in non-treated control, T—galling in treatment X. Results are shown in Table 7a.

TABLE 7a

Mixtures with Biologicals and activity on Root Knot Nematode

| Treatment | Rate [ppm] | Observed Reduction (%) | Expected Reduction (%) |
|---|---|---|---|
| Cpd 2 + CH200&CH201*[1] | 250 ppm + 5.1E+09 CFU/pot | 0 | 12 |
| Cpd 3 + CH200&CH201 | 250 ppm + 5.1E+09 CFU/pot | 4 | 4 |

TABLE 7a-continued

Mixtures with Biologicals and activity on Root Knot Nematode

| Treatment | Rate [ppm] | Observed Reduction (%) | Expected Reduction (%) |
|---|---|---|---|
| Cpd 4 + CH200&CH201 | 250 ppm + 5.1E+09 CFU/pot | 4 | 23 |
| Cpd 5 + CH200&CH201 | 250 ppm + 5.1E+09 CFU/pot | 4 | 12 |
| Cpd 1 + CH200&CH201 | 250 ppm + 5.1E+09 CFU/pot | 4 | 12 |
| Cpd 2 + RTI545*[2] | 250 ppm + 2.78E+09 CFU/pot | 0 | 4 |
| Cpd 3 + RTI545 | 250 ppm + 2.78E+09 CFU/pot | 4 | -4 |
| Cpd 4 + RTI545 | 250 ppm + 2.78E+09 CFU/pot | 4 | 16 |
| Cpd 5 + RTI545 | 250 ppm + 2.78E+09 CFU/pot | 4 | 4 |
| Cpd 1 + RTI545 | 250 ppm + 2.78E+09 CFU/pot | 8 | 4 |
| Cpd 2 + Nortica*[3] | 250 ppm + 3.00E+10 CFU/pot | 4 | 16 |
| Cpd 3 + Nortica | 250 ppm + 3.00E+10 CFU/pot | 0 | 9 |
| Cpd 4 + Nortica | 250 ppm + 3.00E+10 CFU/pot | 4 | 26 |
| Cpd 5 + Nortica | 250 ppm + 3.00E+10 CFU/pot | 8 | 16 |
| Cpd 1 + Nortica | 250 ppm + 3.00E+10 CFU/pot | -4 | 16 |
| Cpd 2 + FMC proprietary Brevibacillus laterosporus strain | 250 ppm, (2.5 mg/pot) + 50% (v/v) | 5 | 9 |
| Cpd 3 + FMC proprietary Brevibacillus laterosporus strain | 250 ppm, (2.5 mg/pot) + 50% (v/v) | 5 | 9 |
| Cpd 4 + FMC proprietary Brevibacillus laterosporus strain | 250 ppm, (2.5 mg/pot) + 50% (v/v) | 0 | 9 |
| Cpd 5 + FMC proprietary Brevibacillus laterosporus strain | 250 ppm, (2.5 mg/pot) + 50% (v/v) | 14 | 17 |
| Cpd 1 + FMC proprietary Brevibacillus laterosporus strain | 250 ppm, (2.5 mg/pot) + 50% (v/v) | 9 | 9 |

*[1]see, WO 2018/045063 A1;
*[2]see, WO 2018/067815 A1;
*[3]Metronidazole

Tables 2a through 7a show mixtures and compositions of the present disclosure demonstrating control on a wide range of invertebrate pests, some with more than additive activity. As the % of mortality cannot exceed 100%, the unexpected increase in insecticidal activity can be greatest only when the separate active ingredient components alone are at application rates providing considerably less than 100% control. Likewise, plant damage cannot exceed a rating of 10 in these tests, and the unexpected increase in insecticidal activity can be greatest only when the separate active ingredient components alone are at application rates providing considerably less than 100% control. Enhanced activity may not be evident at low application rates where the individual active ingredient components alone have little activity. However, in some instances high activity was observed for combinations wherein individual active ingredient alone at the same application rate had essentially no activity It is worth noting that the five experimental compounds are mixed with 25 representative active ingredients known to have various mode of action classifications; all were shown to enhance activity across the seven representative insect species. Mixtures were evaluated for both contact and/or systemic activity and the results indicate that both foliar and soil applied products and mixtures demonstrate enhanced activity.

A non-synthetic insecticide derived from *Bacillus* spp., was also evaluated for its ability to provide enhanced efficacy when mixed with cpds 1-5. Enhanced activity was also demonstrated in these mixtures.

Accordingly, this invention provides not only improved compositions but also methods of their use for control of invertebrate pests such as arthropods and nematodes in both agronomic and non-agronomic environments. The compositions of this invention demonstrate high controlling effect of invertebrate and nematode pests; consequently, their use as arthropodicides and nematicides can reduce crop production cost and environmental load.

What is claimed is:
1. A composition comprising:
(a) at least one compound of Formula I:

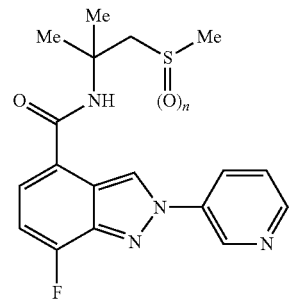

Formula I wherein n is 0, 1, or 2; or
at least one compound of Formula II:

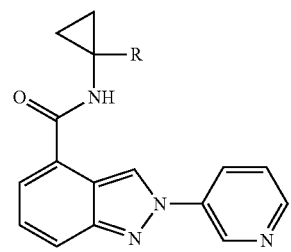

Formula II wherein R is CH₃, or CF₂H; or
a combination of the foregoing compounds; and
(b) at least one additional invertebrate pest control agent selected from the group consisting of cyantraniliprole, chlorpyrifos, acetamiprid, bifenthrin, buprofezin, chlorfenapyr, flonicamid, flupyradifurone, imidacloprid, methomyl, methoxyfenozide, permethrin, spinetoram, spirotetramat, sulfoxaflor, tolfenpyrad, chlorantraniliprole, and indoxacarb;
wherein the weight ratio of the compound of Formula I or the compound of Formula II to component (b) is from 100:1 to 1:10;
provided that
(1) when component (a) is the compound of Formula I, then component (b) is other than, chlorpyrifos, buprofezin, chlorfenapyr, flonicamid, flupyradifurone, methomyl, methoxyfenozide, permethrin, sulfoxaflor, or tolfenpyrad; and
(2) when component (a) is the compound of Formula I, n is 2 and component (b) is indoxacarb then the weight ratio of the compound of Formula I to component (b) is other than 2:1.

2. The composition of claim 1 wherein component (a) is a compound selected from N-[1,1-dimethyl-2-(methylthio)ethyl]-7-fluoro-2-(3-pyridinyl)-2H-indazole-4-carboxamide, N-[1,1-dimethyl-2-(methylsulfinyl)ethyl]-7-fluoro-2-(3-pyridinyl)-2H-indazole-4-carboxamide, N-[1,1-dimethyl-2-(methylsulfonyl)ethyl]-7-fluoro-2-(3-pyridinyl)-2H-indazole-4-carboxamide, N-(1-methylcyclopropyl)-2-(3-pyridinyl)-2H-indazole-4-carboxamide and N-[1-(difluoromethyl)cyclopropyl]-2-(3-pyridinyl)-2H-indazole-4-carboxamide.

3. The composition of claim 1 wherein component (a) is N-[1,1-dimethyl-2-(methylthio)ethyl]-7-fluoro-2-(3-pyridinyl)-2H-indazole-4-carboxamide and component (b) is cyantraniliprole, acetamiprid, bifenthrin, imidacloprid, spinetoram, spirotetramat, chlorantraniliprole, or indoxacarb.

4. The composition of claim 1 wherein the weight ratio of the compound of Formula I or the compound of Formula II of component (b), is from 1:10 to 50:1.

5. The composition of claim 1 further comprising at least one additional component selected from the group consisting of surfactants, solid diluents, and liquid diluents, said composition further comprising at least one additional biologically active compound or agent.

6. The composition of claim 1 further comprising a liquid fertilizer.

7. A soil drench formulation comprising the composition of claim 1.

8. A spray composition comprising the composition of claim 1 and a propellant.

9. A bait composition, comprising: the composition of claim 1, one or more food materials, optionally an attractant, and optionally a humectant.

10. A trap device for controlling an invertebrate pest, comprising: the bait composition of claim 9 and a housing adapted to receive said bait composition, wherein the housing has at least one opening sized to permit the invertebrate pest to pass through the opening so the invertebrate pest can gain access to said bait composition from a location outside the housing, and wherein the housing is further adapted to be placed in or near a locus of potential or known activity for the invertebrate pest.

11. A composition comprising the composition of claim 1 wherein the composition is a solid composition selected from the group consisting of dusts, powders, granules, pellets, prills, pastilles, tablets, and filled films.

12. The composition of claim 11 wherein the composition is water-dispersible or water-soluble.

13. A liquid or dry formulation comprising the composition of claim 1 for use in a drip irrigation system, furrow during planting, handheld sprayer, backpack sprayer, boom sprayer, ground sprayer, aerial application, unmanned aerial vehicle, or a seed treatment.

14. A method for controlling an invertebrate pest comprising contacting the invertebrate pest or its environment with a biologically effective amount of a composition or formulation of claim 1.

15. The method of claim 14 wherein the composition or formulation is dispensed by a drip irrigation system, furrow during planting, handheld sprayer, backpack sprayer, boom sprayer, ground sprayer, aerial application, or an unmanned aerial vehicle.

16. A treated seed comprising the composition or formulation of claim 1 in an amount of from about 0.0001 to 1% by weight of the seed before treatment.

17. The composition of claim 1 wherein component (a) is N-[1,1-dimethyl-2-(methylsulfinyl)ethyl]-7-fluoro-2-(3-pyridinyl)-2H-indazole-4-carboxamide and component (b) is cyantraniliprole, acetamiprid, bifenthrin, imidacloprid, spinetoram, spirotetramat, chlorantraniliprole, or indoxacarb.

18. The composition of claim 1 wherein component (a) is N-[1,1-dimethyl-2-(methylsulfonyl)ethyl]-7-fluoro-2-(3-pyridinyl)-2H-indazole-4-carboxamide and component (b) is cyantraniliprole, acetamiprid, bifenthrin, imidacloprid, spinetoram, spirotetramat, chlorantraniliprole, or indoxacarb.

19. The composition of claim 1 wherein component (a) is N-(1-methyl-cyclopropyl)-2-(3-pyridinyl)-2H-indazole-4-carboxamide and component (b) is cyantraniliprole, chlorpyrifos, acetamiprid, bifenthrin, buprofezin, chlorfenapyr, flonicamid, flupyradifurone, imidacloprid, methomyl, methoxyfenozide, permethrin, spinetoram, spirotetramat, sulfoxaflor, tolfenpyrad, chlorantraniliprole, or indoxacarb.

20. The composition of claim 1 wherein component (a) is N-[1-(difluoro-methyl)cyclopropyl]-2-(3-pyridinyl)-2H-indazole-4-carboxamide and component (b) is cyantraniliprole, chlorpyrifos, acetamiprid, bifenthrin, buprofezin, chlorfenapyr, flonicamid, flupyradifurone, imidacloprid, methomyl, methoxyfenozide, permethrin, spinetoram, spirotetramat, sulfoxaflor, tolfenpyrad, chlorantraniliprole, or indoxacarb.

* * * * *